(12) United States Patent
Yang

(10) Patent No.: US 8,413,547 B2
(45) Date of Patent: Apr. 9, 2013

(54) RETROGRADE TORQUE LIMIT GEAR TRAIN WITH BIDIRECTIONAL INPUT AND ONE-WAY OUTPUT

(76) Inventor: Tai-Her Yang, Dzan-Hwa (TW)

( * ) Notice: Subject to any disclaimer, the term of this patent is extended or adjusted under 35 U.S.C. 154(b) by 269 days.

(21) Appl. No.: 12/656,675

(22) Filed: Feb. 12, 2010

(65) Prior Publication Data
US 2011/0201469 A1 Aug. 18, 2011

(51) Int. Cl.
*F16H 3/00* (2006.01)
(52) U.S. Cl.
USPC .................................. 74/810.1; 475/12
(58) Field of Classification Search .............. 74/318, 74/319, 322, 810.1; 475/12
See application file for complete search history.

(56) References Cited

U.S. PATENT DOCUMENTS

| 1,490,796 | A | * | 4/1924 | Blomberg | 74/810.1 |
| 3,094,195 | A | * | 6/1963 | Lund | 188/82.2 |
| 4,341,292 | A | * | 7/1982 | Acevedo | 192/43 |
| 4,353,263 | A | * | 10/1982 | Ciciora | 74/337 |
| 5,957,802 | A | * | 9/1999 | Yoo | 475/294 |
| 2003/0034627 | A1 | * | 2/2003 | Kim et al. | 280/237 |
| 2011/0201468 | A1 | * | 8/2011 | Yang | 475/12 |

* cited by examiner

*Primary Examiner* — Sherry Estremsky
(74) *Attorney, Agent, or Firm* — Bacon & Thomas, PLLC

(57) ABSTRACT

The retrograde torque limit gear train with bidirectional input and one-way output relates to a gear train, wherein the input rotary direction of the input shaft is bidirectional and the output direction is constant, and it is characterized by that the gear train with bidirectional input implements reverse transmission when the output side implements retrograde driving in reverse direction with that of the output, through clutch operation conducted by the clutch device installed at the gear train with bidirectional input and one-way output.

41 Claims, 20 Drawing Sheets

RETROGRADE TORQUE LIMIT GEAR TRAIN WITH BIDIRECTIONAL INPUT AND ONE-WAY OUTPUT

BACKGROUND OF THE INVENTION (a) Field of the Invention

The retrograde torque limit gear train with bidirectional input and one-way output relates to a gear train, wherein the input rotary direction of the input shaft is bidirectional and the output direction is constant, and it is characterized by that the gear train with bidirectional input implements reverse transmission when the output side implements retrograde driving in reverse direction with that of the output, through clutch operation conducted by the clutch device installed at the gear train with bidirectional input and one-way output.

(b) Description of the Prior Art

The limitation of the conventional gear train with dual rotary direction input and constant rotary direction output is to be locked when the output side is reversely driven.

SUMMARY OF THE INVENTION

The present invention is for installing the torque limit transmission in the gear train with dual rotary direction input and constant rotary direction output at one or more of the following positions, including: the radial or axial torque limit transmission installed between the revolution wheel group in the power transmission chain from the input end to the output end and the axle coupled when driven forwardly; and/or the radial or axial torque limit transmission installed between the revolution wheel group in the power transmission chain from the input end to the output end and the axle coupled when driven reversely, arranged to be the structure against the force from the revolution of the gear train driven reversely; if the output shaft is externally reversely driven even exceeding the set overload torque of the torque limit transmission, the gear train with dual rotary direction input and constant rotary direction output is prevented from rigid lock status through the operational function of the overload torque of the torque limit transmission.

Figure 1:
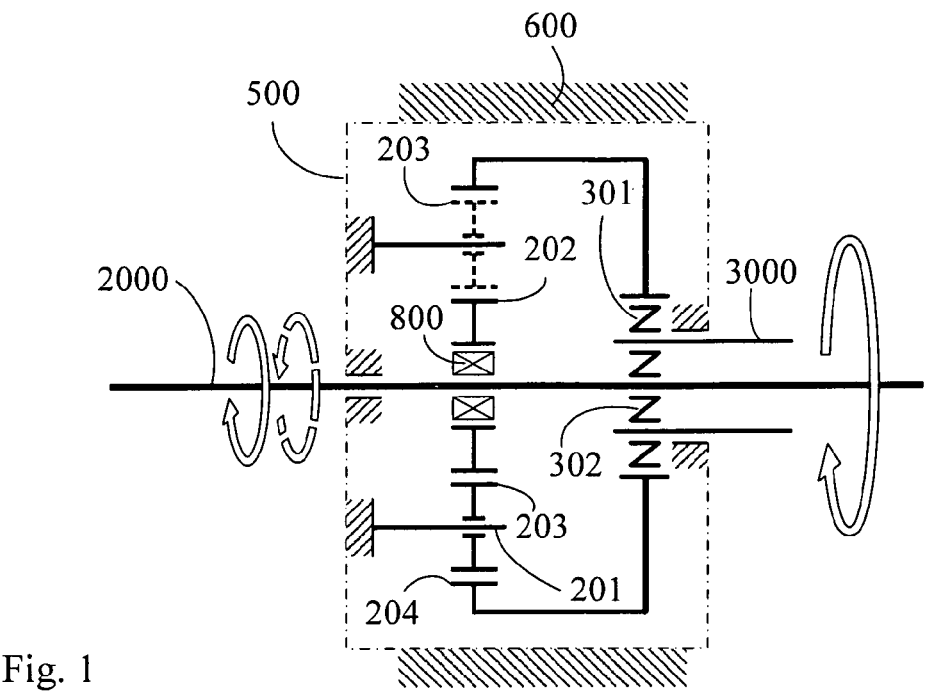
FIG. 1 is a structural schematic view showing the 1st embodiment of the retrograde torque limit gear train with bidirectional input and one-way output constituted by the planetary gear train, according to the present invention.

DESCRIPTION OF MAIN COMPONENT SYMBOLS (200): Planetary wheel support arm annular shelf
(201): Planetary wheel shaft
(202): Sun wheel
(203): Planetary wheel
(204): Outer wheel
(301), (302), (303), (305): One-way transmission
(400): Planetary wheel support arm annular shelf
(401): Planetary wheel shaft
(402): Inner bevel wheel
(403): Planetary wheel
(404): Outer bevel wheel
(500): Shell
(600): Machine body
(602), (603), (605), (606), (615), (616), (617): Driving wheel
(618), (604): Revolving shaft
(800): Torque limit transmission
(2000): Input shaft
(3000): Output shaft

DETAILED DESCRIPTION OF THE PREFERRED EMBODIMENTS

The limitation of the conventional gear train with dual rotary direction input and constant rotary direction output is to be locked when the output side is reversely driven.

For the retrograde torque limit gear train with bidirectional input and one-way output of the present invention, the radial or axial torque limit transmission is installed between the transmissions of the gear train with bidirectional input and one-way output thereof, arranged to be the structure against the force from the revolution of the gear train driven reversely; if the output shaft is externally reversely driven even exceeding the set overload torque of the torque limit transmission, the gear train with dual rotary direction input and constant rotary direction output is prevented from rigid lock status through the operational function of the overload torque of the torque limit transmission.

For the retrograde torque limit gear train with bidirectional input and one-way output of the present invention, the structural types include the input shaft and the output shaft coaxially installed in series, or the both coaxial fitting, or the both have different axes;

the main features are as following:
in the retrograde torque limit gear train with bidirectional input and one-way output, a torque limit transmission (800) is installed between the transmissions in the power transmission chain from the input end to the output end of the gear train with bidirectional input and one-way output, including: the radial or axial torque limit transmission (800) installed between the transmissions in the power transmission chain from the input end to the output end of the first transmission gear train when driven by the first rotary direction input; and/or the radial or axial torque limit transmission (800) coaxially installed between the transmissions in the power transmission chain from the input end to the output end of the second transmission gear train when driven by the second rotary direction input;

the torque limit transmission (800) is installed between the transmissions of the gear train with bidirectional input and one-way output;

the gear train with bidirectional input and one-way output is constituted by the planetary gear train or the epicyclic gear train with the same functions, or by co-integrating with the transmissions with different drive rotary directions;

the forward and reverse rotary power source is deriving from one or more of the following power source, including human power, machine power, electric motors, hydraulic motors or pneumatic motors; including:
(1) forward and reversely driven by human power; or
(2) forward and reversely driven by machine power; or
(3) forward and reversely driven by hydraulic or pneumatic liquid driven motors; or
(4) forward and reversely driven by electric motors; or
(5) driven at different directions by the rotary power sources from (1)~(4).

torque limit transmission: constituted by the torque limit transmission function unit in radial or axial installation, which is controlled by electromagnetic force, spring force, machine power, air pressure, liquid pressure, or human power; and transmission: constituted by transmission components including gear, friction wheel, pulley and transmission belt group, sprocket and transmission chain group, transmission connecting rod, or rotary transmission actuated by liquid, for getting rotary output with the same or different direction, and the same or different speed ratio with rotary input;

The operational features of the retrograde torque limit gear train with bidirectional input and one-way output are as following:

the first rotary direction and the second rotary direction are reverse;

if the input end is driven by the first rotary direction, it is through the first transmission gear train to drive the output end to produce the first rotary direction output;

if the input end is driven by the second rotary direction, it is through the second transmission gear train to drive the output end to produce the first rotary direction output;

an one-way transmission is installed between the first transmission gear train and the second transmission gear train to avoid the interference from the second transmission gear train when the first transmission gear train is used to be the first rotary direction input and produces the first rotary direction output; and an one-way transmission is installed between the second transmission gear train and the first transmission gear train to avoid the interference from the first transmission gear train when the second transmission gear train is used to be the second rotary direction input and produces the first rotary direction output;

in the structure of the retrograde torque limit gear train with bidirectional input and one-way output, the torque limit transmission is installed at one or more of the following positions, including: when the first transmission gear train is used to drive in the first rotary direction input, the radial or axial torque limit transmission is installed between the transmissions in the power transmission chain from the input end to the output end of the clutch reverse transmission with constant direction output (103); and/or when the second transmission gear train is used to drive in the second rotary direction input, the radial or axial torque limit transmission is coaxially installed between the revolution wheel group and the crankshaft in the power transmission chain from the input end to the output end, arranged to be the structure against the force from the revolution of the gear train driven reversely; if the output shaft is externally reversely driven even exceeding the set overload torque of the torque limit transmission, the gear train with dual rotary direction input and constant rotary direction output is prevented from rigid lock status through the operational function of the overload torque of the torque limit transmission; and the torque limit transmission is used to limit the transmission torque between the output end and one of the input end driven at the first rotary direction or the input end driven at the second rotary direction, and to implement the operation of disengaging when exceeding the set torque.

Some embodiments are provided as following to describe the enforceability of the retrograde torque limit gear train with bidirectional input and one-way output, and the other embodiments with same functions are omitted.

The following are a variety of structural types of the retrograde torque limit gear train with bidirectional input and one-way output, including:

A) as shown in FIGS. 1 to 14, which is constituted by the planetary gear train;

B) as shown in FIGS. 15 to 28, which is constituted by the epicyclic gear train; and C) as shown in FIGS. 29 to 40, which is constituted by integrating with the transmissions with different drive rotary directions.

The structural descriptions are as following:

For A: as shown in FIGS. 1 to 14, the retrograde torque limit gear train with bidirectional input and one-way output is constituted by the planetary gear train, including:

FIG. 1 is a structural schematic view showing the 1st embodiment of the retrograde torque limit gear train with bidirectional input and one-way output constituted by the planetary gear train, according to the present invention;

As shown in FIG. 1, the retrograde torque limit gear train with bidirectional input and one-way output is constituted by the planetary gear train with the input shaft and the output shaft coaxial fitting, the main components including:

one end of an input shaft (2000) is through installed at one side of a shell (500) via a bearing structure, while the other end of the input shaft (2000) perforates through an output shaft (3000) via an one-way transmission (302), and a bearing is installed between the output shaft (3000) and the shell (500);

the input shaft (2000) perforates through a sun wheel (202), and a torque limit transmission (800) is installed between the both;

a planetary wheel (203) is installed between an outer wheel (204) and the sun wheel (202); the center of the planetary wheel (203) rotates at a planetary wheel shaft (201), and one end of the planetary wheel shaft (201) is fixed at the shell (500); the shell (500) is fixed installed at a machine body (600); an one-way transmission (301) is installed between the ring structure of the outer wheel (204) and the output shaft (3000);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the sun wheel (202) for further driving the planetary wheel (203) and the outer wheel (204), and through the ring structure of the outer wheel (204) and the one-way transmission (301) for driving the output shaft (3000) to produce the first rotary direction output to constitute the second transmission gear train;

the sun wheel (202), the planetary wheel (203), and the outer wheel (204) are constituted by gears or friction wheels;

the relation of the transmission ratio using the sun wheel (202) to drive the planetary wheel (203) includes acceleration, deceleration, or constant velocity;

the relation of the transmission ratio using the planetary wheel (203) to drive the outer wheel (204) is deceleration; and if the output shaft (3000) is driven at reverse rotary direction with the torque exceeding the rating overload torque of the torque limit transmission (800), the torque limit transmission (800) implements the operation of overload function.

Figure 2:
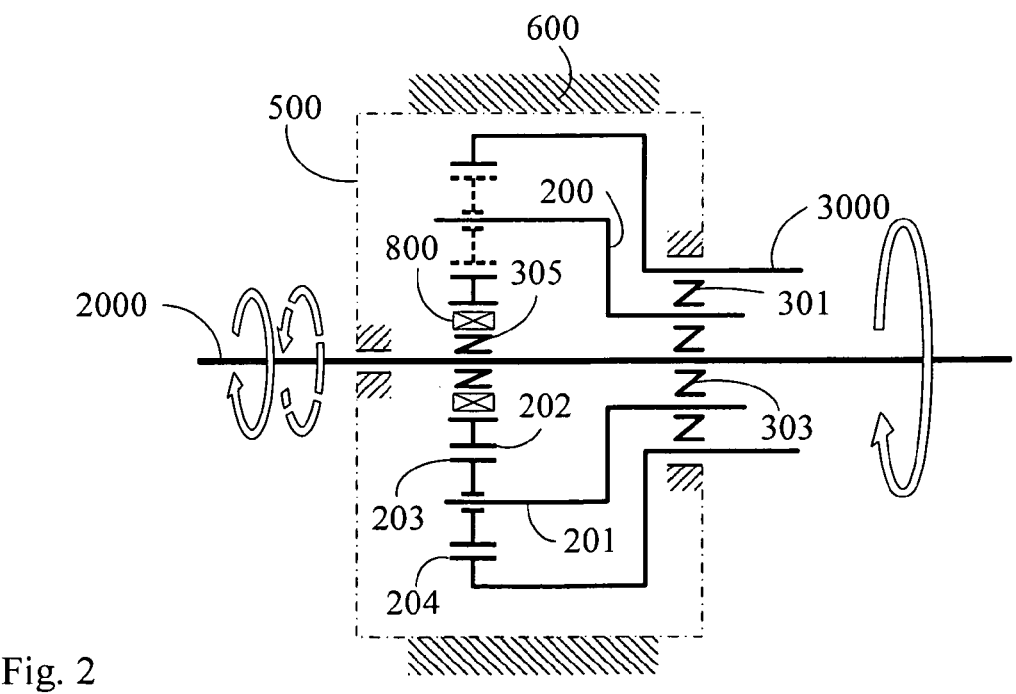
FIG. 2 is a structural schematic view showing the 2nd embodiment of the retrograde torque limit gear train with bidirectional input and one-way output constituted by the planetary gear train, according to the present invention.

FIG. 2 is a structural schematic view showing the 2nd embodiment of the retrograde torque limit gear train with bidirectional input and one-way output constituted by the planetary gear train, according to the present invention;

As shown in FIG. 2, the retrograde torque limit gear train with bidirectional input and one-way output is constituted by the planetary gear train with the input shaft and the output shaft coaxial fitting, the main components including:

one end of the input shaft (2000) is through installed at one side of the shell (500) via a bearing structure, while the other end of the input shaft (2000) perforates through the output shaft (3000) via an one-way transmission (303), a planetary wheel support arm annular shelf (200), and the one-way transmission (301), and a bearing is installed between the output shaft (3000) and the shell (500);

the input shaft (2000) perforates through the sun wheel (202), and an one-way transmission (305) and a torque limit transmission (800) are installed between the both;

the planetary wheel (203) is installed between the outer wheel (204) and the sun wheel (202); the planetary wheel (203) rotates at the planetary wheel shaft (201), the planetary wheel shaft (201) is installed at the planetary wheel support arm annular shelf (200), the planetary wheel support arm annular shelf (200) is fitted between the one-way transmission (301) and the one-way transmission (303); and the one-way transmission (301) is installed between the ring structure of the outer wheel (204) and the planetary wheel support arm annular shelf (200);

the shell (500) is fixed installed at the machine body (600);

by way of the above structure, the input shaft (2000) is driven at the first rotary direction, and then through the one-way transmission (303) and the one-way transmission (301) for driving the output shaft (3000) to produce the first rotary direction output to constitute the first transmission gear train;

by way of the above structure, the input shaft (2000) is driven at the second rotary direction, and then through the one-way transmission (305) and the closed torque limit transmission (800) for driving the planetary wheel (203) and the outer wheel (204) for driving the output shaft (3000) to produce the first rotary direction output to constitute the second transmission gear train;

the sun wheel (202), the planetary wheel (203), and the outer wheel (204) are constituted by gears or friction wheels;

the relation of the transmission ratio using the sun wheel (202) to drive the planetary wheel (203) includes acceleration, deceleration, or constant velocity;

the relation of the transmission ratio using the planetary wheel (203) to drive the outer wheel (204) is deceleration; and if the output shaft (3000) is driven at reverse rotary direction with the torque exceeding the rating overload torque of the torque limit transmission (800), the torque limit transmission (800) implements the operation of overload function.

Figure 3:
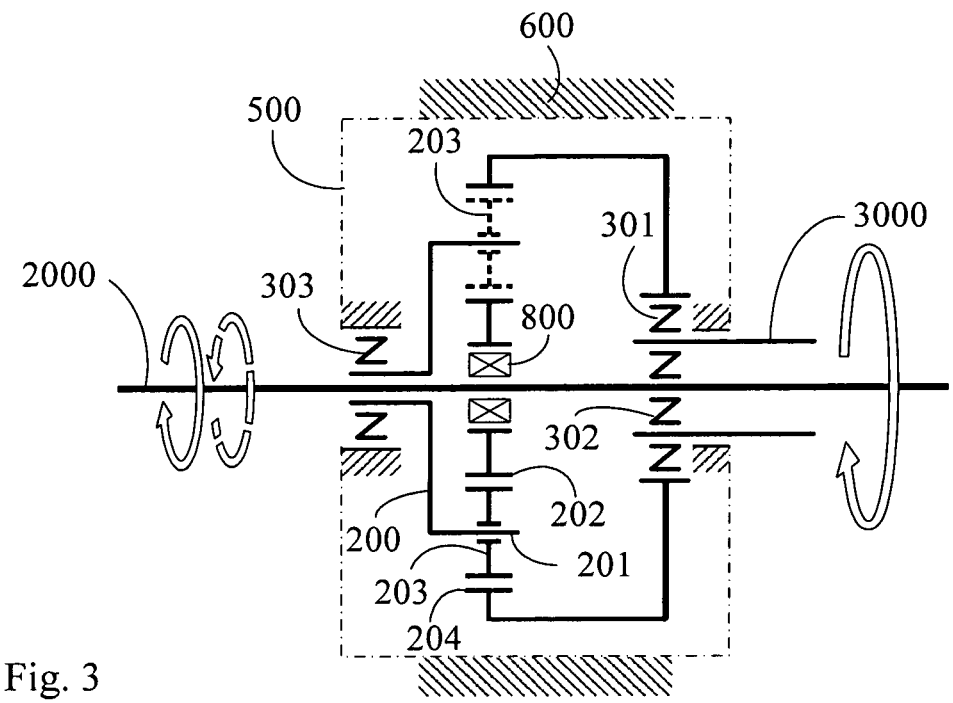
FIG. 3 is a structural schematic view showing the 3rd embodiment of the retrograde torque limit gear train with bidirectional input and one-way output constituted by the planetary gear train, according to the present invention.

FIG. 3 is a structural schematic view showing the 3rd embodiment of the retrograde torque limit gear train with bidirectional input and one-way output constituted by the planetary gear train, according to the present invention;

As shown in FIG. 3, the retrograde torque limit gear train with bidirectional input and one-way output is constituted by the planetary gear train with the input shaft and the output shaft coaxial fitting, the main components including:

one end of the input shaft (2000) is through installed at the planetary wheel support arm annular shelf (200) via a bearing structure, the planetary wheel support arm annular shelf (200) is integrated at one side of the shell (500) via the one-way transmission (303), while the other end of the input shaft (2000) perforates through the output shaft (3000) via the one-way transmission (302), and a bearing is installed between the output shaft (3000) and the shell (500);

the input shaft (2000) perforates through the sun wheel (202), and the torque limit transmission (800) is installed between the both;

the planetary wheel (203) is installed between the outer wheel (204) and the sun wheel (202); the center of the planetary wheel (203) rotates at the planetary wheel shaft (201), and the planetary wheel shaft (201) is integrated with the planetary wheel support arm annular shelf (200);

the ring structure of the outer wheel (204) is surrounded installed to the output shaft (3000) via the one-way transmission (301);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the sun wheel (202), the planetary wheel (203), and the outer wheel (204), and through the one-way transmission (301) for driving the output shaft (3000) to produce the first rotary direction output to constitute the second transmission gear train;

the sun wheel (202), the planetary wheel (203), and the outer wheel (204) are constituted by gears or friction wheels;

the relation of the transmission ratio using the sun wheel (202) to drive the planetary wheel (203) includes acceleration, deceleration, or constant velocity;

the relation of the transmission ratio using the planetary wheel (203) to drive the outer wheel (204) is deceleration; and if the output shaft (3000) is driven at reverse rotary direction with the torque exceeding the rating overload torque of the torque limit transmission (800), the torque limit transmission (800) implements the operation of overload function.

Figure 4:
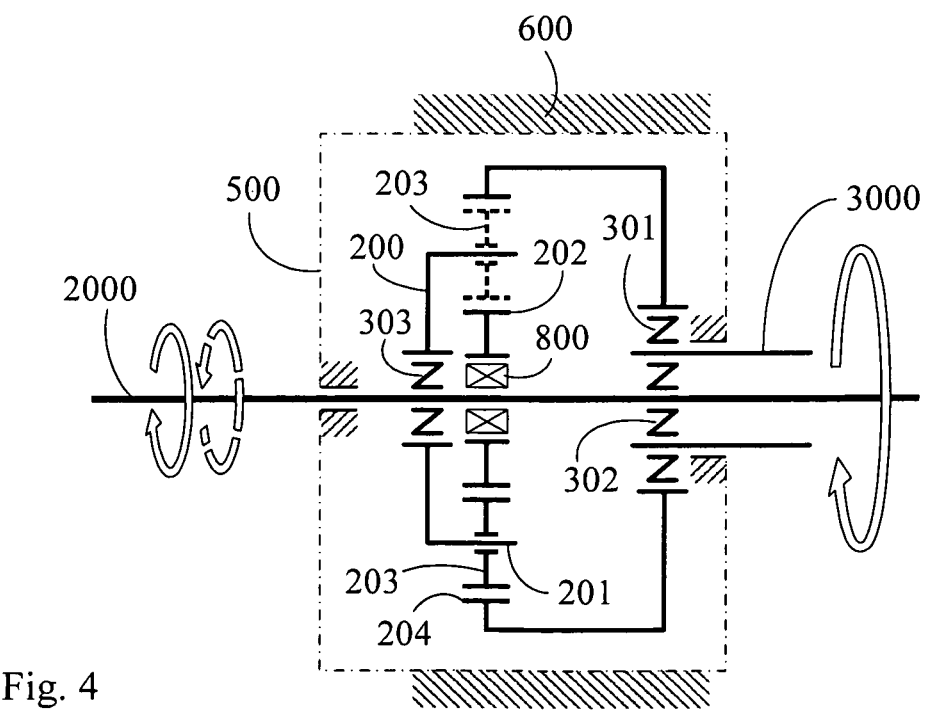
FIG. 4 is a structural schematic view showing the 4th embodiment of the retrograde torque limit gear train with bidirectional input and one-way output constituted by the planetary gear train, according to the present invention.

FIG. 4 is a structural schematic view showing the 4th embodiment of the retrograde torque limit gear train with bidirectional input and one-way output constituted by the planetary gear train, according to the present invention;

As shown in FIG. 4, the retrograde torque limit gear train with bidirectional input and one-way output is constituted by the planetary gear train with the input shaft and the output shaft coaxial fitting, the main components including:

one end of the input shaft (2000) is through installed at one side of the shell (500) via a bearing structure, while the other end of the input shaft (2000) perforates through the output shaft (3000) via the one-way transmission (302), and a bearing is installed between the output shaft (3000) and the shell (500);

the input shaft (2000) perforates through the sun wheel (202), and the torque limit transmission (800) is installed between the both;

the planetary wheel (203) is installed between the outer wheel (204) and the sun wheel (202); the center of the planetary wheel (203) rotates at the planetary wheel shaft (201), and the planetary wheel shaft (201) is integrated with the planetary wheel support arm annular shelf (200) near the shell (500); and the one-way transmission (303) is installed between the planetary wheel support arm annular shelf (200) and the input shaft (2000);

the ring structure of the outer wheel (204) is surrounded installed to the output shaft (3000) via the one-way transmission (301);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the sun wheel (202), the planetary wheel (203), and the outer wheel (204), and further through the one-way transmission (301) for driving the output shaft (3000) to produce the first rotary direction output to constitute the second transmission gear train;

the sun wheel (202), the planetary wheel (203), and the outer wheel (204) are constituted by gears or friction wheels;

the relation of the transmission ratio using the sun wheel (202) to drive the planetary wheel (203) includes acceleration, deceleration, or constant velocity;

the relation of the transmission ratio using the planetary wheel (203) to drive the outer wheel (204) is deceleration; and if the output shaft (3000) is driven at reverse rotary direction with the torque exceeding the rating overload torque of the torque limit transmission (800), the torque limit transmission (800) implements the operation of overload function.

Figure 5:
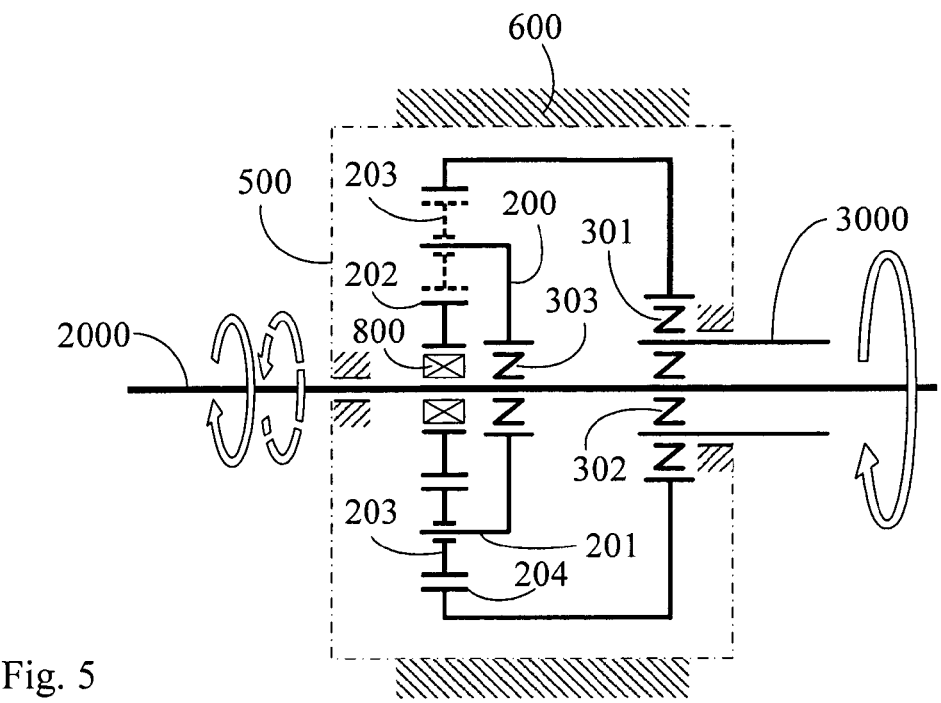
FIG. 5 is a structural schematic view showing the 5th embodiment of the retrograde torque limit gear train with bidirectional input and one-way output constituted by the planetary gear train, according to the present invention.

FIG. 5 is a structural schematic view showing the 5th embodiment of the retrograde torque limit gear train with bidirectional input and one-way output constituted by the planetary gear train, according to the present invention;

As shown in FIG. 5, the retrograde torque limit gear train with bidirectional input and one-way output is constituted by the planetary gear train with the input shaft and the output shaft coaxial fitting, the main components including:

one end of the input shaft (2000) is through installed at one side of the shell (500) via a bearing structure, while the other end of the input shaft (2000) perforates through the output shaft (3000) via the one-way transmission (302), and a bearing is installed between the output shaft (3000) and the shell (500);

the input shaft (2000) perforates through the sun wheel (202), and the torque limit transmission (800) is installed between the both;

the planetary wheel (203) is installed between the outer wheel (204) and the sun wheel (202); the center of the planetary wheel (203) rotates at the planetary wheel shaft (201); the planetary wheel shaft (201) is integrated with the planetary wheel support arm annular shelf (200) installed between the torque limit transmission (800) and the one-way transmission (302); and the one-way transmission (303) is installed between the planetary wheel support arm annular shelf (200) and the input shaft (2000);

the ring structure of the outer wheel (204) is surrounded installed to the output shaft (3000) via the one-way transmission (301);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the sun wheel (202), the planetary wheel (203), and the outer wheel (204), and further through the one-way transmission (301) for driving the output shaft (3000) to produce the first rotary direction output to constitute the second transmission gear train;

the sun wheel (202), the planetary wheel (203), and the outer wheel (204) are constituted by gears or friction wheels;

the relation of the transmission ratio using the sun wheel (202) to drive the planetary wheel (203) includes acceleration, deceleration, or constant velocity;

the relation of the transmission ratio using the planetary wheel (203) to drive the outer wheel (204) is deceleration; and if the output shaft (3000) is driven at reverse rotary direction with the torque exceeding the rating overload torque of the torque limit transmission (800), the torque limit transmission (800) implements the operation of overload function.

Figure 6:
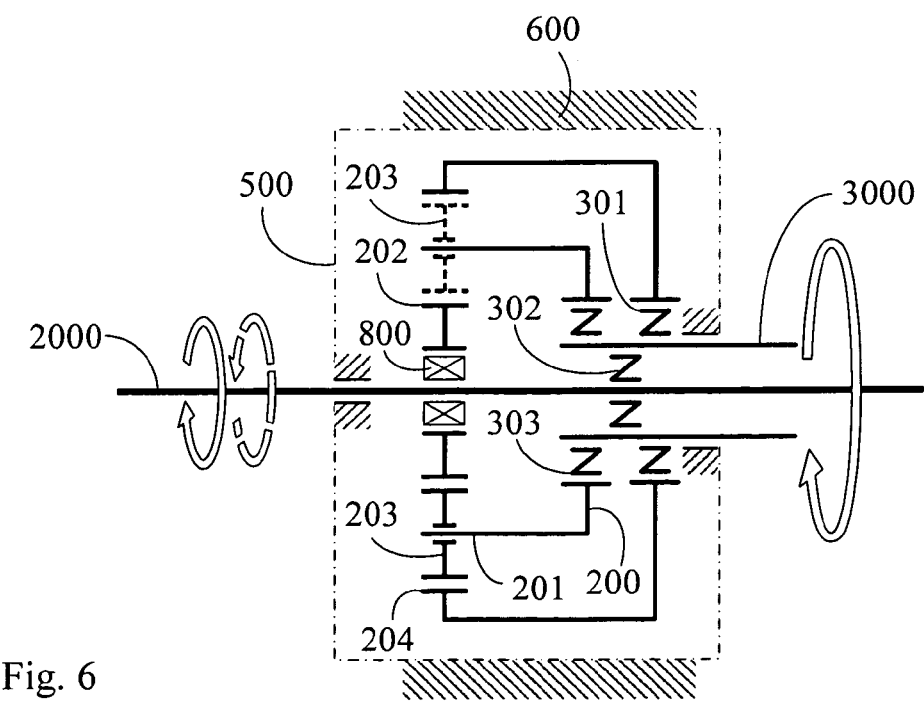
FIG. 6 is a structural schematic view showing the 6th embodiment of the retrograde torque limit gear train with bidirectional input and one-way output constituted by the planetary gear train, according to the present invention.

FIG. 6 is a structural schematic view showing the 6th embodiment of the retrograde torque limit gear train with bidirectional input and one-way output constituted by the planetary gear train, according to the present invention;

As shown in FIG. 6, the retrograde torque limit gear train with bidirectional input and one-way output is constituted by the planetary gear train with the input shaft and the output shaft coaxial fitting, the main components including:

one end of the input shaft (2000) is through installed at one side of the shell (500) via a bearing structure, while the other end of the input shaft (2000) perforates through the output shaft (3000) via the one-way transmission (302), and a bearing is installed between the output shaft (3000) and the shell (500);

the input shaft (2000) perforates through the sun wheel (202), and the torque limit transmission (800) is installed between the both;

the planetary wheel (203) is installed between the outer wheel (204) and the sun wheel (202); the center of the planetary wheel (203) rotates at the planetary wheel shaft (201); the planetary wheel shaft (201) is integrated with the planetary wheel support arm annular shelf (200) installed at the output shaft (3000); and the one-way transmission (303) is installed between the planetary wheel support arm annular shelf (200) and the output shaft (3000);

the ring structure of the outer wheel (204) is surrounded installed to the output shaft (3000) via the one-way transmission (301);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the sun wheel (202), the planetary wheel (203), and the outer wheel (204), and further through the one-way transmission (301) for driving the output shaft (3000) to produce the first rotary direction output to constitute the second transmission gear train;

the sun wheel (202), the planetary wheel (203), and the outer wheel (204) are constituted by gears or friction wheels;

the relation of the transmission ratio using the sun wheel (202) to drive the planetary wheel (203) includes acceleration, deceleration, or constant velocity;

the relation of the transmission ratio using the planetary wheel (203) to drive the outer wheel (204) is deceleration; and if the output shaft (3000) is driven at reverse rotary direction with the torque exceeding the rating overload torque of the torque limit transmission (800), the torque limit transmission (800) implements the operation of overload function.

Figure 7:
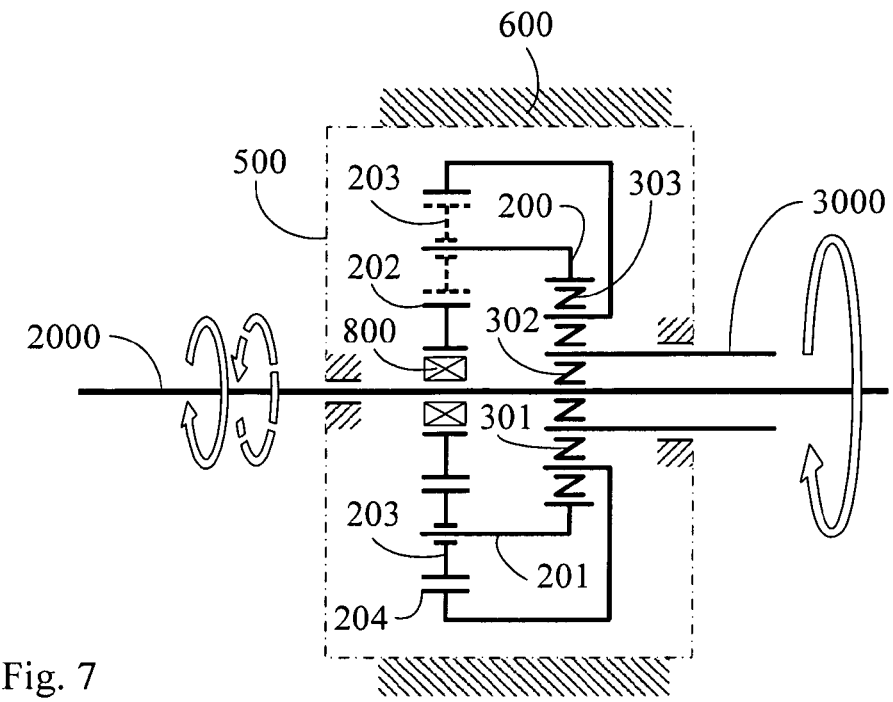
FIG. 7 is a structural schematic view showing the 7th embodiment of the retrograde torque limit gear train with bidirectional input and one-way output constituted by the planetary gear train, according to the present invention.

FIG. 7 is a structural schematic view showing the 7th embodiment of the retrograde torque limit gear train with bidirectional input and one-way output constituted by the planetary gear train, according to the present invention;

As shown in FIG. 7, the retrograde torque limit gear train with bidirectional input and one-way output is constituted by the planetary gear train with the input shaft and the output shaft coaxial fitting, the main components including:

one end of the input shaft (2000) is through installed at one side of the shell (500) via a bearing structure, while the other end of the input shaft (2000) perforates through the output shaft (3000) via the one-way transmission (302), and a bearing is installed between the output shaft (3000) and the shell (500);

the input shaft (2000) perforates through the sun wheel (202), and the torque limit transmission (800) is installed between the both;

the planetary wheel (203) is installed between the outer wheel (204) and the sun wheel (202); the center of the planetary wheel (203) rotates at the planetary wheel shaft (201); the planetary wheel shaft (201) is integrated with the planetary wheel support arm annular shelf (200); and the one-way transmission (303) is installed between the planetary wheel support arm annular shelf (200) and the ring structure of the outer wheel (204);

the ring structure of the outer wheel (204) is surrounded installed to the output shaft (3000) via the one-way transmission (301);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the sun wheel (202), the planetary wheel (203), and the outer wheel (204), and further through the one-way transmission (301) for driving the output shaft (3000) to produce the first rotary direction output to constitute the second transmission gear train;

the sun wheel (202), the planetary wheel (203), and the outer wheel (204) are constituted by gears or friction wheels;

the relation of the transmission ratio using the sun wheel (202) to drive the planetary wheel (203) includes acceleration, deceleration, or constant velocity;

the relation of the transmission ratio using the planetary wheel (203) to drive the outer wheel (204) is deceleration; and if the output shaft (3000) is driven at reverse rotary direction with the torque exceeding the rating overload torque of the torque limit transmission (800), the torque limit transmission (800) implements the operation of overload function.

Figure 8:
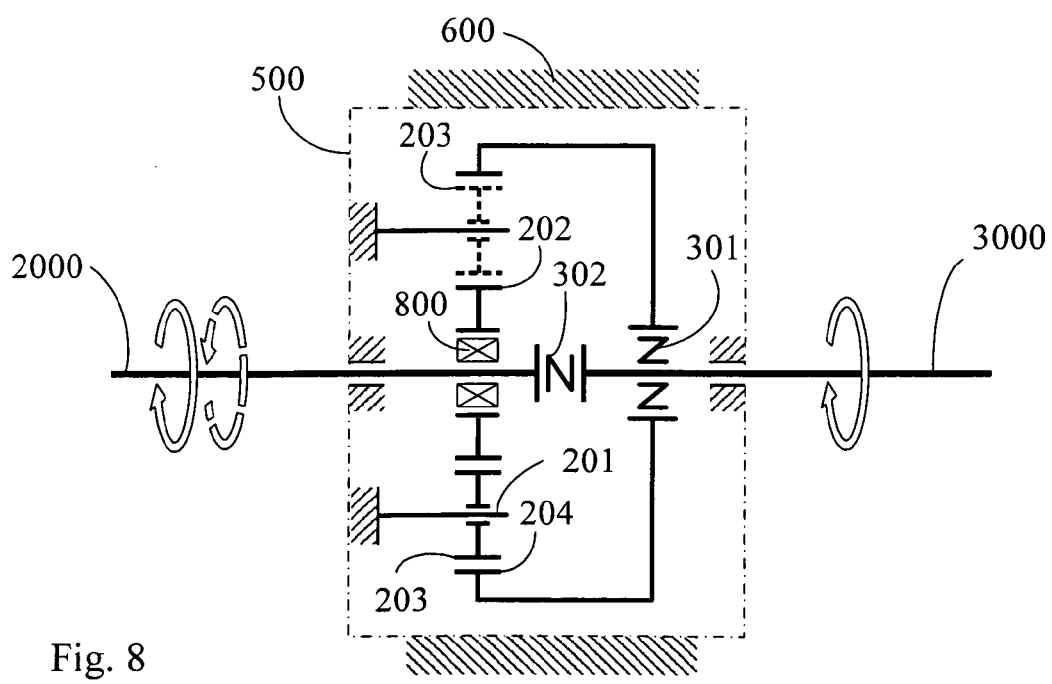
FIG. 8 is a structural schematic view showing the 8th embodiment of the retrograde torque limit gear train with bidirectional input and one-way output constituted by the planetary gear train, according to the present invention.

FIG. 8 is a structural schematic view showing the 8th embodiment of the retrograde torque limit gear train with bidirectional input and one-way output constituted by the planetary gear train, according to the present invention;

As shown in FIG. 8, the retrograde torque limit gear train with bidirectional input and one-way output is constituted by the planetary gear train with the input shaft and the output shaft coaxially installed in series, the main components including:

one end of the input shaft (2000) is through installed at one side of the shell (500) via a bearing structure, while the other end of the input shaft (2000) and the output shaft (3000) are coaxially installed in series via the one-way transmission (302), and a bearing is installed between the output shaft (3000) and the shell (500);

the input shaft (2000) perforates through the sun wheel (202), and the torque limit transmission (800) is installed between the both;

the planetary wheel (203) is installed between the outer wheel (204) and the sun wheel (202); the center of the planetary wheel (203) rotates at the planetary wheel shaft (201), and one end of the planetary wheel shaft (201) is fixed at the shell (500); the shell (500) is fixed at the machine body (600); the one-way transmission (301) is installed between the ring structure of the outer wheel (204) and the output shaft (3000);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the sun wheel (202) for further driving the planetary wheel (203) and the outer wheel (204), and through the ring structure of the outer wheel (204) and the one-way transmission (301) for driving the output shaft (3000) to produce the first rotary direction output to constitute the second transmission gear train;

the sun wheel (202), the planetary wheel (203), and the outer wheel (204) are constituted by gears or friction wheels;

the relation of the transmission ratio using the sun wheel (202) to drive the planetary wheel (203) includes acceleration, deceleration, or constant velocity;

the relation of the transmission ratio using the planetary wheel (203) to drive is deceleration; and if the output shaft (3000) is driven at reverse rotary direction with the torque exceeding the rating overload torque of the torque limit transmission (800), the torque limit transmission (800) implements the operation of overload function.

Figure 9:
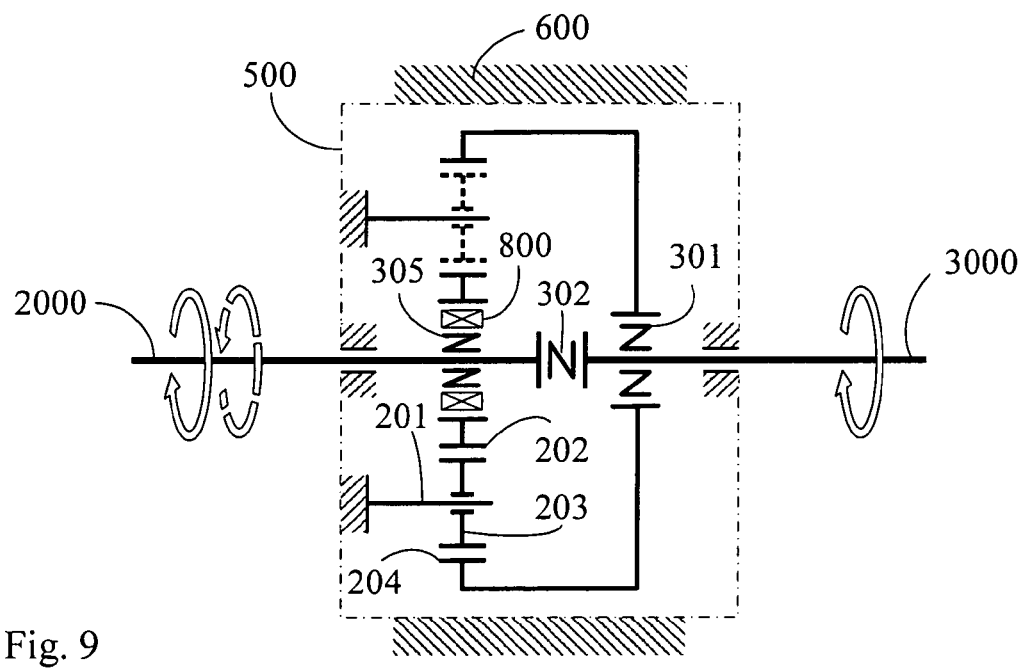
FIG. 9 is a structural schematic view showing the 9th embodiment of the retrograde torque limit gear train with bidirectional input and one-way output constituted by the planetary gear train, according to the present invention.

FIG. 9 is a structural schematic view showing the 9th embodiment of the retrograde torque limit gear train with bidirectional input and one-way output constituted by the planetary gear train, according to the present invention;

As shown in FIG. 9, the retrograde torque limit gear train with bidirectional input and one-way output is constituted by the planetary gear train with the input shaft and the output shaft coaxially installed in series, the main components including:

one end of the input shaft (2000) is through installed at one side of the shell (500) via a bearing structure, while the other end of the input shaft (2000) and the output shaft (3000) are coaxially installed in series via the one-way transmission (302), and a bearing is installed between the output shaft (3000) and the shell (500);

the input shaft (2000) perforates through the sun wheel (202), and the one-way transmission (305) and the torque limit transmission (800) are installed between the both;

the planetary wheel (203) is installed between the outer wheel (204) and the sun wheel (202); the center of the planetary wheel (203) rotates at the planetary wheel shaft (201), one end of the planetary wheel shaft (201) is fixed at the shell (500); the shell (500) is fixed at the machine body (600); and the one-way transmission (301) is installed between the ring structure of the outer wheel (204) and the output shaft (3000);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the one-way transmission (305) and the closed torque limit transmission (800) for driving the sun wheel (202) for further driving the planetary wheel (203) and the outer wheel (204), and through the ring structure of the outer wheel (204) and the one-way transmission (301) for driving the output shaft (3000) to produce the first rotary direction output to constitute the second transmission gear train;

the sun wheel (202), the planetary wheel (203), and the outer wheel (204) are constituted by gears or friction wheels;

the relation of the transmission ratio using the sun wheel (202) to drive the planetary wheel (203) includes acceleration, deceleration, or constant velocity;

the relation of the transmission ratio using the planetary wheel (203) to drive the outer wheel (204) is deceleration; and if the output shaft (3000) is driven at reverse rotary direction with the torque exceeding the rating overload torque of the torque limit transmission (800), the torque limit transmission (800) implements the operation of overload function.

Figure 10:
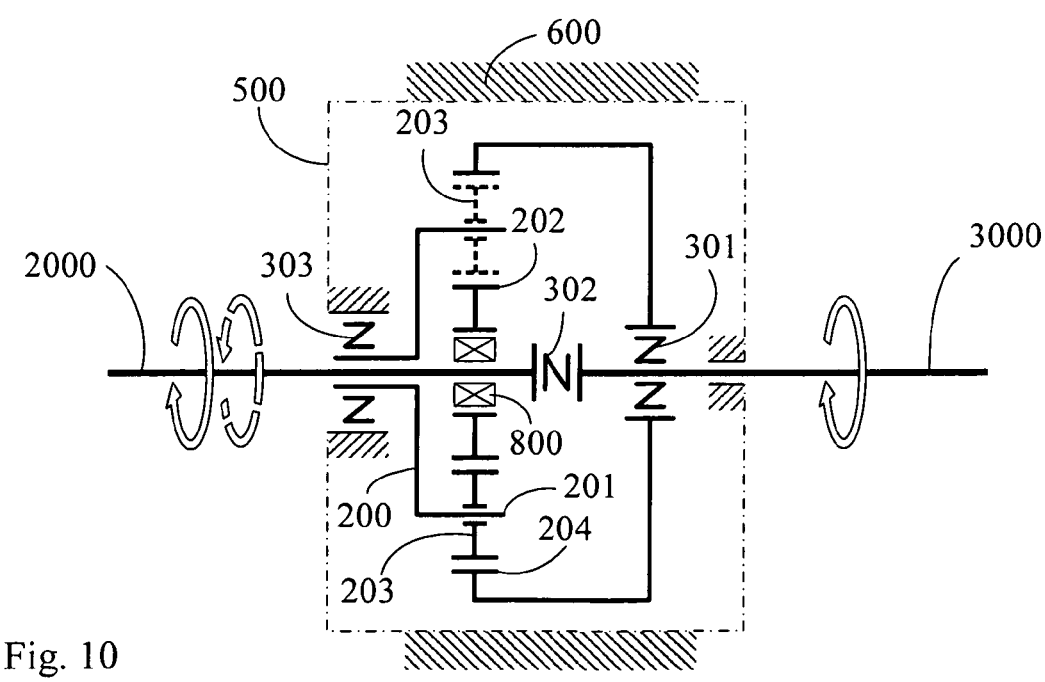
FIG. 10 is a structural schematic view showing the 10th embodiment of the retrograde torque limit gear train with bidirectional input and one-way output constituted by the planetary gear train, according to the present invention.

FIG. 10 is a structural schematic view showing the 10th embodiment of the retrograde torque limit gear train with bidirectional input and one-way output constituted by the planetary gear train, according to the present invention;

As shown in FIG. 10, the retrograde torque limit gear train with bidirectional input and one-way output is constituted by the planetary gear train with the input shaft and the output shaft coaxially installed in series, the main components including:

one end of the input shaft (2000) is through installed at the planetary wheel support arm annular shelf (200) via a bearing structure, the planetary wheel support arm annular shelf (200) is integrated at one side of the shell (500) via the one-way transmission (303), while the other end of the input shaft (2000) and the output shaft (3000) are coaxially installed in series via the one-way transmission (302), and a bearing is installed between the output shaft (3000) and the shell (500);

the input shaft (2000) perforates through the sun wheel (202), and the torque limit transmission (800) is installed between the both;

the planetary wheel (203) is installed between the outer wheel (204) and the sun wheel (202); the center of the planetary wheel (203) rotates at the planetary wheel shaft (201), and the planetary wheel shaft (201) is integrated with the planetary wheel support arm annular shelf (200);

the ring structure of the outer wheel (204) is surrounded installed to the output shaft (3000) via the one-way transmission (301);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the sun wheel (202), the planetary wheel (203), and the outer wheel (204), and further through the one-way transmission (301) for driving the output shaft (3000) to produce the first rotary direction output to constitute the second transmission gear train;

the sun wheel (202), the planetary wheel (203), and the outer wheel (204) are constituted by gears or friction wheels;

the relation of the transmission ratio using the sun wheel (202) to drive the planetary wheel (203) includes acceleration, deceleration, or constant velocity;

the relation of the transmission ratio using the planetary wheel (203) to drive the outer wheel (204) is deceleration; and if the output shaft (3000) is driven at reverse rotary direction with the torque exceeding the rating overload torque of the torque limit transmission (800), the torque limit transmission (800) implements the operation of overload function.

Figure 11:
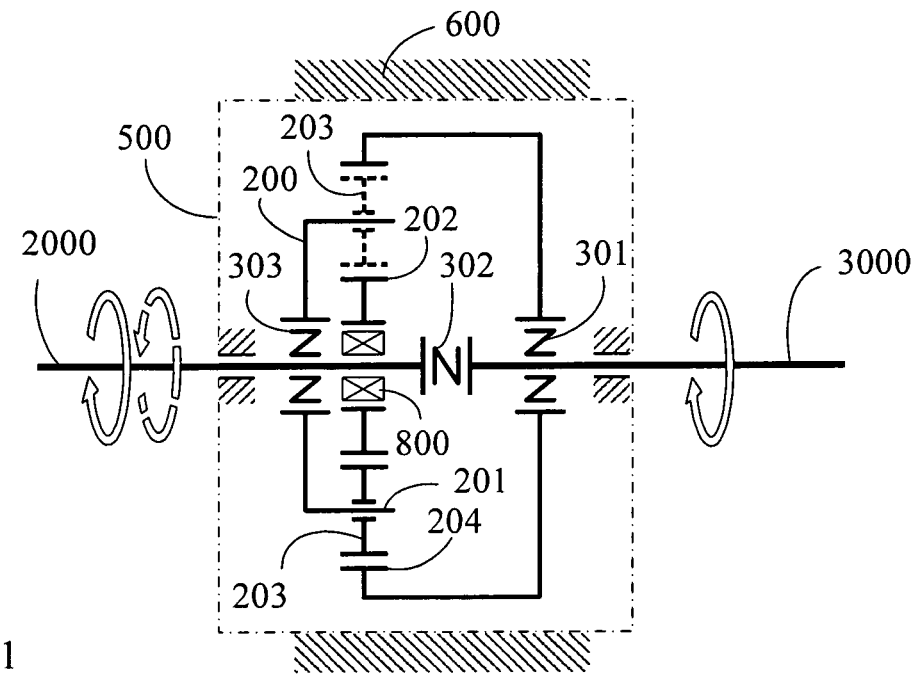
FIG. 11 is a structural schematic view showing the 11th embodiment of the retrograde torque limit gear train with bidirectional input and one-way output constituted by the planetary gear train, according to the present invention.

FIG. 11 is a structural schematic view showing the 11th embodiment of the retrograde torque limit gear train with bidirectional input and one-way output constituted by the planetary gear train, according to the present invention;

As shown in FIG. 11, the retrograde torque limit gear train with bidirectional input and one-way output is constituted by the planetary gear train with the input shaft and the output shaft coaxially installed in series, the main components including:
- one end of the input shaft (2000) is through installed at one side of the shell (500) via a bearing structure, while the other end of the input shaft (2000) and the output shaft (3000) are coaxially installed in series via the one-way transmission (302), and a bearing is installed between the output shaft (3000) and the shell (500);
- the input shaft (2000) perforates through the sun wheel (202), and the torque limit transmission (800) is installed between the both;
- the planetary wheel (203) is installed between the outer wheel (204) and the sun wheel (202); the center of the planetary wheel (203) rotates at the planetary wheel shaft (201), and the planetary wheel shaft (201) is integrated with the planetary wheel support arm annular shelf (200) near the shell (500); and the one-way transmission (303) is installed between the planetary wheel support arm annular shelf (200) and the input shaft (2000);
- the ring structure of the outer wheel (204) is surrounded installed to the output shaft (3000) via the one-way transmission (301);
- by way of the above structure, the input shaft (2000) is driven at the first rotary direction, and then through the one-way transmission (302) for driving the output shaft (3000) to produce the first rotary direction output to constitute the first transmission gear train;
- by way of the above structure, the input shaft (2000) is driven at the second rotary direction, and then through the closed torque limit transmission (800) for driving the sun wheel (202), the planetary wheel (203), and the outer wheel (204), and further through the one-way transmission (301) for driving the output shaft (3000) to produce the first rotary direction output to constitute the second transmission gear train;
- the sun wheel (202), the planetary wheel (203), and the outer wheel (204) are constituted by gears or friction wheels;
- the relation of the transmission ratio using the sun wheel (202) to drive the planetary wheel (203) includes acceleration, deceleration, or constant velocity;
- the relation of the transmission ratio using the planetary wheel (203) to drive the outer wheel (204) is deceleration; and
- if the output shaft (3000) is driven at reverse rotary direction with the torque exceeding the rating overload torque of the torque limit transmission (800), the torque limit transmission (800) implements the operation of overload function.

Figure 12:
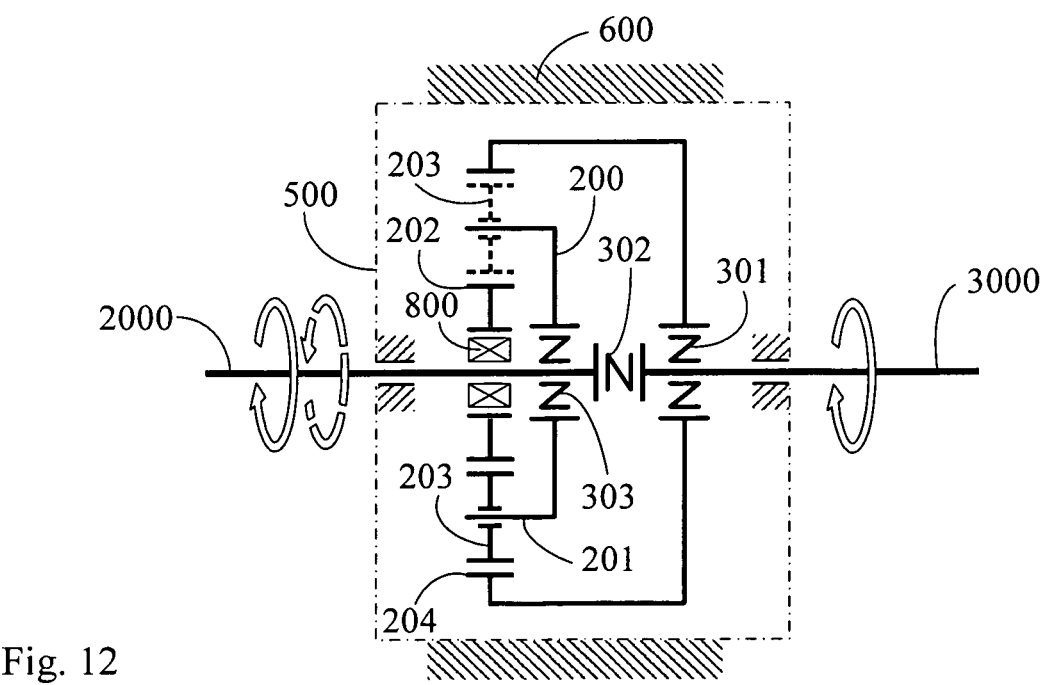
FIG. 12 is a structural schematic view showing the 12th embodiment of the retrograde torque limit gear train with bidirectional input and one-way output constituted by the planetary gear train, according to the present invention.

FIG. 12 is a structural schematic view showing the 12th embodiment of the retrograde torque limit gear train with bidirectional input and one-way output constituted by the planetary gear train, according to the present invention;

As shown in FIG. 12, the retrograde torque limit gear train with bidirectional input and one-way output is constituted by the planetary gear train with the input shaft and the output shaft coaxially installed in series, the main components including:
- one end of the input shaft (2000) is through installed at one side of the shell (500) via a bearing structure, while the other end of the input shaft (2000) and the output shaft (3000) are coaxially installed in series via the one-way transmission (302), and a bearing is installed between the output shaft (3000) and the shell (500);
- the input shaft (2000) perforates through the sun wheel (202), and the torque limit transmission (800) is installed between the both;
- the planetary wheel (203) is installed between the outer wheel (204) and the sun wheel (202); the center of the planetary wheel (203) rotates at the planetary wheel shaft (201); the planetary wheel shaft (201) is integrated with the planetary wheel support arm annular shelf (200) installed between the torque limit transmission (800) and the one-way transmission (302); and the one-way transmission (303) is installed between the planetary wheel support arm annular shelf (200) and the input shaft (2000);
- the ring structure of the outer wheel (204) is surrounded installed to the output shaft (3000) via the one-way transmission (301);
- by way of the above structure, the input shaft (2000) is driven at the first rotary direction, and then through the one-way transmission (302) for driving the output shaft (3000) to produce the first rotary direction output to constitute the first transmission gear train;
- by way of the above structure, the input shaft (2000) is driven at the second rotary direction, and then through the closed torque limit transmission (800) for driving the sun wheel (202), the planetary wheel (203), and the outer wheel (204), and further through the one-way transmission (301) for driving the output shaft (3000) to produce the first rotary direction output to constitute the second transmission gear train;
- the sun wheel (202), the planetary wheel (203), and the outer wheel (204) are constituted by gears or friction wheels;
- the relation of the transmission ratio using the sun wheel (202) to drive the planetary wheel (203) includes acceleration, deceleration, or constant velocity;
- the relation of the transmission ratio using the planetary wheel (203) to drive the outer wheel (204) is deceleration; and
- if the output shaft (3000) is driven at reverse rotary direction with the torque exceeding the rating overload torque of the torque limit transmission (800), the torque limit transmission (800) implements the operation of overload function.

Figure 13:
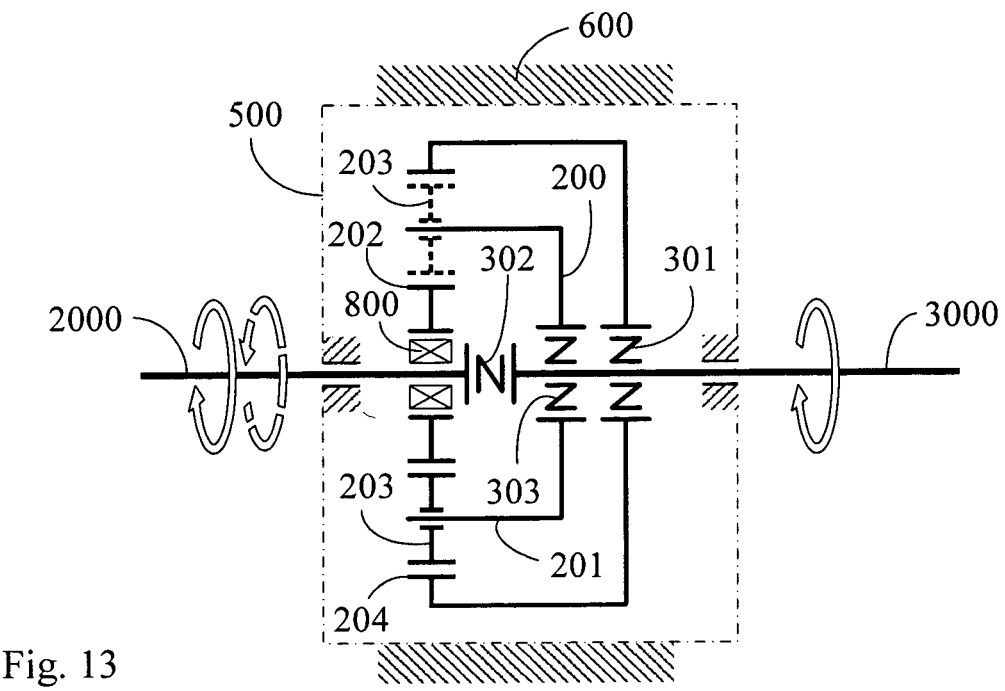
FIG. 13 is a structural schematic view showing the 13th embodiment of the retrograde torque limit gear train with bidirectional input and one-way output constituted by the planetary gear train, according to the present invention.

FIG. 13 is a structural schematic view showing the 13th embodiment of the retrograde torque limit gear train with bidirectional input and one-way output constituted by the planetary gear train, according to the present invention;

As shown in FIG. 13, the retrograde torque limit gear train with bidirectional input and one-way output is constituted by the planetary gear train with the input shaft and the output shaft coaxially installed in series, the main components including:
- one end of the input shaft (2000) is through installed at one side of the shell (500) via a bearing structure, while the other end of the input shaft (2000) and the output shaft (3000) are coaxially installed in series via the one-way transmission (302), and a bearing is installed between the output shaft (3000) and the shell (500);

the input shaft (2000) perforates through the sun wheel (202), and the torque limit transmission (800) is installed between the both;

the planetary wheel (203) is installed between the outer wheel (204) and the sun wheel (202); the center of the planetary wheel (203) rotates at the planetary wheel shaft (201); the planetary wheel shaft (201) is integrated with the planetary wheel support arm annular shelf (200) installed at the output shaft (3000); and the one-way transmission (303) is installed between the planetary wheel support arm annular shelf (200) and the output shaft (3000);

the ring structure of the outer wheel (204) is surrounded installed to the output shaft (3000) via the one-way transmission (301);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the sun wheel (202), the planetary wheel (203), and the outer wheel (204), and further through the one-way transmission (301) for driving the output shaft (3000) to produce the first rotary direction output to constitute the second transmission gear train;

the sun wheel (202), the planetary wheel (203), and the outer wheel (204) are constituted by gears or friction wheels;

the relation of the transmission ratio using the sun wheel (202) to drive the planetary wheel (203) includes acceleration, deceleration, or constant velocity;

the relation of the transmission ratio using the planetary wheel (203) to drive the outer wheel (204) is deceleration; and if the output shaft (3000) is driven at reverse rotary direction with the torque exceeding the rating overload torque of the torque limit transmission (800), the torque limit transmission (800) implements the operation of overload function.

Figure 14:
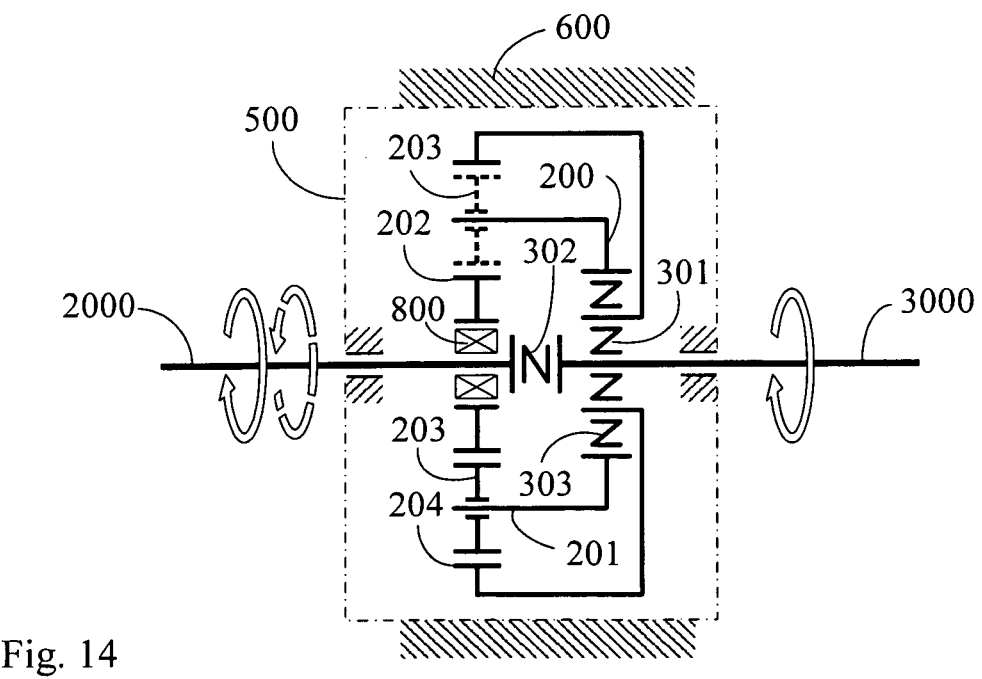
FIG. 14 is a structural schematic view showing the 14th embodiment of the retrograde torque limit gear train with bidirectional input and one-way output constituted by the planetary gear train, according to the present invention.

FIG. 14 is a structural schematic view showing the 14th embodiment of the retrograde torque limit gear train with bidirectional input and one-way output constituted by the planetary gear train, according to the present invention;

As shown in FIG. 14, the retrograde torque limit gear train with bidirectional input and one-way output is constituted by the planetary gear train with the input shaft and the output shaft coaxially installed in series, the main components including:

one end of the input shaft (2000) is through installed at one side of the shell (500) via a bearing structure, while the other end of the input shaft (2000) and the output shaft (3000) are coaxially installed in series via the one-way transmission (302), and a bearing is installed between the output shaft (3000) and the shell (500);

the input shaft (2000) perforates through the sun wheel (202), and the torque limit transmission (800) is installed between the both;

the planetary wheel (203) is installed between the outer wheel (204) and the sun wheel (202); the center of the planetary wheel (203) rotates at the planetary wheel shaft (201); the planetary wheel shaft (201) is integrated with the planetary wheel support arm annular shelf (200); and the one-way transmission (303) is installed between the planetary wheel support arm annular shelf (200) and the ring structure of the outer wheel (204);

the ring structure of the outer wheel (204) is surrounded installed to the output shaft (3000) via the one-way transmission (301);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the sun wheel (202), the planetary wheel (203), and the outer wheel (204), and further through the one-way transmission (301) for driving the output shaft (3000) to produce the first rotary direction output to constitute the second transmission gear train;

the sun wheel (202), the planetary wheel (203), and the outer wheel (204) are constituted by gears or friction wheels;

the relation of the transmission ratio using the sun wheel (202) to drive the planetary wheel (203) includes acceleration, deceleration, or constant velocity;

the relation of the transmission ratio using the planetary wheel (203) to drive the outer wheel (204) is deceleration; and if the output shaft (3000) is driven at reverse rotary direction with the torque exceeding the rating overload torque of the torque limit transmission (800), the torque limit transmission (800) implements the operation of overload function.

Figure 15:
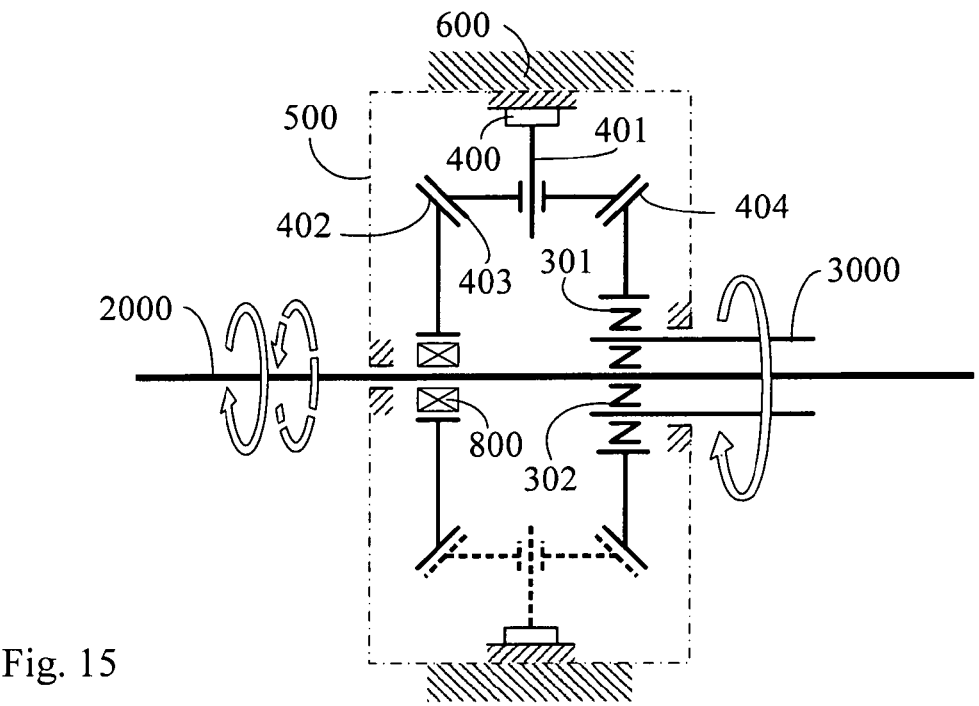
FIG. 15 is a structural schematic view showing the 1st embodiment of the retrograde torque limit gear train with bidirectional input and one-way output constituted by the epicyclic gear train, according to the present invention.

For B: as shown in FIGS. 15 to 28, the retrograde torque limit gear train with bidirectional input and one-way output is constituted by the epicyclic gear train, including:

FIG. 15 is a structural schematic view showing the 1st embodiment of the retrograde torque limit gear train with bidirectional input and one-way output constituted by the epicyclic gear train, according to the present invention;

As shown in FIG. 15, the retrograde torque limit gear train with bidirectional input and one-way output is constituted by the epicyclic gear train with the input shaft and the output shaft coaxial fitting, the main components including:

one end of the input shaft (2000) is through installed at one side of the shell (500) via a bearing structure, while the other end of the input shaft (2000) perforates through the output shaft (3000) via the one-way transmission (302), and a bearing is installed between the output shaft (3000) and the shell (500);

the input shaft (2000) perforates through an inner bevel wheel (402), and the torque limit transmission (800) is installed between the both;

a planetary wheel (403) is installed between an outer bevel wheel (404) and the inner bevel wheel (402); the center of the planetary wheel (403) rotates at a planetary wheel shaft (401), and one end of the planetary wheel shaft (401) is fixed at the shell (500) through the planetary wheel support arm annular shelf (400); the shell (500) is fixed at the machine body (600); the one-way transmission (301) is installed between the outer bevel wheel (404) and the output shaft (3000);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the inner bevel wheel (402) for further driving the planetary wheel (403) and the outer bevel wheel (404), and through the outer bevel wheel (404) and the one-way transmission (301) for driving the output shaft (3000) to produce the first rotary direction output to constitute the second transmission gear train;

the inner bevel wheel (402), the planetary wheel (403), and the outer bevel wheel (404) are constituted by gears or friction wheels;

the relation of the transmission ratio using the inner bevel wheel (402) to drive the planetary wheel (403) includes acceleration, deceleration, or constant velocity;

the relation of the transmission ratio using the planetary wheel (403) to drive the outer bevel wheel (404) includes acceleration, deceleration, or constant velocity; and if the output shaft (3000) is driven at reverse rotary direction with the torque exceeding the rating overload torque of the torque limit transmission (800), the torque limit transmission (800) implements the operation of overload function.

Figure 16:
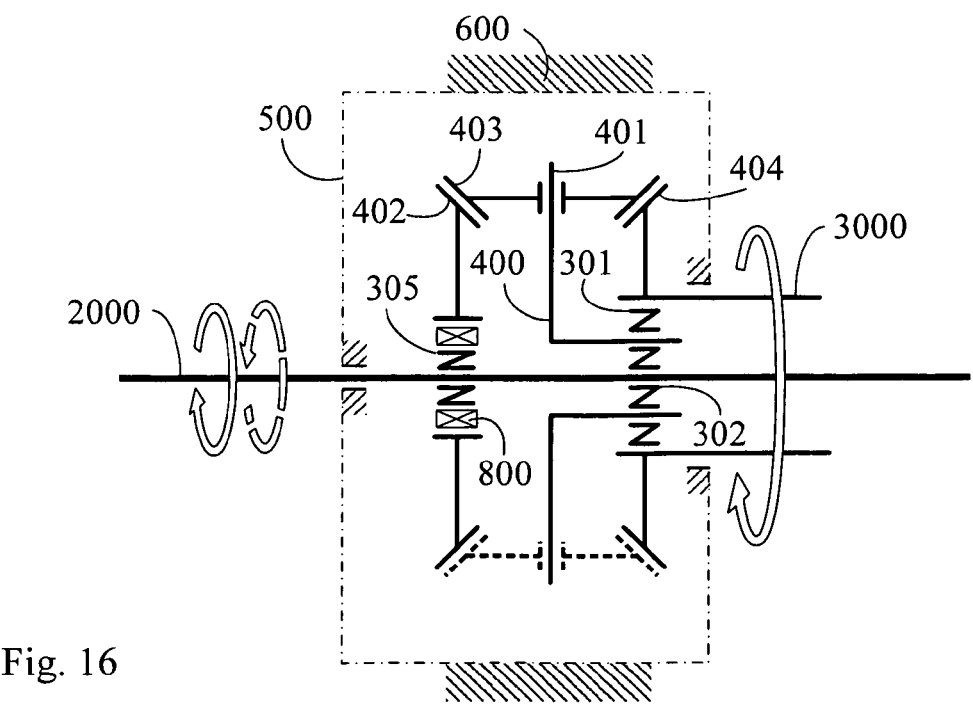
FIG. 16 is a structural schematic view showing the 2nd embodiment of the retrograde torque limit gear train with bidirectional input and one-way output constituted by the epicyclic gear train, according to the present invention.

FIG. 16 is a structural schematic view showing the 2nd embodiment of the retrograde torque limit gear train with bidirectional input and one-way output constituted by the epicyclic gear train, according to the present invention;

As shown in FIG. 16, the retrograde torque limit gear train with bidirectional input and one-way output is constituted by the epicyclic gear train with the input shaft and the output shaft coaxial fitting, the main components including:

one end of the input shaft (2000) is through installed at one side of the shell (500) via a bearing structure, while the other end of the input shaft (2000) perforates through the output shaft (3000) via the one-way transmission (303), a planetary wheel support arm annular shelf (400), and the one-way transmission (301), and a bearing is installed between the output shaft (3000) and the shell (500);

the input shaft (2000) perforates through the inner bevel wheel (402), and the one-way transmission (305) and the torque limit transmission (800) are installed between the both;

the planetary wheel (403) is installed between the outer bevel wheel (404) and the inner bevel wheel (402); the planetary wheel (403) rotates at the planetary wheel shaft (401); the planetary wheel shaft (401) is installed at the planetary wheel support arm annular shelf (400); the planetary wheel support arm annular shelf (400) is fitted between the one-way transmission (301) and the one-way transmission (302); and the one-way transmission (301) is installed between the outer bevel wheel (404) and the planetary wheel support arm annular shelf (400);

the shell (500) is fixed installed at the machine body (600);

by way of the above structure, the input shaft (2000) is driven at the first rotary direction, and then through the one-way transmission (302) and the one-way transmission (301) for driving the output shaft (3000) to produce the first rotary direction output to constitute the first transmission gear train;

by way of the above structure, the input shaft (2000) is driven at the second rotary direction, and then through the one-way transmission (305) and the closed torque limit transmission (800) for driving the planetary wheel (403) and the outer bevel wheel (404) for driving the output shaft (3000) to produce the first rotary direction output to constitute the second transmission gear train;

the inner bevel wheel (402), the planetary wheel (403), and the outer bevel wheel (404) are constituted by gears or friction wheels;

the relation of the transmission ratio using the inner bevel wheel (402) to drive the planetary wheel (403) includes acceleration, deceleration, or constant velocity;

the relation of the transmission ratio using the planetary wheel (403) to drive the outer bevel wheel (404) includes acceleration, deceleration, or constant velocity; and if the output shaft (3000) is driven at reverse rotary direction with the torque exceeding the rating overload torque of the torque limit transmission (800), the torque limit transmission (800) implements the operation of overload function.

Figure 17:
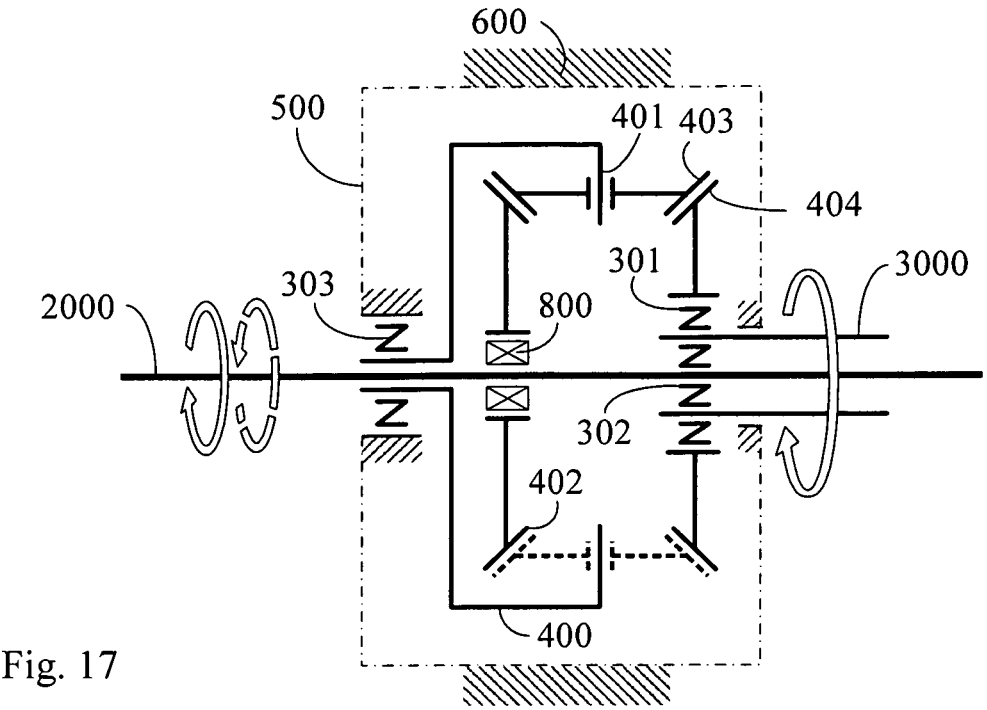
FIG. 17 is a structural schematic view showing the 3rd embodiment of the retrograde torque limit gear train with bidirectional input and one-way output constituted by the epicyclic gear train, according to the present invention.

FIG. 17 is a structural schematic view showing the 3rd embodiment of the retrograde torque limit gear train with bidirectional input and one-way output constituted by the epicyclic gear train, according to the present invention;

As shown in FIG. 17, the retrograde torque limit gear train with bidirectional input and one-way output is constituted by the epicyclic gear train with the input shaft and the output shaft coaxial fitting, the main components including:

one end of the input shaft (2000) is through installed at the planetary wheel support arm annular shelf (400) via a bearing structure, the planetary wheel support arm annular shelf (400) is integrated with one side of the shell (500) via the one-way transmission (303), while the other end of the input shaft (2000) perforates through the output shaft (3000) via the one-way transmission (302), and a bearing is installed between the output shaft (3000) and the shell (500);

the input shaft (2000) perforates through the inner bevel wheel (402), and the torque limit transmission (800) is installed between the both;

the planetary wheel (403) is installed between the outer bevel wheel (404) and the inner bevel wheel (402); the center of the planetary wheel (403) rotates at the planetary wheel shaft (401), and the planetary wheel shaft (401) is integrated with the planetary wheel support arm annular shelf (400);

the outer bevel wheel (404) is surrounded installed to at the output shaft (3000) via the one-way transmission (301);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the inner bevel wheel (402), the planetary wheel (403), and the outer bevel wheel (404), and further through the one-way transmission (301) for driving the output shaft (3000) to produce the first rotary direction output to constitute the second transmission gear train;

the inner bevel wheel (402), the planetary wheel (403), and the outer bevel wheel (404) are constituted by gears or friction wheels;

the relation of the transmission ratio using the inner bevel wheel (402) to drive the planetary wheel (403) includes acceleration, deceleration, or constant velocity;

the relation of the transmission ratio using the planetary wheel (403) to drive the outer bevel wheel (404) includes acceleration, deceleration, or constant velocity; and if the output shaft (3000) is driven at reverse rotary direction with the torque exceeding the rating overload torque of the torque limit transmission (800), the torque limit transmission (800) implements the operation of overload function.

Figure 18:
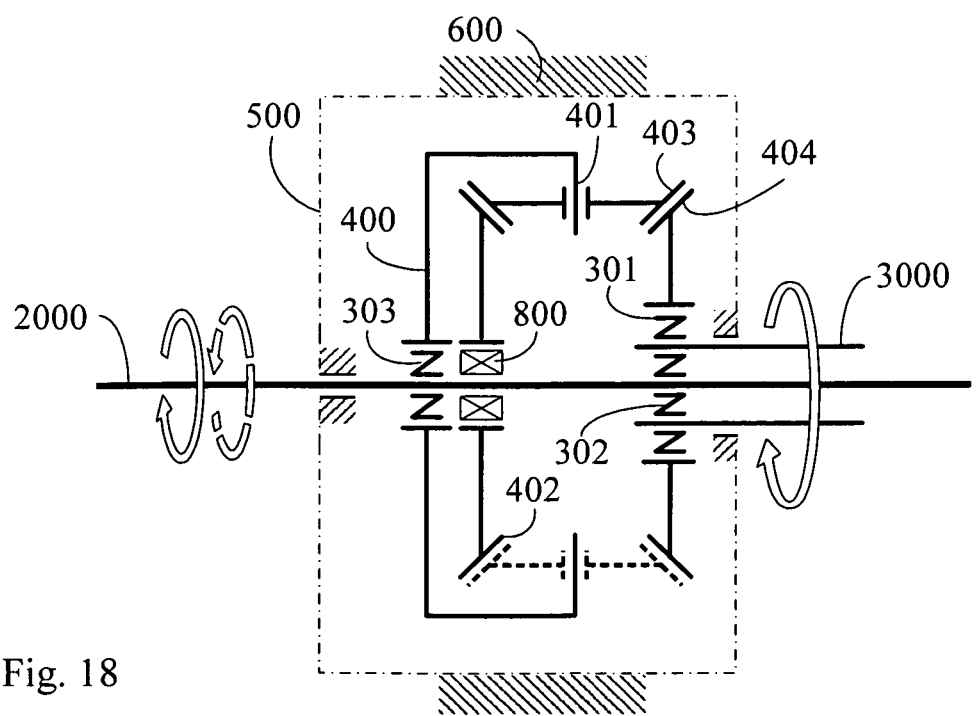
FIG. 18 is a structural schematic view showing the 4th embodiment of the retrograde torque limit gear train with bidirectional input and one-way output constituted by the epicyclic gear train, according to the present invention.

FIG. 18 is a structural schematic view showing the 4th embodiment of the retrograde torque limit gear train with bidirectional input and one-way output constituted by the epicyclic gear train, according to the present invention;

As shown in FIG. 18, the retrograde torque limit gear train with bidirectional input and one-way output is constituted by the epicyclic gear train with the input shaft and the output shaft coaxial fitting, the main components including:

one end of the input shaft (2000) is through installed at one side of the shell (500) via a bearing structure, while the other end of the input shaft (2000) perforates through the output shaft (3000) via the one-way transmission (302), and a bearing is installed between the output shaft (3000) and the shell (500);

the input shaft (2000) perforates through the inner bevel wheel (402), and the torque limit transmission (800) is installed between the both;

the planetary wheel (403) is installed between the outer bevel wheel (404) and the inner bevel wheel (402); the center of the planetary wheel (403) rotates at the planetary wheel shaft (401), and the planetary wheel shaft (401) is integrated with the planetary wheel support arm annular shelf (400) near the shell (500); and the one-way transmission (303) is installed between the planetary wheel support arm annular shelf (400) and the input shaft (2000);

the outer bevel wheel (404) is surrounded installed to the output shaft (3000) via the one-way transmission (301);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the inner bevel wheel (402), the planetary wheel (403), and the outer bevel wheel (404), and further through the one-way transmission (301) for driving the output shaft (3000) to produce the first rotary direction output to constitute the second transmission gear train;

the inner bevel wheel (402), the planetary wheel (403), and the outer bevel wheel (404) are constituted by gears or friction wheels;

the relation of the transmission ratio using the inner bevel wheel (402) to drive the planetary wheel (403) includes acceleration, deceleration, or constant velocity;

the relation of the transmission ratio using the planetary wheel (403) to drive the outer bevel wheel (404) includes acceleration, deceleration, or constant velocity; and if the output shaft (3000) is driven at reverse rotary direction with the torque exceeding the rating overload torque of the torque limit transmission (800), the torque limit transmission (800) implements the operation of overload function.

Figure 19:
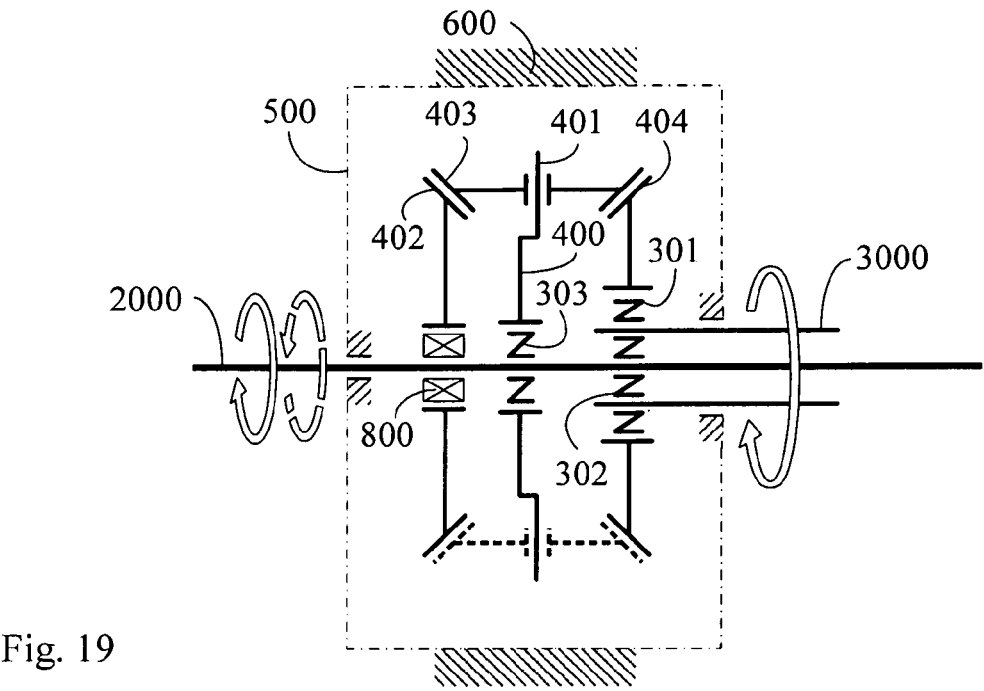
FIG. 19 is a structural schematic view showing the 5th embodiment of the retrograde torque limit gear train with bidirectional input and one-way output constituted by the epicyclic gear train, according to the present invention.

FIG. 19 is a structural schematic view showing the 5th embodiment of the retrograde torque limit gear train with bidirectional input and one-way output constituted by the epicyclic gear train, according to the present invention;

As shown in FIG. 19, the retrograde torque limit gear train with bidirectional input and one-way output is constituted by the epicyclic gear train with the input shaft and the output shaft coaxial fitting, the main components including:

one end of the input shaft (2000) is through installed at one side of the shell (500) via a bearing structure, while the other end of the input shaft (2000) perforates through the output shaft (3000) via the one-way transmission (302), and a bearing is installed between the output shaft (3000) and the shell (500);

the input shaft (2000) perforates through the inner bevel wheel (402), and the torque limit transmission (800) is installed between the both;

the planetary wheel (403) is installed between the outer bevel wheel (404) and the inner bevel wheel (402); the center of the planetary wheel (403) rotates at the planetary wheel shaft (401), and the planetary wheel shaft (401) is integrated with the planetary wheel support arm annular shelf (400) installed between the torque limit transmission (800) and the one-way transmission (302); and the one-way transmission (303) is installed between the planetary wheel support arm annular shelf (400) and the input shaft (2000);

the outer bevel wheel (404) is surrounded installed to the output shaft (3000) via the one-way transmission (301);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the inner bevel wheel (402), the planetary wheel (403), and the outer bevel wheel (404), and further through the one-way transmission (301) for driving the output shaft (3000) to produce the first rotary direction output to constitute the second transmission gear train;

the inner bevel wheel (402), the planetary wheel (403), and the outer bevel wheel (404) are constituted by gears or friction wheels;

the relation of the transmission ratio using the inner bevel wheel (402) to drive the planetary wheel (403) includes acceleration, deceleration, or constant velocity;

the relation of the transmission ratio using the planetary wheel (403) to drive the outer bevel wheel (404) includes acceleration, deceleration, or constant velocity; and if the output shaft (3000) is driven at reverse rotary direction with the torque exceeding the rating overload torque of the torque limit transmission (800), the torque limit transmission (800) implements the operation of overload function.

Figure 20:
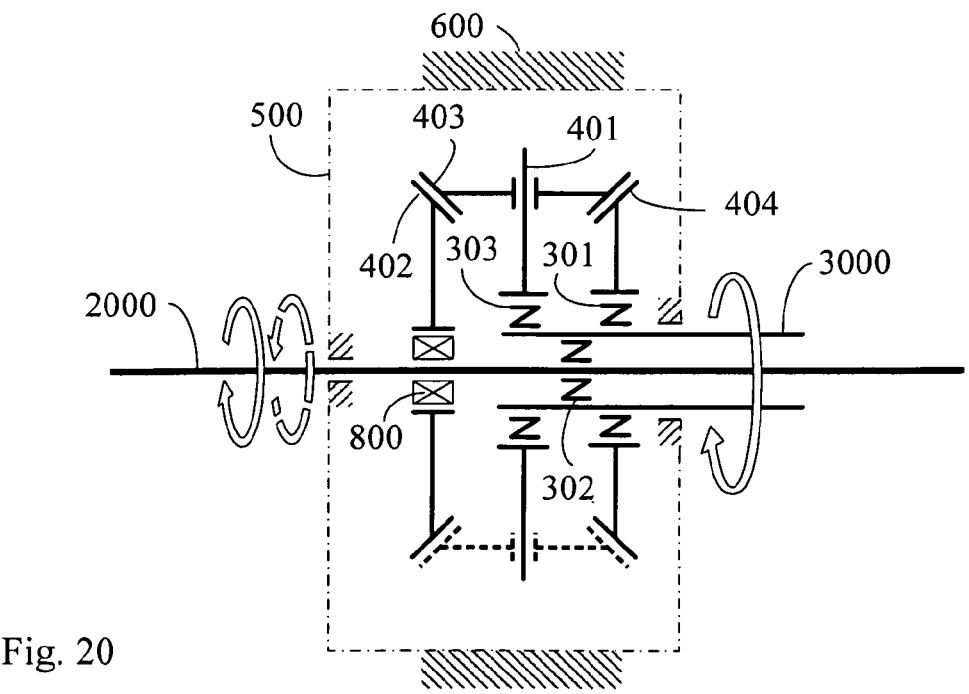
FIG. 20 is a structural schematic view showing the 6th embodiment of the retrograde torque limit gear train with bidirectional input and one-way output constituted by the epicyclic gear train, according to the present invention.

FIG. 20 is a structural schematic view showing the 6th embodiment of the retrograde torque limit gear train with bidirectional input and one-way output constituted by the epicyclic gear train, according to the present invention;

As shown in FIG. 20, the retrograde torque limit gear train with bidirectional input and one-way output is constituted by the epicyclic gear train with the input shaft and the output shaft coaxial fitting, the main components including:

one end of the input shaft (2000) is through installed at one side of the shell (500) via a bearing structure, while the other end of the input shaft (2000) perforates through the output shaft (3000) via the one-way transmission (302), and a bearing is installed between the output shaft (3000) and the shell (500);

the input shaft (2000) perforates through the inner bevel wheel (402), and the torque limit transmission (800) is installed between the both;

the planetary wheel (403) is installed between the outer bevel wheel (404) and the inner bevel wheel (402); the center of the planetary wheel (403) rotates at the planetary wheel shaft (401), and the planetary wheel shaft (401) is integrated with the planetary wheel support arm annular shelf (400) installed at the output shaft (3000); and the one-way transmission (303) is installed between the planetary wheel support arm annular shelf (400) and the output shaft (3000);

the outer bevel wheel (404) is surrounded installed to the output shaft (3000) via the one-way transmission (301);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the inner bevel wheel (402), the planetary wheel (403), and the outer bevel wheel (404), and further through the one-way transmission (301) for driving the output shaft (3000) to produce the first rotary direction output to constitute the second transmission gear train;

the inner bevel wheel (402), the planetary wheel (403), and the outer bevel wheel (404) are constituted by gears or friction wheels;

the relation of the transmission ratio using the inner bevel wheel (402) to drive the planetary wheel (403) includes acceleration, deceleration, or constant velocity;

the relation of the transmission ratio using the planetary wheel (403) to drive the outer bevel wheel (404) includes acceleration, deceleration, or constant velocity; and if the output shaft (3000) is driven at reverse rotary direction with the torque exceeding the rating overload torque of the torque limit transmission (800), the torque limit transmission (800) implements the operation of overload function.

Figure 21:
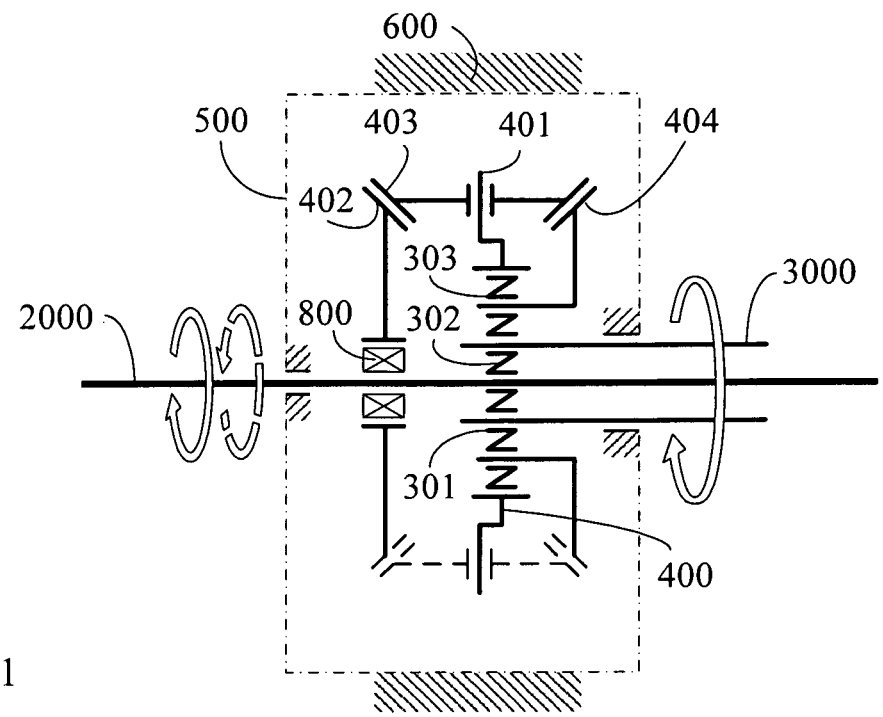
FIG. 21 is a structural schematic view showing the 7th embodiment of the retrograde torque limit gear train with bidirectional input and one-way output constituted by the epicyclic gear train, according to the present invention.

FIG. 21 is a structural schematic view showing the 7th embodiment of the retrograde torque limit gear train with bidirectional input and one-way output constituted by the epicyclic gear train, according to the present invention;

As shown in FIG. 21, the retrograde torque limit gear train with bidirectional input and one-way output is constituted by the epicyclic gear train with the input shaft and the output shaft coaxial fitting, the main components including:

one end of the input shaft (2000) is through installed at one side of the shell (500) via a bearing structure, while the other end of the input shaft (2000) perforates through the output shaft (3000) via the one-way transmission (302), and a bearing is installed between the output shaft (3000) and the shell (500);

the input shaft (2000) perforates through the inner bevel wheel (402), and the torque limit transmission (800) is installed between the both;

the planetary wheel (403) is installed between the outer bevel wheel (404) and the inner bevel wheel (402); the center of the planetary wheel (403) rotates at the planetary wheel shaft (401), and the planetary wheel shaft (401) is integrated with the planetary wheel support arm annular shelf (400); and the one-way transmission (303) is installed between the planetary wheel support arm annular shelf (400) and the outer bevel wheel (404);

the outer bevel wheel (404) is surrounded installed to the output shaft (3000) via the one-way transmission (301);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the inner bevel wheel (402), the planetary wheel (403), and the outer bevel wheel (404), and further through the one-way transmission (301) for driving the output shaft (3000) to produce the first rotary direction output to constitute the second transmission gear train;

the inner bevel wheel (402), the planetary wheel (403), and the outer bevel wheel (404) are constituted by gears or friction wheels;

the relation of the transmission ratio using the inner bevel wheel (402) to drive the planetary wheel (403) includes acceleration, deceleration, or constant velocity;

the relation of the transmission ratio using the planetary wheel (403) to drive the outer bevel wheel (404) includes acceleration, deceleration, or constant velocity; and if the output shaft (3000) is driven at reverse rotary direction with the torque exceeding the rating overload torque of the torque limit transmission (800), the torque limit transmission (800) implements the operation of overload function.

Figure 22:
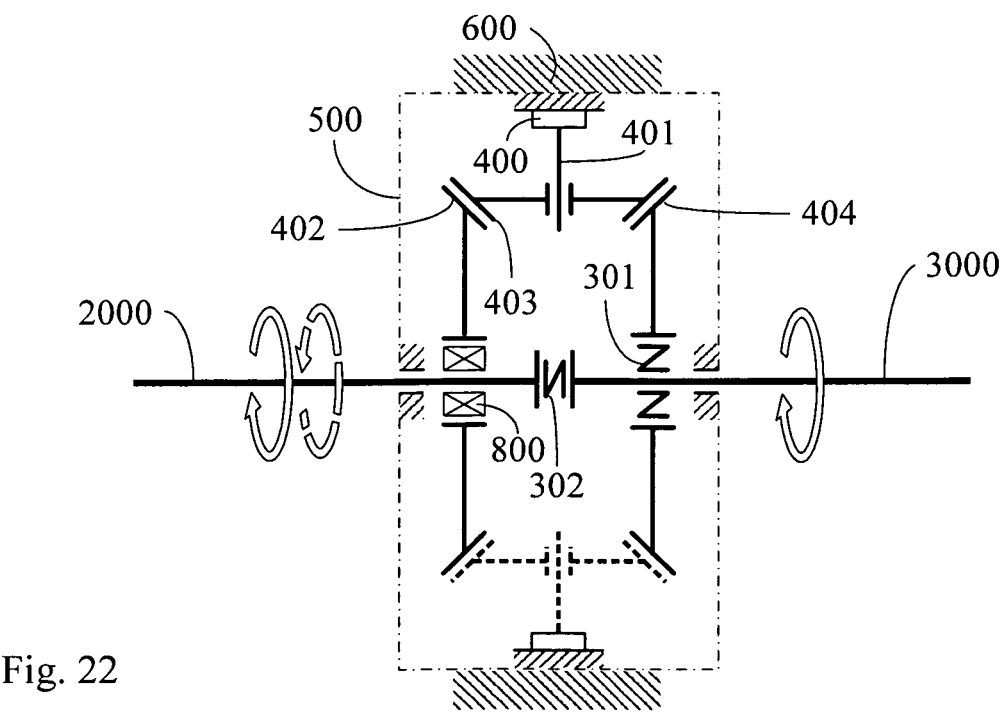
FIG. 22 is a structural schematic view showing the 8th embodiment of the retrograde torque limit gear train with bidirectional input and one-way output constituted by the epicyclic gear train, according to the present invention.

FIG. 22 is a structural schematic view showing the 8th embodiment of the retrograde torque limit gear train with bidirectional input and one-way output constituted by the epicyclic gear train, according to the present invention;

As shown in FIG. 22, the retrograde torque limit gear train with bidirectional input and one-way output is constituted by the epicyclic gear train with the input shaft and the output shaft coaxially installed in series, the main components including:

one end of the input shaft (2000) is through installed at one side of the shell (500) via a bearing structure, while the other end of the input shaft (2000) and the output shaft (3000) are coaxially installed in series via the one-way transmission (302), and a bearing is installed between the output shaft (3000) and the shell (500);

the input shaft (2000) perforates through an inner bevel wheel (402), and the torque limit transmission (800) is installed between the both;

a planetary wheel (403) is installed between an outer bevel wheel (404) and the inner bevel wheel (402); the center of the planetary wheel (403) rotates at a planetary wheel shaft (401), and one end of the planetary wheel shaft (401) is fixed at the shell (500) via the planetary wheel support arm annular shelf (400); the shell (500) is fixed at the machine body (600); the one-way transmission (301) is installed between the outer bevel wheel (404) and the output shaft (3000);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the inner bevel wheel (402) for further driving the planetary wheel (403) and the outer bevel wheel (404), and through the outer bevel wheel (404) and the one-way transmission (301) for driving the output shaft (3000) to produce the first rotary direction output to constitute the second transmission gear train;

the inner bevel wheel (402), the planetary wheel (403), and the outer bevel wheel (404) are constituted by gears or friction wheels;

the relation of the transmission ratio using the inner bevel wheel (402) to drive the planetary wheel (403) includes acceleration, deceleration, or constant velocity;

the relation of the transmission ratio using the planetary wheel (403) to drive the outer bevel wheel (404) includes acceleration, deceleration, or constant velocity; and if the output shaft (3000) is driven at reverse rotary direction with the torque exceeding the rating overload torque of the torque limit transmission (800), the torque limit transmission (800) implements the operation of overload function.

Figure 23:
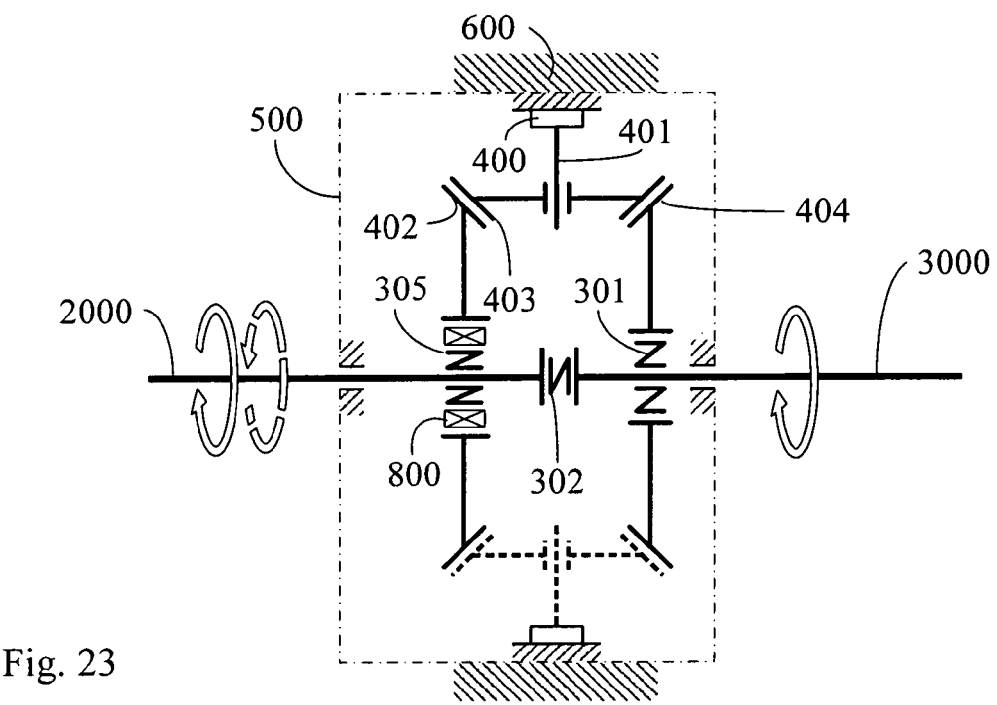
FIG. 23 is a structural schematic view showing the 9th embodiment of the retrograde torque limit gear train with bidirectional input and one-way output constituted by the epicyclic gear train, according to the present invention.

FIG. 23 is a structural schematic view showing the 9th embodiment of the retrograde torque limit gear train with bidirectional input and one-way output constituted by the epicyclic gear train, according to the present invention;

As shown in FIG. 23, the retrograde torque limit gear train with bidirectional input and one-way output is constituted by the epicyclic gear train with the input shaft and the output shaft coaxially installed in series, the main components including:

one end of the input shaft (2000) is through installed at one side of the shell (500) via a bearing structure, while the other end of the input shaft (2000) and the output shaft (3000) are coaxially installed in series via the one-way transmission (302), and a bearing is installed between the output shaft (3000) and the shell (500);

the input shaft (2000) perforates through an inner bevel wheel (402), and the one-way transmission (305) and the torque limit transmission (800) are installed between the both;

a planetary wheel (403) is installed between an outer bevel wheel (404) and the inner bevel wheel (402); the center of the planetary wheel (403) rotates at a planetary wheel shaft (401), and one end of the planetary wheel shaft (401) is fixed at the shell (500) via the planetary wheel support arm annular shelf (400); the shell (500) is fixed at the machine body (600); the one-way transmission (301) is installed between the outer bevel wheel (404) and the output shaft (3000);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the one-way transmission (305) and the closed torque limit transmission (800) for driving the inner bevel wheel (402) for further driving the planetary wheel (403) and the outer bevel wheel (404), and through the outer bevel wheel (404) and the one-way transmission (301) for driving the output shaft (3000) to produce the first rotary direction output to constitute the second transmission gear train;

the inner bevel wheel (402), the planetary wheel (403), and the outer bevel wheel (404) are constituted by gears or friction wheels;

the relation of the transmission ratio using the inner bevel wheel (402) to drive the planetary wheel (403) includes acceleration, deceleration, or constant velocity;

the relation of the transmission ratio using the planetary wheel (403) to drive the outer bevel wheel (404) includes acceleration, deceleration, or constant velocity; and if the output shaft (3000) is driven at reverse rotary direction with the torque exceeding the rating overload torque of the torque limit transmission (800), the torque limit transmission (800) implements the operation of overload function.

Figure 24:
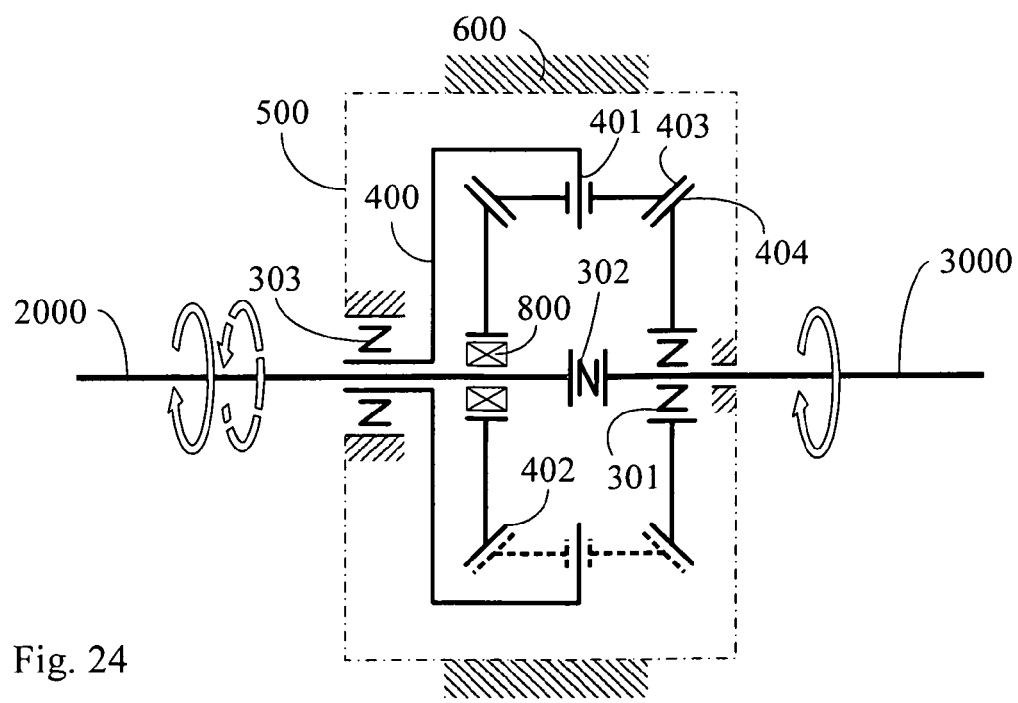
FIG. 24 is a structural schematic view showing the 10th embodiment of the retrograde torque limit gear train with bidirectional input and one-way output constituted by the epicyclic gear train, according to the present invention.

FIG. 24 is a structural schematic view showing the 10th embodiment of the retrograde torque limit gear train with bidirectional input and one-way output constituted by the epicyclic gear train, according to the present invention;

As shown in FIG. 24, the retrograde torque limit gear train with bidirectional input and one-way output is constituted by the epicyclic gear train with the input shaft and the output shaft coaxially installed in series, the main components including:

one end of the input shaft (2000) is through installed at the planetary wheel support arm annular shelf (400) via a bearing structure, the planetary wheel support arm annular shelf (400) is integrated with one side of the shell (500) via the one-way transmission (303), while the other end of the input shaft (2000) and the output shaft (3000) are coaxially installed in series via the one-way transmission (302), and a bearing is installed between the output shaft (3000) and the shell (500);

the input shaft (2000) perforates through the inner bevel wheel (402), and the torque limit transmission (800) is installed between the both;

the planetary wheel (403) is installed between the outer bevel wheel (404) and the inner bevel wheel (402); the center of the planetary wheel (403) rotates at the planetary wheel shaft (401), and the planetary wheel shaft (401) is integrated with the planetary wheel support arm annular shelf (400);

the outer bevel wheel (404) is surrounded installed to the output shaft (3000) via the one-way transmission (301);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the inner bevel wheel (402), the planetary wheel (403), and the outer bevel wheel (404), and further through the one-way transmission (301) for driving the output shaft (3000) to produce the first rotary direction output to constitute the second transmission gear train;

the inner bevel wheel (402), the planetary wheel (403), and the outer bevel wheel (404) are constituted by gears or friction wheels;

the relation of the transmission ratio using the inner bevel wheel (402) to drive the planetary wheel (403) includes acceleration, deceleration, or constant velocity;

the relation of the transmission ratio using the planetary wheel (403) to drive the outer bevel wheel (404) includes acceleration, deceleration, or constant velocity; and if the output shaft (3000) is driven at reverse rotary direction with the torque exceeding the rating overload torque of the torque limit transmission (800), the torque limit transmission (800) implements the operation of overload function.

Figure 25:
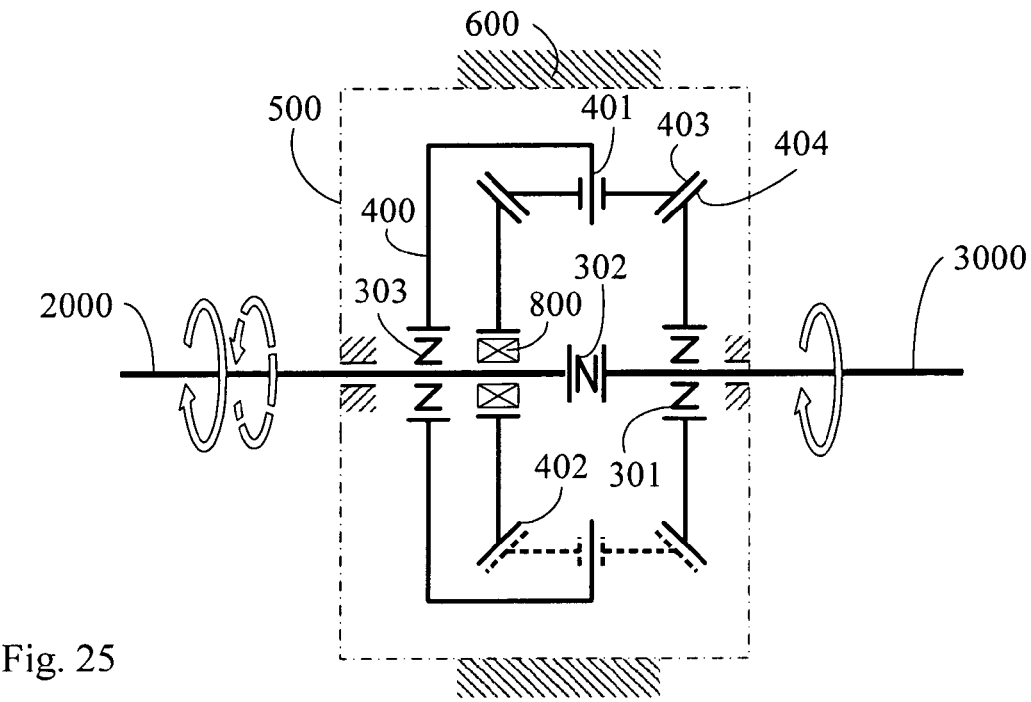
FIG. 25 is a structural schematic view showing the 11th embodiment of the retrograde torque limit gear train with bidirectional input and one-way output constituted by the epicyclic gear train, according to the present invention.

FIG. 25 is a structural schematic view showing the 11th embodiment of the retrograde torque limit gear train with bidirectional input and one-way output constituted by the epicyclic gear train, according to the present invention;

As shown in FIG. 25, the retrograde torque limit gear train with bidirectional input and one-way output is constituted by the epicyclic gear train with the input shaft and the output shaft coaxially installed in series, the main components including:

one end of the input shaft (2000) is through installed at one side of the shell (500) via a bearing structure, while the other end of the input shaft (2000) and the output shaft (3000) are coaxially installed in series via the one-way transmission (302), and a bearing is installed between the output shaft (3000) and the shell (500);

the input shaft (2000) perforates through the inner bevel wheel (402), and the torque limit transmission (800) is installed between the both;

the planetary wheel (403) is installed between the outer bevel wheel (404) and the inner bevel wheel (402); the center of the planetary wheel (403) rotates at the planetary wheel shaft (401), and the planetary wheel shaft (401) is integrated with the planetary wheel support arm annular shelf (400) near the shell (500); and the one-way transmission (303) is installed between the planetary wheel support arm annular shelf (400) and the input shaft (2000);

the outer bevel wheel (404) is surrounded installed to the output shaft (3000) via the one-way transmission (301);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the inner bevel wheel (402), the planetary wheel (403), and the outer bevel wheel (404), and further through the one-way transmission (301) for driving the output shaft (3000) to produce the first rotary direction output to constitute the second transmission gear train;

the inner bevel wheel (402), the planetary wheel (403), and the outer bevel wheel (404) are constituted by gears or friction wheels;

the relation of the transmission ratio using the inner bevel wheel (402) to drive the planetary wheel (403) includes acceleration, deceleration, or constant velocity;

the relation of the transmission ratio using the planetary wheel (403) to drive the outer bevel wheel (404) includes acceleration, deceleration, or constant velocity; and if the output shaft (3000) is driven at reverse rotary direction with the torque exceeding the rating overload torque of the torque limit transmission (800), the torque limit transmission (800) implements the operation of overload function.

Figure 26:
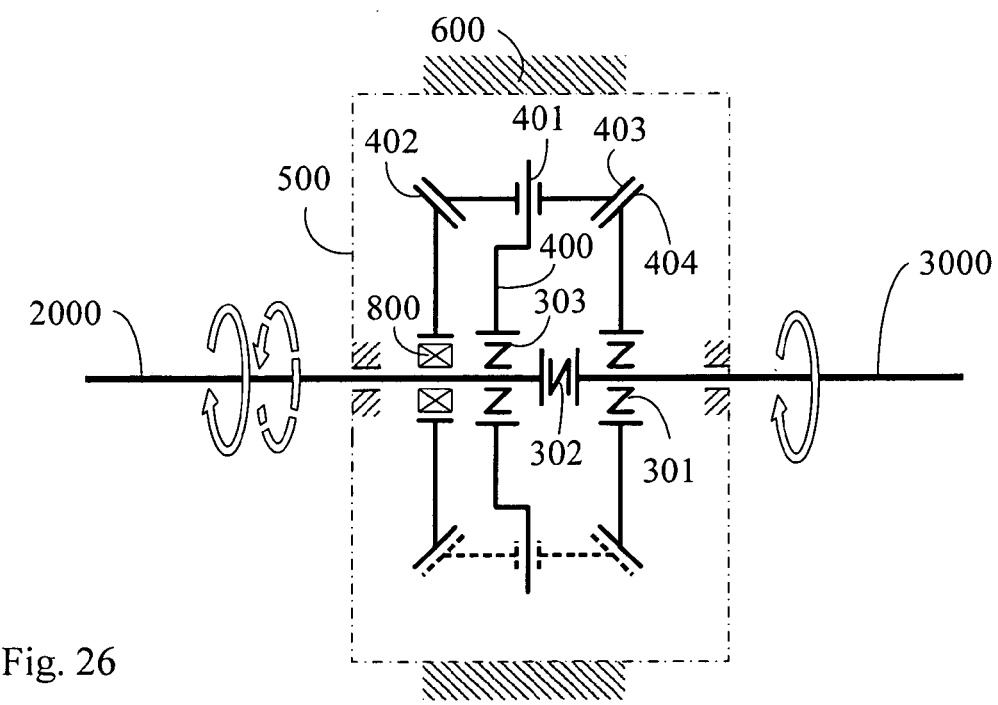
FIG. 26 is a structural schematic view showing the 12th embodiment of the retrograde torque limit gear train with bidirectional input and one-way output constituted by the epicyclic gear train, according to the present invention.

FIG. 26 is a structural schematic view showing the 12th embodiment of the retrograde torque limit gear train with bidirectional input and one-way output constituted by the epicyclic gear train, according to the present invention;

As shown in FIG. 26, the retrograde torque limit gear train with bidirectional input and one-way output is constituted by the epicyclic gear train with the input shaft and the output shaft coaxially installed in series, the main components including:

one end of the input shaft (2000) is through installed at one side of the shell (500) via a bearing structure, while the other end of the input shaft (2000) and the output shaft (3000) are coaxially installed in series via the one-way transmission (302), and a bearing is installed between the output shaft (3000) and the shell (500);

the input shaft (2000) perforates through the inner bevel wheel (402), and the torque limit transmission (800) is installed between the both;

the planetary wheel (403) is installed between the outer bevel wheel (404) and the inner bevel wheel (402); the center of the planetary wheel (403) rotates at the planetary wheel shaft (401), and the planetary wheel shaft (401) is integrated with the planetary wheel support arm annular shelf (400) installed between the torque limit transmission (800) and the one-way transmission (302); and the one-way transmission (303) is installed between the planetary wheel support arm annular shelf (400) and the input shaft (2000);

the outer bevel wheel (404) is surrounded installed to the output shaft (3000) via the one-way transmission (301);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the inner bevel wheel (402), the planetary wheel (403), and the outer bevel wheel (404), and further through the one-way transmission (301) for driving the output shaft (3000) to produce the first rotary direction output to constitute the second transmission gear train;

the inner bevel wheel (402), the planetary wheel (403), and the outer bevel wheel (404) are constituted by gears or friction wheels;

the relation of the transmission ratio using the inner bevel wheel (402) to drive the planetary wheel (403) includes acceleration, deceleration, or constant velocity;

the relation of the transmission ratio using the planetary wheel (403) to drive the outer bevel wheel (404) includes acceleration, deceleration, or constant velocity; and if the output shaft (3000) is driven at reverse rotary direction with the torque exceeding the rating overload torque of the torque limit transmission (800), the torque limit transmission (800) implements the operation of overload function.

Figure 27:
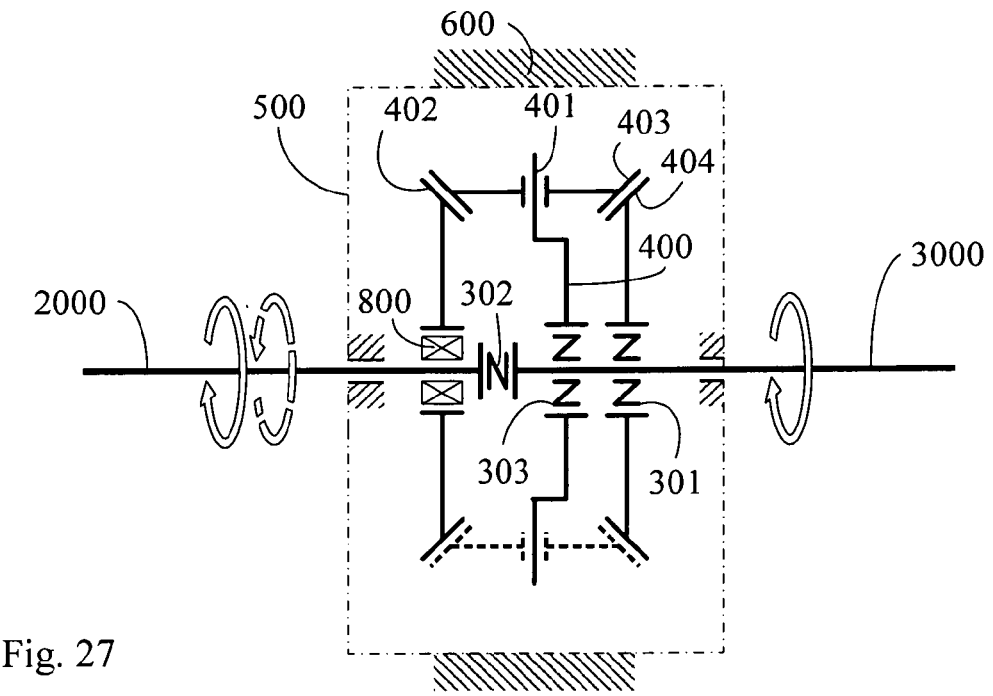
FIG. 27 is a structural schematic view showing the 13th embodiment of the retrograde torque limit gear train with bidirectional input and one-way output constituted by the epicyclic gear train, according to the present invention.

FIG. 27 is a structural schematic view showing the 13th embodiment of the retrograde torque limit gear train with bidirectional input and one-way output constituted by the epicyclic gear train, according to the present invention;

As shown in FIG. 27, the retrograde torque limit gear train with bidirectional input and one-way output is constituted by the epicyclic gear train with the input shaft and the output shaft coaxially installed in series, the main components including:

one end of the input shaft (2000) is through installed at one side of the shell (500) via a bearing structure, while the other end of the input shaft (2000) and the output shaft (3000) are coaxially installed in series via the one-way transmission (302), and a bearing is installed between the output shaft (3000) and the shell (500);

the input shaft (2000) perforates through the inner bevel wheel (402), and the torque limit transmission (800) is installed between the both;

the planetary wheel (403) is installed between the outer bevel wheel (404) and the inner bevel wheel (402); the center of the planetary wheel (403) rotates at the planetary wheel shaft (401), and the planetary wheel shaft (401) is integrated with the planetary wheel support arm annular shelf (400) installed at the output shaft (3000);

and the one-way transmission (303) is installed between the planetary wheel support arm annular shelf (400) and the output shaft (3000);

the outer bevel wheel (404) is surrounded installed to the output shaft (3000) via the one-way transmission (301);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the inner bevel wheel (402), the planetary wheel (403), and the outer bevel wheel (404), and further through the one-way transmission (301) for driving the output shaft (3000) to produce the first rotary direction output to constitute the second transmission gear train;

the inner bevel wheel (402), the planetary wheel (403), and the outer bevel wheel (404) are constituted by gears or friction wheels;

the relation of the transmission ratio using the inner bevel wheel (402) to drive the planetary wheel (403) includes acceleration, deceleration, or constant velocity;

the relation of the transmission ratio using the planetary wheel (403) to drive the outer bevel wheel (404) includes acceleration, deceleration, or constant velocity; and if the output shaft (3000) is driven at reverse rotary direction with the torque exceeding the rating overload torque of the torque limit transmission (800), the torque limit transmission (800) implements the operation of overload function.

Figure 28:
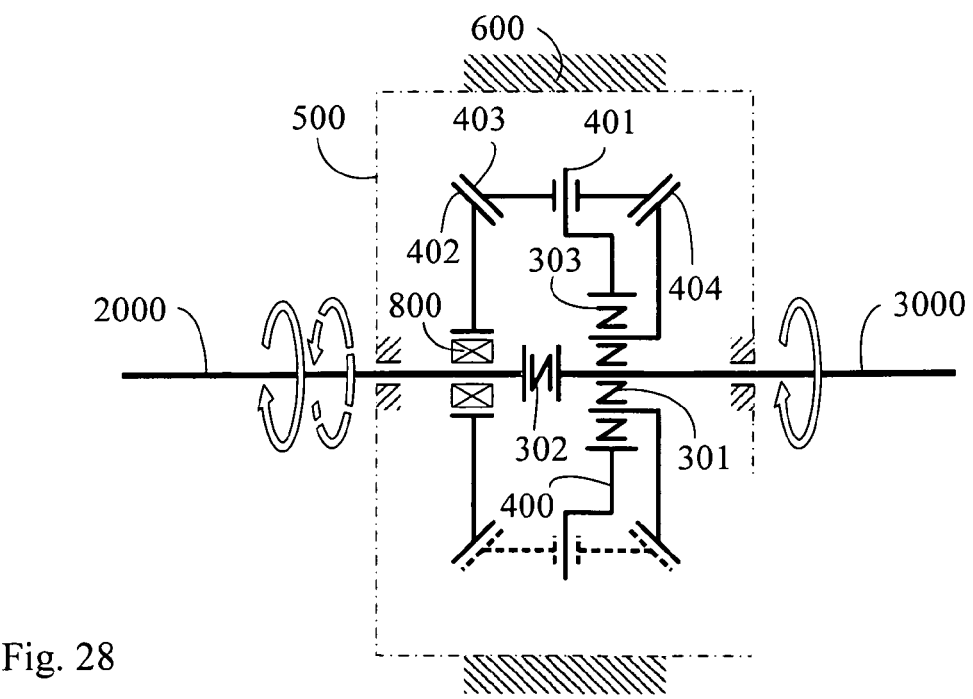
FIG. 28 is a structural schematic view showing the 14th embodiment of the retrograde torque limit gear train with bidirectional input and one-way output constituted by the epicyclic gear train, according to the present invention.

FIG. 28 is a structural schematic view showing the 14th embodiment of the retrograde torque limit gear train with bidirectional input and one-way output constituted by the epicyclic gear train, according to the present invention;

As shown in FIG. 28, the retrograde torque limit gear train with bidirectional input and one-way output is constituted by the epicyclic gear train with the input shaft and the output shaft coaxially installed in series, the main components including:

one end of the input shaft (2000) is through installed at one side of the shell (500) via a bearing structure, while the other end of the input shaft (2000) and the output shaft (3000) are coaxially installed in series via the one-way transmission (302), and a bearing is installed between the output shaft (3000) and the shell (500);

the input shaft (2000) perforates through the inner bevel wheel (402), and the torque limit transmission (800) is installed between the both;

the planetary wheel (403) is installed between the outer bevel wheel (404) and the inner bevel wheel (402); the center of the planetary wheel (403) rotates at the planetary wheel shaft (401), and the planetary wheel shaft (401) is integrated with the planetary wheel support arm annular shelf (400); and the one-way transmission (303) is installed between the planetary wheel support arm annular shelf (400) and the outer bevel wheel (404);

the outer bevel wheel (404) is surrounded installed to the output shaft (3000) via the one-way transmission (301);

by way of the above structure, the input shaft (2000) is driven at the first rotary direction, and then through the one-way transmission (302) for driving the output shaft (3000) to produce the first rotary direction output to constitute the first transmission gear train;

by way of the above structure, the input shaft (2000) is driven at the second rotary direction, and then through the closed torque limit transmission (800) for driving the inner bevel wheel (402), the planetary wheel (403), and the outer bevel wheel (404), and further through the one-way transmission (301) for driving the output shaft (3000) to produce the first rotary direction output to constitute the second transmission gear train;

the inner bevel wheel (402), the planetary wheel (403), and the outer bevel wheel (404) are constituted by gears or friction wheels;

the relation of the transmission ratio using the inner bevel wheel (402) to drive the planetary wheel (403) includes acceleration, deceleration, or constant velocity;

the relation of the transmission ratio using the planetary wheel (403) to drive the outer bevel wheel (404) includes acceleration, deceleration, or constant velocity; and if the output shaft (3000) is driven at reverse rotary direction with the torque exceeding the rating overload torque of the torque limit transmission (800), the torque limit transmission (800) implements the operation of overload function.

Figure 29:
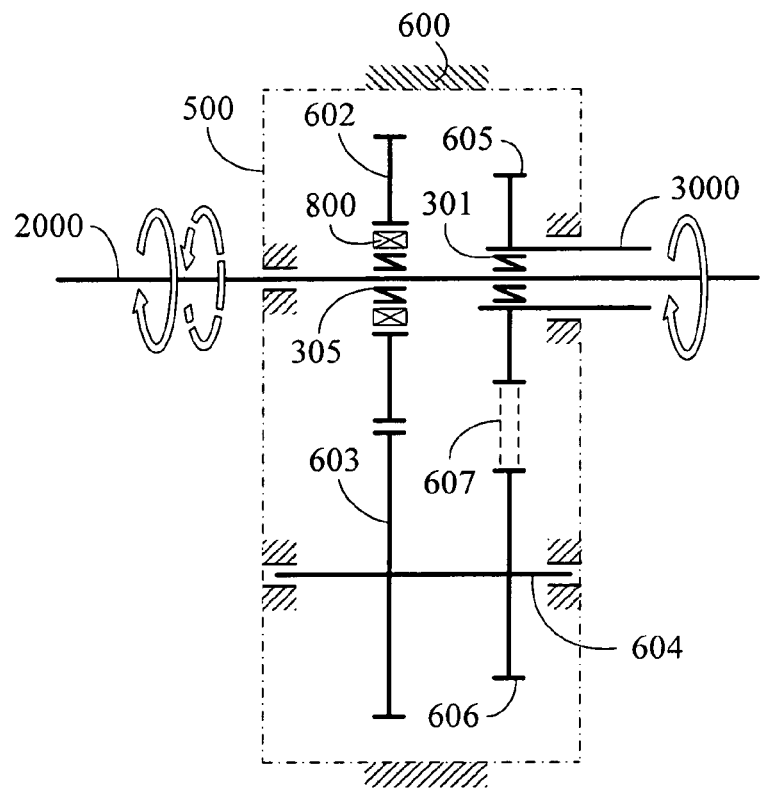
FIG. 29 is a structural schematic view showing the 1st embodiment of the retrograde torque limit gear train with bidirectional input and one-way output constituted by integrating with the transmissions with different drive rotary directions, according to the present invention.

For C: as shown in FIGS. 29 to 40, the retrograde torque limit gear train with bidirectional input and one-way output is constituted by integrating with the transmissions with different drive rotary directions, including:

FIG. 29 is a structural schematic view showing the 1st embodiment of the retrograde torque limit gear train with bidirectional input and one-way output constituted by integrating with the transmissions with different drive rotary directions, according to the present invention.

As shown in FIG. 29, the retrograde torque limit gear train with bidirectional input and one-way output is constituted by integrating with the transmissions with different drive rotary directions with the input shaft and the output shaft coaxial fitting, the main components including:

one end of the input shaft (2000) is through installed at one side of the shell (500) via a bearing structure, while the other end of the input shaft (2000) perforates through the output shaft (3000) via the one-way transmission (301), a bearing is installed between the output shaft (3000) and the shell (500), and the shell (500) is fixed at the machine body (600);

the input shaft (2000) perforates through a driving wheel (602), and the one-way transmission (305) and the torque limit transmission (800) are installed between the both;

the rotary direction of the driving wheel (602) is different from that of a driving wheel (603), the driving wheel (603) and a driving wheel (606) are co-integrated with a revolving shaft (604), and a bearing is installed between the revolving shaft (604) and the shell (500);

the driving wheel (606) and the driving wheel (605) are co-integrated with pulleys, or sprockets, or internal gears, for constituting a driving wheel set with the same rotary direction;

the driving wheel (605) is integrated with the output shaft (3000);

by way of the above structure, the input shaft (2000) is driven at the first rotary direction, and then through the one-way transmission (301) for driving the output shaft (3000) to produce the first rotary direction output to constitute the first transmission gear train;

by way of the above structure, the input shaft (2000) is driven at the second rotary direction, and then through the one-way transmission (305) and the closed torque limit transmission (800) for driving the driving wheel (602), and through the driving wheel (602) driving the driving wheel (603) and the driving wheel (606), and further through the driving wheel (606) driving the driving wheel (605) for driving the output shaft (3000) to produce the first rotary direction output to constitute the second transmission gear train;

the driving wheels (602), (603), (605), and (606) are constituted by gears, or friction wheels, or pulleys, or sprockets;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction includes equipped with the transmission belt, pulley such as toothed belt or steel belt, or equipped with the sprocket with chain, or constituted by the internal gear set; and if the output shaft (3000) is driven at reverse rotary direction with the torque exceeding the rating overload torque of the torque limit transmission (800), the torque limit transmission (800) implements the operation of overload function.

Figure 30:
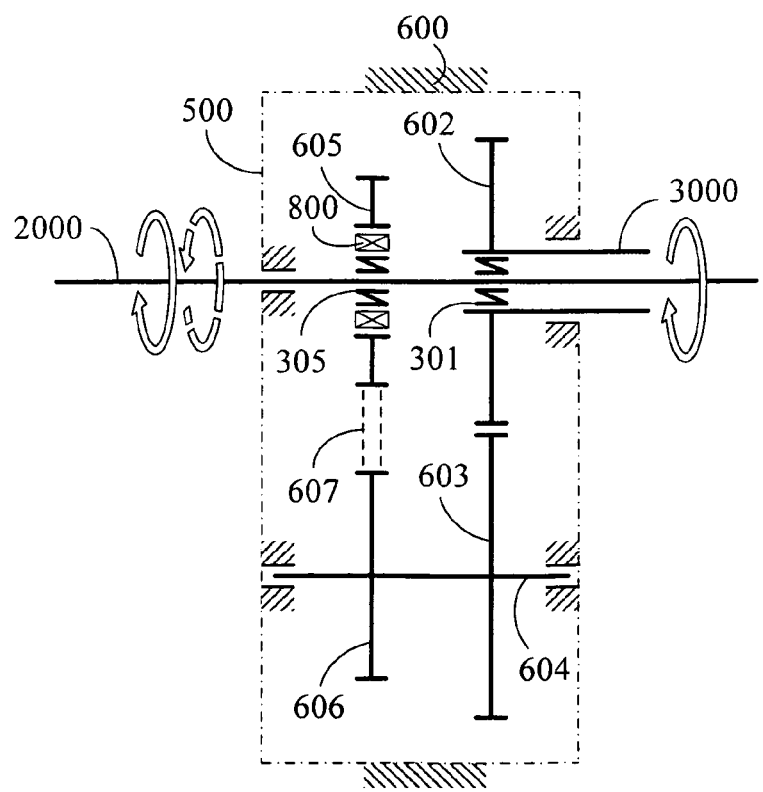
FIG. 30 is a structural schematic view showing the 2nd embodiment of the retrograde torque limit gear train with bidirectional input and one-way output constituted by integrating with the transmissions with different drive rotary directions, according to the present invention.

FIG. 30 is a structural schematic view showing the 2nd embodiment of the retrograde torque limit gear train with bidirectional input and one-way output constituted by integrating with the transmissions with different drive rotary directions, according to the present invention.

As shown in FIG. 30, the retrograde torque limit gear train with bidirectional input and one-way output is constituted by integrating with the transmissions with different drive rotary directions with the input shaft and the output shaft coaxial fitting, the main components including:

one end of the input shaft (2000) is through installed at one side of the shell (500) via a bearing structure, while the other end of the input shaft (2000) perforates through the output shaft (3000) via the one-way transmission (301), a bearing is installed between the output shaft (3000) and the shell (500), and the shell (500) is fixed at the machine body (600);

the input shaft (2000) perforates through the driving wheel (605), and the one-way transmission (305) and the torque limit transmission (800) are installed between the both;

the rotary direction of the driving wheel (605) is the same as that of the driving wheel (606), the driving wheel (606) and the driving wheel (603) are co-integrated with the revolving shaft (604), and a bearing is installed between the revolving shaft (604) and the shell (500);

the driving wheel (606) and the driving wheel (605) are co-integrated with pulleys, or sprockets, or internal gears, for constituting a driving wheel set with the same rotary direction;

the rotary direction of the driving wheel (602) is different from that of the driving wheel (603);

the driving wheel (605) is integrated with the output shaft (3000);

by way of the above structure, the input shaft (2000) is driven at the first rotary direction, and then through the one-way transmission (301) for driving the output shaft (3000) to produce the first rotary direction output to constitute the first transmission gear train;

by way of the above structure, the input shaft (2000) is driven at the second rotary direction, and then through the one-way transmission (305) and the closed torque limit transmission (800) for driving the driving wheel (605), and through the driving wheel (605) driving the driving wheel (606) and the driving wheel (603), and further through the driving wheel (603) driving the driving wheel (602) for driving the output shaft (3000) to produce the first rotary direction output to constitute the second transmission gear train;

the driving wheels (602), (603), (605), and (606) are constituted by gears, or friction wheels, or pulleys, or sprockets;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction includes equipped with the transmission belt, pulley such as toothed belt or steel belt, or equipped with the sprocket with chain, or constituted by the internal gear set; and if the output shaft (3000) is driven at reverse rotary direction with the torque exceeding the rating overload torque of the torque limit transmission (800), the torque limit transmission (800) implements the operation of overload function.

Figure 31:
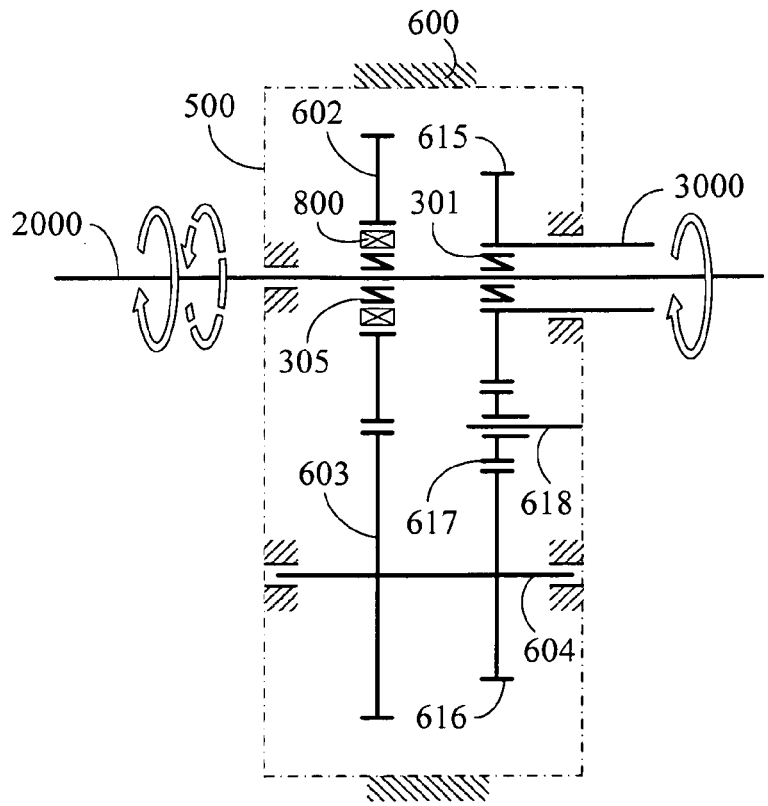
FIG. 31 is a structural schematic view showing the 3rd embodiment of the retrograde torque limit gear train with bidirectional input and one-way output constituted by integrating with the transmissions with different drive rotary directions, according to the present invention.

FIG. 31 is a structural schematic view showing the 3rd embodiment of the retrograde torque limit gear train with bidirectional input and one-way output constituted by integrating with the transmissions with different drive rotary directions, according to the present invention.

As shown in FIG. 31, the retrograde torque limit gear train with bidirectional input and one-way output is constituted by integrating with the transmissions with different drive rotary directions with the input shaft and the output shaft coaxial fitting, the main components including:

one end of the input shaft (2000) is through installed at one side of the shell (500) via a bearing structure, while the other end of the input shaft (2000) perforates through the output shaft (3000) via the one-way transmission (301), a bearing is installed between the output shaft (3000) and the shell (500), and the shell (500) is fixed at the machine body (600);

the input shaft (2000) perforates through a driving wheel (602), and the one-way transmission (305) and the torque limit transmission (800) are installed between the both;

the rotary direction of the driving wheel (602) is different from that of a driving wheel (603), the driving wheel (603) and the driving wheel (616) are co-integrated with the revolving shaft (604), and a bearing is installed between the revolving shaft (604) and the shell (500);

the driving wheel (616) is via a driving wheel (617) rotating at a revolving shaft (618) for driving a driving wheel (615), to constitute a driving wheel set with the same rotary direction;

the revolving shaft (618) is integrated with the shell (500);

the driving wheel (615) is integrated with the output shaft (3000);

by way of the above structure, the input shaft (2000) is driven at the first rotary direction, and then through the one-way transmission (301) for driving the output shaft (3000) to produce the first rotary direction output to constitute the first transmission gear train;

by way of the above structure, the input shaft (2000) is driven at the second rotary direction, and then through the one-way transmission (305) and the closed torque limit transmission (800) for driving the driving wheel (602), and through the driving wheel (602) driving the driving wheel (603) and the driving wheel (616), and through the driving wheel (616) driving the driving wheel (615) via the driving wheel (617), and further through the driving wheel (615) for driving the output shaft (3000) to produce the first rotary direction output to constitute the second transmission gear train;

the driving wheels (602), (603), (615), (616), and (617) are constituted by gears, or friction wheels, or pulleys, or sprockets;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction includes equipped with the transmission belt, pulley such as toothed belt or steel belt, or equipped with the sprocket with chain, or constituted by the internal gear set; and if the output shaft (3000) is driven at reverse rotary direction with the torque exceeding the rating overload torque of the torque limit transmission (800), the torque limit transmission (800) implements the operation of overload function.

Figure 32:
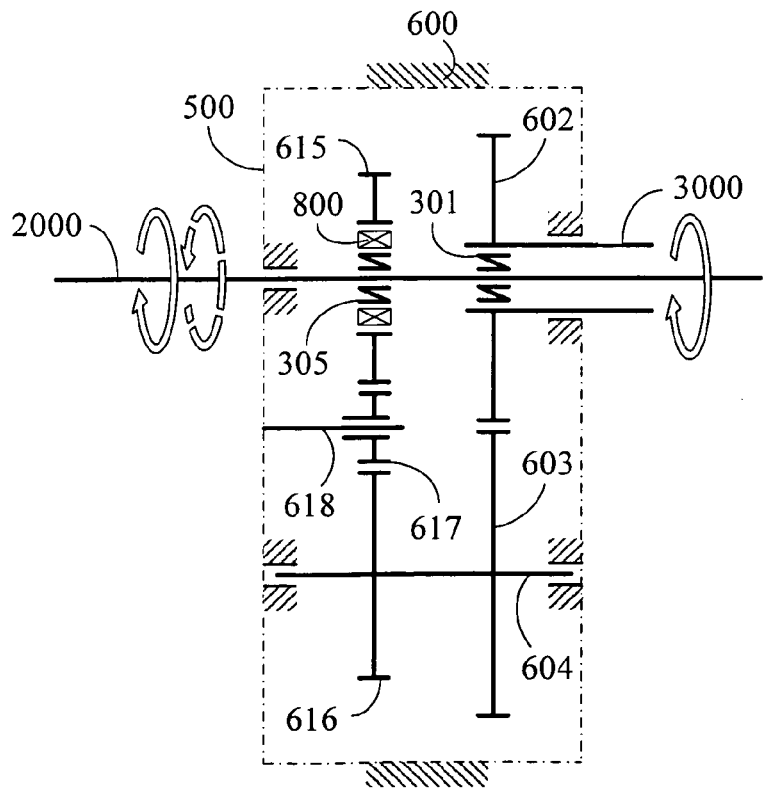
FIG. 32 is a structural schematic view showing the 4th embodiment of the retrograde torque limit gear train with bidirectional input and one-way output constituted by integrating with the transmissions with different drive rotary directions, according to the present invention.

FIG. 32 is a structural schematic view showing the 4th embodiment of the retrograde torque limit gear train with bidirectional input and one-way output constituted by integrating with the transmissions with different drive rotary directions, according to the present invention.

As shown in FIG. 32, the retrograde torque limit gear train with bidirectional input and one-way output is constituted by integrating with the transmissions with different drive rotary directions with the input shaft and the output shaft coaxial fitting, the main components including:

one end of the input shaft (2000) is through installed at one side of the shell (500) via a bearing structure, while the other end of the input shaft (2000) perforates through the output shaft (3000) via the one-way transmission (301), a bearing is installed between the output shaft (3000) and the shell (500), and the shell (500) is fixed at the machine body (600);

the input shaft (2000) perforates through a driving wheel (615), and the one-way transmission (305) and the torque limit transmission (800) are installed between the both;

the driving wheel (615) is via the driving wheel (617) rotating at the revolving shaft (618) for driving the driving wheel (616), the driving wheel (616) and the driving wheel (603) are co-integrated with the revolving shaft (604), and a bearing is installed between the revolving shaft (604) and the shell (500);

the revolving shaft (618) is integrated with the shell (500);

the driving wheel (603) and the driving wheel (602) constitute a driving wheel set with different rotary directions;

the driving wheel (602) is integrated with the output shaft (3000);

by way of the above structure, the input shaft (2000) is driven at the first rotary direction, and then through the one-way transmission (301) for driving the output shaft (3000) to produce the first rotary direction output to constitute the first transmission gear train;

by way of the above structure, the input shaft (2000) is driven at the second rotary direction, and then through the one-way transmission (305) and the closed torque limit transmission (800) for driving the driving wheel (615), and through the driving wheel (615) driving the driving wheel (616) and the driving wheel (603) via the driving wheel (617), and through the driving wheel (603) driving the driving wheel (602), and further through the driving wheel (602) for driving the output shaft (3000) to produce the first rotary direction output to constitute the second transmission gear train;

the driving wheels (602), (603), (615), (616), and (617) are constituted by gears, or friction wheels, or pulleys, or sprockets;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction includes equipped with the transmission belt, pulley such as toothed belt or steel belt, or equipped with the sprocket with chain, or constituted by the internal gear set; and if the output shaft (3000) is driven at reverse rotary direction with the torque exceeding the rating overload torque of the torque limit transmission (800), the torque limit transmission (800) implements the operation of overload function.

Figure 33:
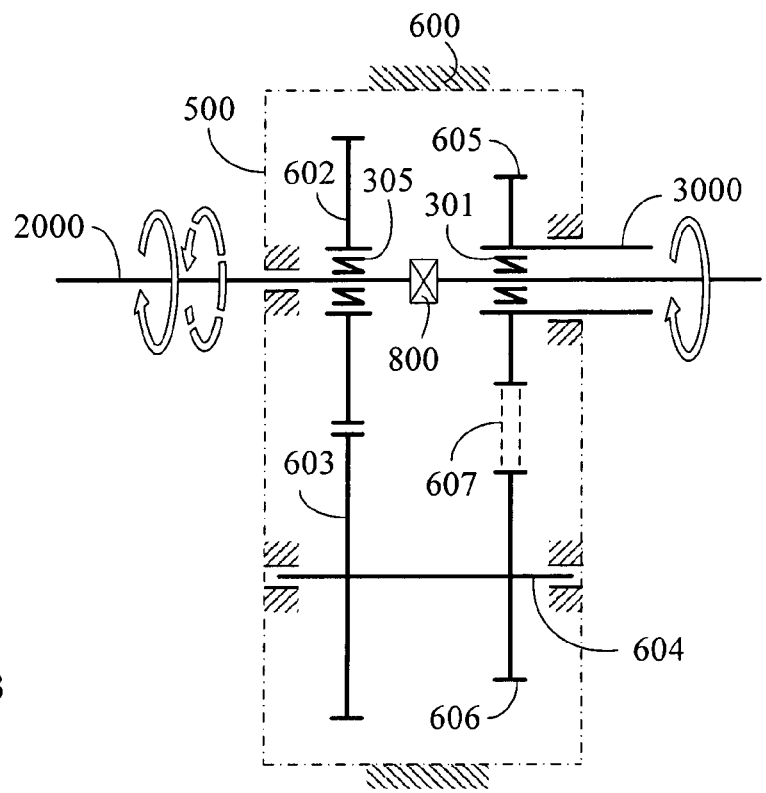
FIG. 33 is a structural schematic view showing the 5th embodiment of the retrograde torque limit gear train with bidirectional input and one-way output constituted by integrating with the transmissions with different drive rotary directions, according to the present invention.

FIG. 33 is a structural schematic view showing the 5th embodiment of the retrograde torque limit gear train with bidirectional input and one-way output constituted by integrating with the transmissions with different drive rotary directions, according to the present invention.

As shown in FIG. 33, the retrograde torque limit gear train with bidirectional input and one-way output is constituted by integrating with the transmissions with different drive rotary directions with the input shaft and the output shaft coaxial fitting, the main components including:

one end of the input shaft (2000) is through installed at one side of the shell (500) via a bearing structure and integrated with the torque limit transmission (800), and is coaxially installed in series with the input shaft (2000) at the other end of the torque limit transmission (800), and then via the one-way transmission (301) perforates through the output shaft (3000), a bearing is installed between the output shaft (3000) and the shell (500), and the shell (500) is fixed at the machine body (600);

the input shaft (2000) perforates through a driving wheel (602), and the one-way transmission (305) is installed between the both;

the rotary direction of the driving wheel (602) is different from that of a driving wheel (603), the driving wheel (603) and a driving wheel (606) are co-integrated with a revolving shaft (604), and a bearing is installed between the revolving shaft (604) and the shell (500);

the driving wheel (606) and the driving wheel (605) are co-integrated with pulleys, or sprockets, or internal gears, for constituting a driving wheel set with the same rotary direction;

the driving wheel (605) is integrated with the output shaft (3000);

by way of the above structure, the input shaft (2000) is driven at the first rotary direction, and then through the closed torque limit transmission (800) and the one-way transmission (301) for driving the output shaft (3000) to produce the first rotary direction output to constitute the first transmission gear train;

by way of the above structure, the input shaft (2000) is driven at the second rotary direction, and then through the one-way transmission (305) for driving the driving wheel (602), and through the driving wheel (602) driving the driving wheel (603) and the driving wheel (606), and further through the driving wheel (606) driving the driving wheel (605) for driving the output shaft (3000) to produce the first rotary direction output to constitute the second transmission gear train;

the driving wheels (602), (603), (605), and (606) are constituted by gears, or friction wheels, or pulleys, or sprockets;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction includes equipped with the transmission belt, pulley such as toothed belt or steel belt, or equipped with the sprocket with chain, or constituted by the internal gear set; and if the output shaft (3000) is driven at reverse rotary direction with the torque exceeding the rating overload torque of the torque limit transmission (800), the torque limit transmission (800) implements the operation of overload function.

Figure 34:
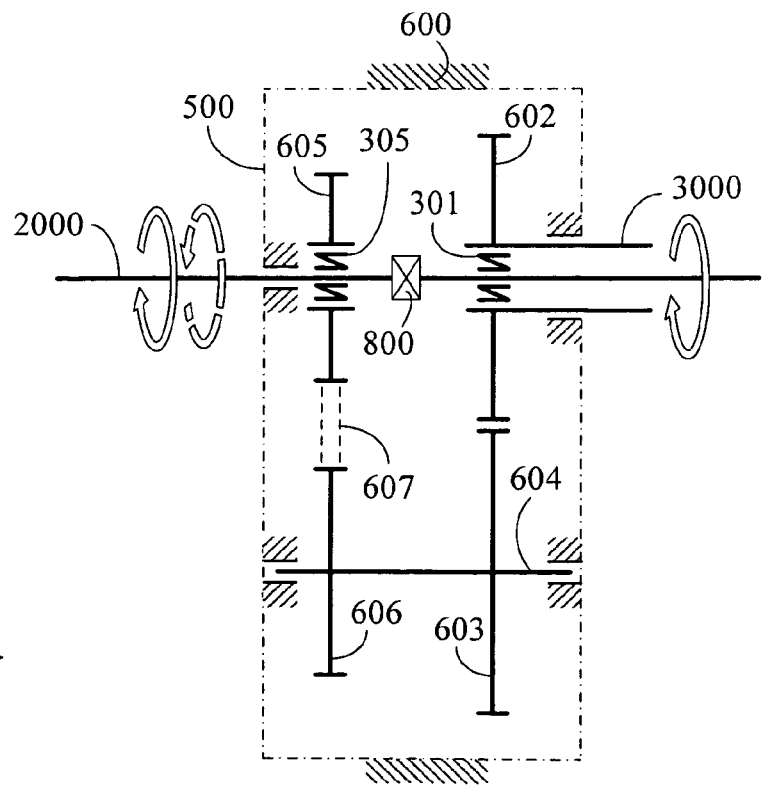
FIG. 34 is a structural schematic view showing the 6th embodiment of the retrograde torque limit gear train with bidirectional input and one-way output constituted by integrating with the transmissions with different drive rotary directions, according to the present invention.

FIG. 34 is a structural schematic view showing the 6th embodiment of the retrograde torque limit gear train with bidirectional input and one-way output constituted by integrating with the transmissions with different drive rotary directions, according to the present invention.

As shown in FIG. 34, the retrograde torque limit gear train with bidirectional input and one-way output is constituted by integrating with the transmissions with different drive rotary directions with the input shaft and the output shaft coaxial fitting, the main components including:

one end of the input shaft (2000) is through installed at one side of the shell (500) via a bearing structure and integrated with the torque limit transmission (800), and is coaxially installed in series with the input shaft (2000) at the other end of the torque limit transmission (800), and then via the one-way transmission (301) perforates through the output shaft (3000), a bearing is installed between the output shaft (3000) and the shell (500), and the shell (500) is fixed at the machine body (600);

the input shaft (2000) perforates through a driving wheel (605), and the one-way transmission (305) is installed between the both;

the driving wheel (606) and the driving wheel (605) are co-integrated with pulleys, or sprockets, or internal gears, for constituting a driving wheel set with the same rotary direction, the driving wheel (603) and the driving wheel (606) are co-integrated with a revolving shaft (604), and a bearing is installed between the revolving shaft (604) and the shell (500);

the rotary direction of the driving wheel (603) is different from that of the driving wheel (602);

the driving wheel (602) is integrated with the output shaft (3000);

by way of the above structure, the input shaft (2000) is driven at the first rotary direction, and then through the closed torque limit transmission (800) and the one-way transmission (301) for driving the output shaft (3000) to produce the first rotary direction output to constitute the first transmission gear train;

by way of the above structure, the input shaft (2000) is driven at the second rotary direction, and then through the one-way transmission (305) for driving the driving wheel (605), and through the driving wheel (605) driving the driving wheel (606) and the driving wheel (603), and further through the driving wheel (603) driving the driving wheel (602) for driving the output shaft (3000) to produce the first rotary direction output to constitute the second transmission gear train;

the driving wheels (602), (603), (605), and (606) are constituted by gears, or friction wheels, or pulleys, or sprockets;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction includes equipped with the transmission belt, pulley such as toothed belt or steel belt, or equipped with the sprocket with chain, or constituted by the internal gear set; and if the output shaft (3000) is driven at reverse rotary direction with the torque exceeding the rating overload torque of the torque limit transmission (800), the torque limit transmission (800) implements the operation of overload function.

Figure 35:
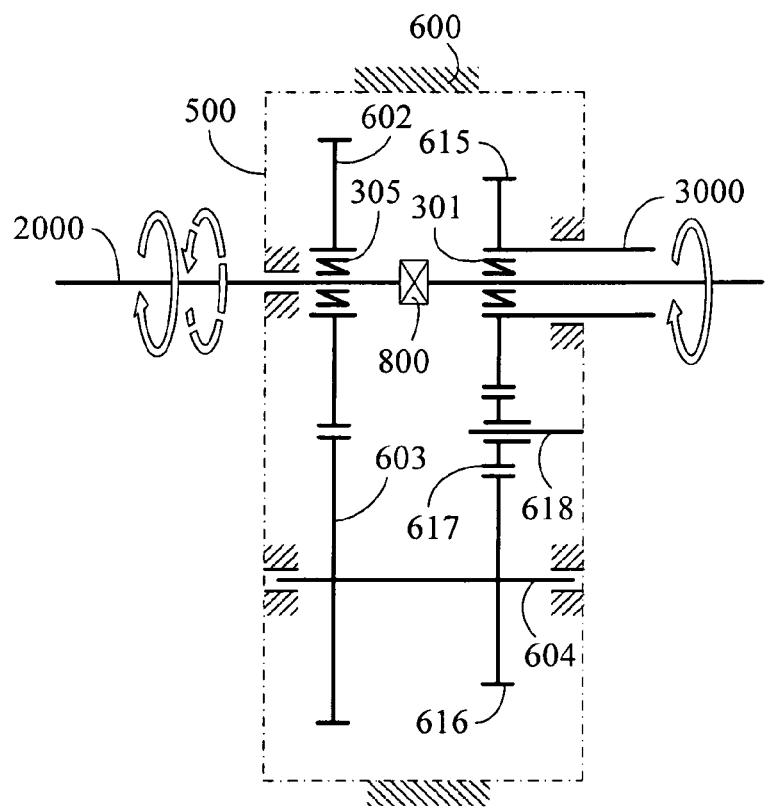
FIG. 35 is a structural schematic view showing the 7th embodiment of the retrograde torque limit gear train with bidirectional input and one-way output constituted by integrating with the transmissions with different drive rotary directions, according to the present invention.

FIG. 35 is a structural schematic view showing the 7th embodiment of the retrograde torque limit gear train with bidirectional input and one-way output constituted by integrating with the transmissions with different drive rotary directions, according to the present invention.

As shown in FIG. 35, the retrograde torque limit gear train with bidirectional input and one-way output is constituted by integrating with the transmissions with different drive rotary directions with the input shaft and the output shaft coaxial fitting, the main components including:

one end of the input shaft (2000) is through installed at one side of the shell (500) via a bearing structure and integrated with the torque limit transmission (800), and is coaxially installed in series with the input shaft (2000) at the other end of the torque limit transmission (800), and then via the one-way transmission (301) perforates through the output shaft (3000), a bearing is installed between the output shaft (3000) and the shell (500), and the shell (500) is fixed at the machine body (600);

the input shaft (2000) perforates through a driving wheel (602), and the one-way transmission (305) is installed between the both;

the rotary direction of the driving wheel (602) is different from that of the driving wheel (603), the driving wheel (603) and the driving wheel (616) are co-integrated with the revolving shaft (604), and a bearing is installed between the revolving shaft (604) and the shell (500);

the driving wheel (616) is via a driving wheel (617) rotating at a revolving shaft (618) for driving the driving wheel (615), to constitute a driving wheel set with the same rotary direction;

the revolving shaft (618) is integrated with the shell (500);

the driving wheel (615) is integrated with the output shaft (3000);

by way of the above structure, the input shaft (2000) is driven at the first rotary direction, and then through the closed torque limit transmission (800) and the one-way transmission (301) for driving the output shaft (3000) to produce the first rotary direction output to constitute the first transmission gear train;

by way of the above structure, the input shaft (2000) is driven at the second rotary direction, and then through the one-way transmission (305) for driving the driving wheel (602), and through the driving wheel (602) driving the driving wheel (603) and the driving wheel (616), and through the driving wheel (616) driving the driving wheel (615) via the driving wheel (617), and further through the driving wheel (615) for driving the output shaft (3000) to produce the first rotary direction output to constitute the second transmission gear train;

the driving wheels (602), (603), (615), (616), and (617) are constituted by gears, or friction wheels, or pulleys, or sprockets;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction includes equipped with the transmission belt, pulley such as toothed belt or steel belt, or equipped with the sprocket with chain, or constituted by the internal gear set; and if the output shaft (3000) is driven at reverse rotary direction with the torque exceeding the rating overload torque of the torque limit transmission (800), the torque limit transmission (800) implements the operation of overload function.

Figure 36:
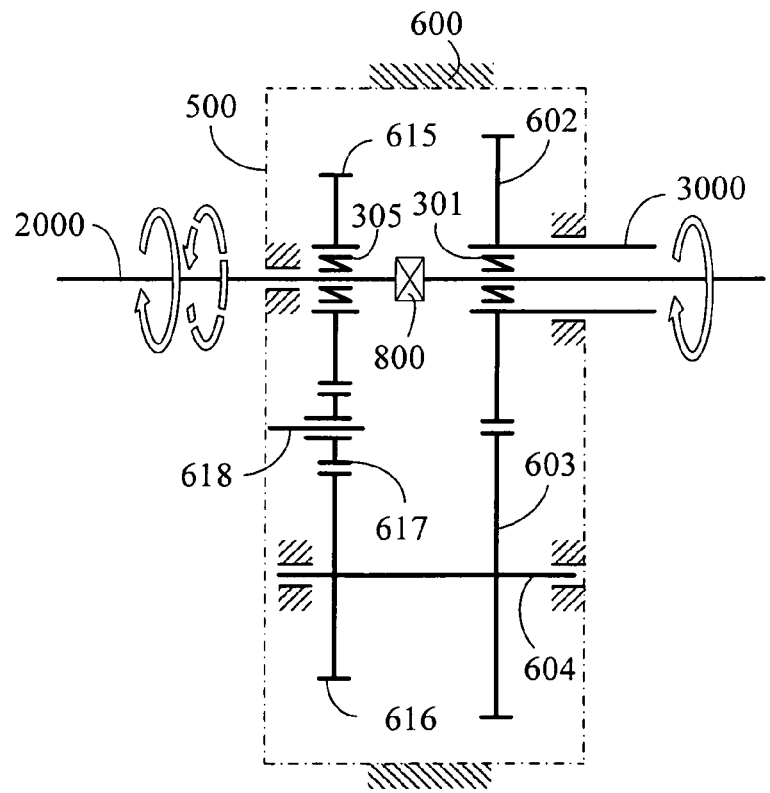
FIG. 36 is a structural schematic view showing the 8th embodiment of the retrograde torque limit gear train with bidirectional input and one-way output constituted by integrating with the transmissions with different drive rotary directions, according to the present invention.

FIG. 36 is a structural schematic view showing the 8th embodiment of the retrograde torque limit gear train with bidirectional input and one-way output constituted by integrating with the transmissions with different drive rotary directions, according to the present invention.

As shown in FIG. 36, the retrograde torque limit gear train with bidirectional input and one-way output is constituted by integrating with the transmissions with different drive rotary directions with the input shaft and the output shaft coaxial fitting, the main components including:

one end of the input shaft (2000) is through installed at one side of the shell (500) via a bearing structure and integrated with the torque limit transmission (800), and is coaxially installed in series with the input shaft (2000) at the other end of the torque limit transmission (800), and then via the one-way transmission (301) perforates through the output shaft (3000), a bearing is installed between the output shaft (3000) and the shell (500), and the shell (500) is fixed at the machine body (600);

the input shaft (2000) perforates through a driving wheel (615), and the one-way transmission (305) is installed between the both;

the driving wheel (615) is via the driving wheel (617) rotating at the revolving shaft (618) for driving the driving wheel (616), the driving wheel (616) and the driving wheel (603) are co-integrated with the revolving shaft (604), and a bearing is installed between the revolving shaft (604) and the shell (500);

the revolving shaft (618) is integrated with the shell (500);

the driving wheel (603) and the driving wheel (602) constitute a driving wheel set with different rotary directions;

the driving wheel (602) is integrated with the output shaft (3000);

by way of the above structure, the input shaft (2000) is driven at the first rotary direction, and then through the closed torque limit transmission (800) and the one-way transmission (301) for driving the output shaft (3000) to produce the first rotary direction output to constitute the first transmission gear train;

by way of the above structure, the input shaft (2000) is driven at the second rotary direction, and then through the one-way transmission (305) for driving the driving wheel (615), and through the driving wheel (615) driving the driving wheel (616) and the driving wheel (603) via the driving wheel (617), and through the driving wheel (603) driving the driving wheel (602), and further through the driving wheel (602) for driving the output shaft (3000) to produce the first rotary direction output to constitute the second transmission gear train;

the driving wheels (602), (603), (615), (616), and (617) are constituted by gears, or friction wheels, or pulleys, or sprockets;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction includes equipped with the transmission belt, pulley such as toothed belt or steel belt, or equipped with the sprocket with chain, or constituted by the internal gear set; and if the output shaft (3000) is driven at reverse rotary direction with the torque exceeding the rating overload torque of the torque limit transmission (800), the torque limit transmission (800) implements the operation of overload function.

Figure 37:
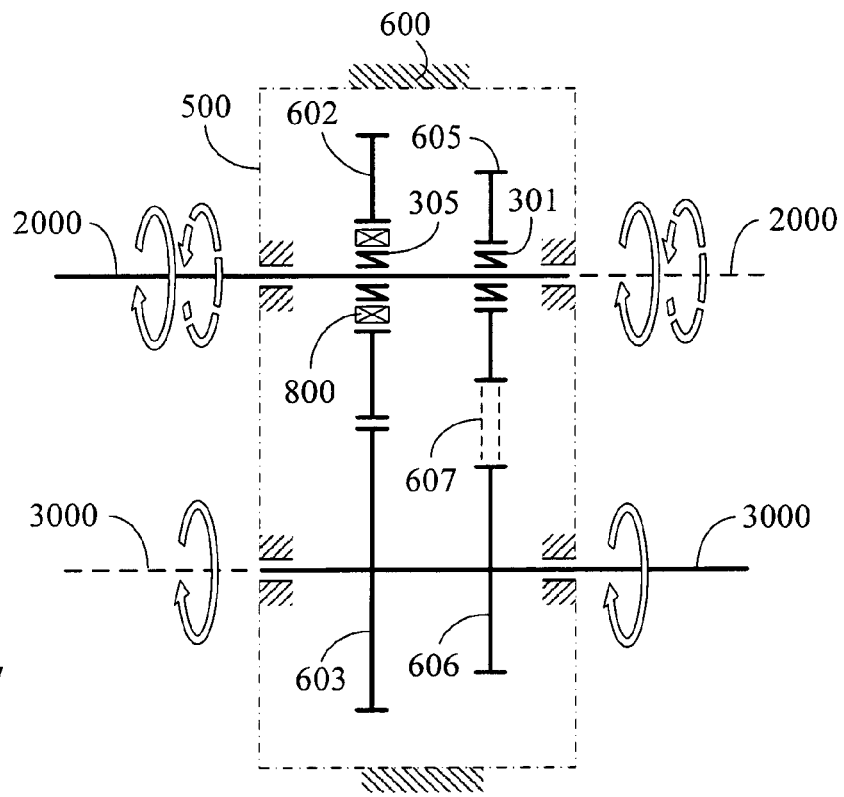
FIG. 37 is a structural schematic view showing the 9th embodiment of the retrograde torque limit gear train with bidirectional input and one-way output constituted by integrating with the transmissions with different drive rotary directions, according to the present invention.

FIG. 37 is a structural schematic view showing the 9th embodiment of the retrograde torque limit gear train with bidirectional input and one-way output constituted by integrating with the transmissions with different drive rotary directions, according to the present invention.

As shown in FIG. 37, the retrograde torque limit gear train with bidirectional input and one-way output is constituted by integrating with the transmissions with different drive rotary directions, in which the input shaft and the output shaft have different axes while the bidirectional input shaft is in a coaxial structure, the main components including:

one end of the input shaft (2000) is through installed at one side of the shell (500) via a bearing structure, while the other end of the input shaft (2000) perforates through the driving wheel (605) via the one-way transmission (301), and a bearing is installed between the other end of the input shaft (2000) and the shell (500); the shell (500) is fixed at the machine body (600);

the input shaft (2000) perforates through the driving wheel (602), and the one-way transmission (305) and the torque limit transmission (800) are installed between the both;

the input shaft (2000) performs dual rotary direction input from one or two ends thereof;

the rotary direction of the driving wheel (602) is different from that of the driving wheel (603), the driving wheel (603) and the driving wheel (606) are co-integrated with the output shaft (3000), and a bearing is installed between the output shaft (3000) and the shell (500);

the output shaft (3000) performs single rotary direction output from one or two ends thereof;

the driving wheel (606) and the driving wheel (605) are co-integrated with pulleys, or sprockets, or internal gears, for constituting a driving wheel set with the same rotary direction;

by way of the above structure, the input shaft (2000) is driven at the first rotary direction, and then through the one-way transmission (301) for driving the driving wheel (605), and through the driving wheel (605) driving the driving wheel (606), and further through the driving wheel (606) for driving the output shaft (3000) to produce the first rotary direction output to constitute the first transmission gear train;

by way of the above structure, the input shaft (2000) is driven at the second rotary direction, and then through the one-way transmission (305) and the closed torque limit transmission (800) for driving the driving wheel (602), and through the driving wheel (602) driving the driving wheel (603), and further through the driving wheel (603) for driving the output shaft (3000) to produce the first rotary direction output to constitute the second transmission gear train;

the driving wheels (602), (603), (605), and (606) are constituted by gears, or friction wheels, or pulleys, or sprockets;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction includes equipped with the transmission belt, pulley such as toothed belt or steel belt, or equipped with the sprocket with chain, or constituted by the internal gear set; and if the output shaft (3000) is driven at reverse rotary direction with the torque exceeding the rating overload torque of the torque limit transmission (800), the torque limit transmission (800) implements the operation of overload function.

Figure 38:
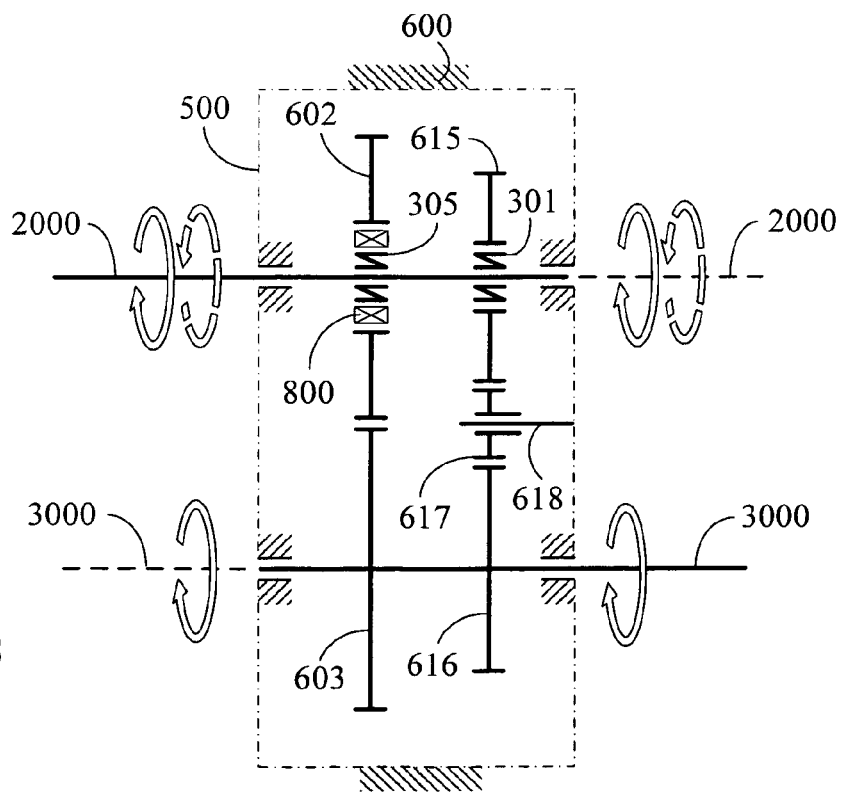
FIG. 38 is a structural schematic view showing the 10th embodiment of the retrograde torque limit gear train with bidirectional input and one-way output constituted by integrating with the transmissions with different drive rotary directions, according to the present invention.

FIG. 38 is a structural schematic view showing the 10th embodiment of the retrograde torque limit gear train with bidirectional input and one-way output constituted by integrating with the transmissions with different drive rotary directions, according to the present invention.

As shown in FIG. 38, the retrograde torque limit gear train with bidirectional input and one-way output is constituted by integrating with the transmissions with different drive rotary directions, in which the input shaft and the output shaft have different axes while the bidirectional input shaft is in a coaxial structure, the main components including:

one end of the input shaft (2000) is through installed at one side of the shell (500) via a bearing structure, while the other end of the input shaft (2000) perforates through the driving wheel (615) via the one-way transmission (301), and a bearing is installed between the other end of the input shaft (2000) and the shell (500); the shell (500) is fixed at the machine body (600);

the input shaft (2000) perforates through the driving wheel (602), and the one-way transmission (305) and the torque limit transmission (800) are installed between the both;

the input shaft (2000) performs dual rotary direction input from one or two ends thereof;

the rotary direction of the driving wheel (602) is different from that of the driving wheel (603), the driving wheel (603) and the driving wheel (616) are co-integrated with the output shaft (3000), and a bearing is installed between the output shaft (3000) and the shell (500);

the output shaft (3000) performs single rotary direction output from one or two ends thereof;

the driving wheel (616), the driving wheel (617) rotating at the revolving shaft (618), and the driving wheel (615) constitute a driving wheel set with the same rotary direction;

the revolving shaft (618) is integrated with the shell (500);

by way of the above structure, the input shaft (2000) is driven at the first rotary direction, and then through the one-way transmission (301) for driving the driving wheel (615), and through the driving wheel (617) driving the driving wheel (616), and further through the driving wheel (616) for driving the output shaft (3000) to produce the first rotary direction output to constitute the first transmission gear train;

by way of the above structure, the input shaft (2000) is driven at the second rotary direction, and then through the one-way transmission (305) and the closed torque limit transmission (800) for driving the driving wheel (602), and through the driving wheel (602) driving the driving wheel (603), and further through the driving wheel (603) for driving the output shaft (3000) to produce the first rotary direction output to constitute the second transmission gear train;

the driving wheels (602), (603), (615), (616), and (617) are constituted by gears, or friction wheels, or pulleys, or sprockets;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction includes equipped with the transmission belt, pulley such as toothed belt or steel belt, or equipped with the sprocket with chain, or constituted by the internal gear set; and if the output shaft (3000) is driven at reverse rotary direction with the torque exceeding the rating overload torque of the torque limit transmission (800), the torque limit transmission (800) implements the operation of overload function.

Figure 39:
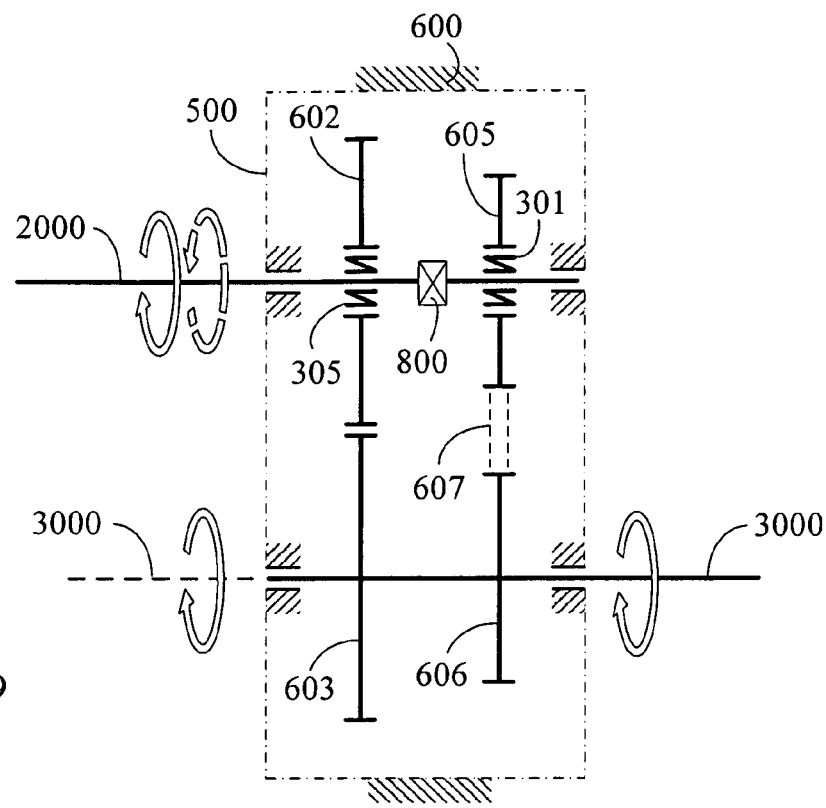
FIG. 39 is a structural schematic view showing the 11th embodiment of the retrograde torque limit gear train with bidirectional input and one-way output constituted by integrating with the transmissions with different drive rotary directions, according to the present invention.

FIG. 39 is a structural schematic view showing the 11th embodiment of the retrograde torque limit gear train with bidirectional input and one-way output constituted by integrating with the transmissions with different drive rotary directions, according to the present invention.

As shown in FIG. 39, the retrograde torque limit gear train with bidirectional input and one-way output is constituted by integrating with the transmissions with different drive rotary directions, in which the input shaft and the output shaft have different axes while the bidirectional input shaft is separately coaxially installed in series, the main components including:

one end of the input shaft (2000) is through installed at one side of the shell (500) via a bearing structure and integrated with the torque limit transmission (800), and is coaxially installed in series with the input shaft (2000) at the other end of the torque limit transmission (800), and then via the one-way transmission (301) perforates through the driving wheel (605), a bearing is installed between the input shaft (2000) at the other end of the torque limit transmission (800) and the shell (500), and the shell (500) is fixed at the machine body (600);

the input shaft (2000) perforates through the driving wheel (602), and the one-way transmission (305) is installed between the both;

the rotary direction of the driving wheel (602) is different from that of the driving wheel (603), the driving wheel (603) and the driving wheel (606) are co-integrated with the output shaft (3000), and a bearing is installed between the output shaft (3000) and the shell (500);

the output shaft (3000) performs single rotary direction output from one or two ends thereof;

the driving wheel (606) and a driving wheel (605) are co-integrated with pulleys, or sprockets, or internal gears, for constituting a driving wheel set with the same rotary direction;

by way of the above structure, the input shaft (2000) is driven at the first rotary direction, and then through the one-way transmission (301) and the closed torque limit transmission (800) for driving the driving wheel (605), and through the driving wheel (605) driving the driving wheel (606), and further through the driving wheel (606) for driving the output shaft (3000) to produce the first rotary direction output to constitute the first transmission gear train;

by way of the above structure, the input shaft (2000) is driven at the second rotary direction, and then through the one-way transmission (305) for driving the driving wheel (602), and through the driving wheel (602) driving the driving wheel (603), and further through the driving wheel (603) for driving the output shaft (3000) to produce the first rotary direction output to constitute the second transmission gear train;

the driving wheels (602), (603), (605), and (606) are constituted by gears, or friction wheels, or pulleys, or sprockets;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction includes equipped with the transmission belt, pulley such as toothed belt or steel belt, or equipped with the sprocket with chain, or constituted by the internal gear set; and if the output shaft (3000) is driven at reverse rotary direction with the torque exceeding the rating overload torque of the torque limit transmission (800), the torque limit transmission (800) implements the operation of overload function.

Figure 40:
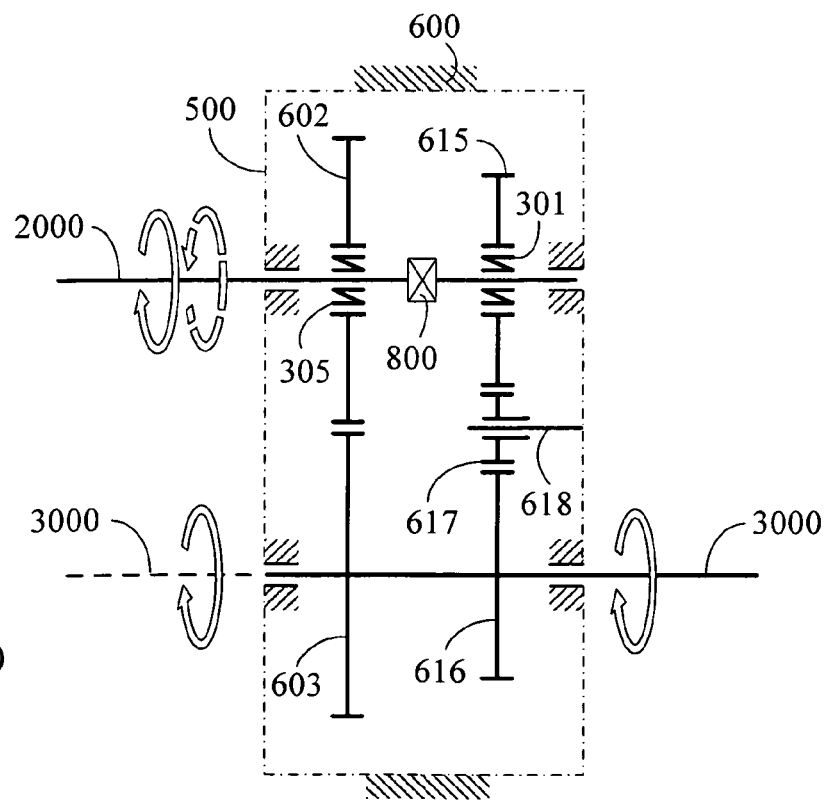
FIG. 40 is a structural schematic view showing the 12th embodiment of the retrograde torque limit gear train with bidirectional input and one-way output constituted by integrating with the transmissions with different drive rotary directions, according to the present invention.

FIG. 40 is a structural schematic view showing the 12th embodiment of the retrograde torque limit gear train with bidirectional input and one-way output constituted by integrating with the transmissions with different drive rotary directions, according to the present invention.

As shown in FIG. 40, the retrograde torque limit gear train with bidirectional input and one-way output is constituted by integrating with the transmissions with different drive rotary directions, in which the input shaft and the output shaft have different axes while the bidirectional input shafts is separately coaxially installed in series, the main components including:

one end of the input shaft (2000) is through installed at one side of the shell (500) via a bearing structure and integrated with the torque limit transmission (800), and is coaxially installed in series with the input shaft (2000) at the other end of the torque limit transmission (800), and then via the one-way transmission (301) perforates through the driving wheel (615), and a bearing is installed between the input shaft (2000) at the other end of the torque limit transmission (800) and the shell (500); the shell (500) is fixed at the machine body (600);

the input shaft (2000) perforates through the driving wheel (602), and the one-way transmission (305) is installed between the both;

the rotary direction of the driving wheel (602) is different from that of the driving wheel (603), the driving wheel (603) and the driving wheel (616) are co-integrated with the output shaft (3000), and a bearing is installed between the output shaft (3000) and the shell (500);

the output shaft (3000) performs single rotary direction output from one or two ends thereof;

the driving wheel (616), the driving wheel (617) rotating at a revolving shaft (618), and the driving wheel (615) constitute a driving wheel set with the same rotary direction;

the revolving shaft (618) is integrated with the shell (500);

by way of the above structure, the input shaft (2000) is driven at the first rotary direction, and then through the closed torque limit transmission (800) and the one-way transmission (301) for driving the driving wheel (615), and through the driving wheel (617) for driving the driving wheel (616), and further through the driving wheel (616) for driving the output shaft (3000) to produce the first rotary direction output to constitute the first transmission gear train;

by way of the above structure, the input shaft (2000) is driven at the second rotary direction, and then through the one-way transmission (305) for driving the driving wheel (602), and through the driving wheel (602) driving the driving wheel (603), and further through the driving wheel (603) for driving the output shaft (3000) to produce the first rotary direction output to constitute the second transmission gear train;

the driving wheels (602), (603), (615), (616), and (617) are constituted by gears, or friction wheels, or pulleys, or sprockets;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction includes equipped with the transmission belt, pulley such as toothed belt or steel belt, or equipped with the sprocket with chain, or constituted by the internal gear set; and if the output shaft (3000) is driven at reverse rotary direction with the torque exceeding the rating overload torque of the torque limit transmission (800), the torque limit transmission (800) implements the operation of overload function.

The invention claimed is:

1. A retrograde torque-limiting gear train apparatus installed between a bidirectional input and a one-way output, comprising:

an input shaft (2000);

an output shaft (3000);

a first gear train for transmitting power from said bi-directional input to said one-way output to cause rotation of said output shaft (3000) in a one-way output direction when said bi-directional input (shaft (2000) is rotated in a first input direction;

a second gear train for transmitting power from said bi-directional input to said one-way output to cause rotation of said output shaft (3000) in said one-way output direction when said bi-directional input shaft (2000) is rotated in a second input direction opposite the first input direction;

a first one-way transmission (301) included in one said first and second gear trains;

at least one second one-way transmission (302, 303, or 305) included in another of said first and second gear trains; and a torque-limiting transmission (800) installed between said input shaft (2000) and said output shaft (3000) for providing an overload function to permit rotation of said output shaft (3000) relative to said input shaft (2000) and thereby prevent locking of said gear train apparatus when one of the following occurs: (a) a torque applied to said output shaft (3000) exceeds a predetermined torque, and (b) a torque is applied to said output shaft (3000) in a direction opposite said one-way output direction.

2. A retrograde torque-limiting gear train apparatus installed between a bidirectional input and a one-way output as claimed in claim 1, wherein the input shaft (2000) and the output shaft (3000) are coaxial, wherein the first gear train comprises:
a first driving wheel (602);
a second driving wheel (603) engaged with and driven by said first driving wheel (602);
a first shaft (604) driven by the second driving wheel (603);
a third driving wheel (606) engaged with and driven by the first shaft (604);
a fourth driving wheel (605); and
a transmission device (607) connected between said third driving wheel (606) and said fourth driving wheel (605) for transmitting power between said third driving wheel (606) and said fourth driving wheel (605), wherein the second gear train comprises said first one-way transmission (301) installed between the input shaft (2000) and the output shaft (3000) to drive said output shaft (3000) in said output direction when said input shaft (2000) is rotated in said first input direction, wherein said at least one second one-way transmission (305) is installed between the input shaft (2000) and the torque-limiting transmission (800) to transmit power between the input shaft (2000) and the torque-limiting transmission (800) to drive said first driving wheel (602) when the input shaft (2000) is rotated in said second input direction, and wherein said torque-limiting transmission (800) is installed between said second one-way transmission (305) and said first driving wheel (602) to permit relative rotation between said second one-way transmission (305) and said first driving wheel (602) when said predetermined torque limit is exceeded or when a torque is applied to the output shaft (3000) in a direction opposite said one-way output direction.

3. A retrograde torque-limiting gear train apparatus installed between a bidirectional input and a one-way output as claimed in claim 1, wherein the input shaft (2000) and the output shaft (3000) are coaxial, wherein the first gear train comprises:
a first driving wheel (605);
a second driving wheel (606)
a transmission device (607) connected between said first driving wheel (605) and said second driving wheel (606) for transmitting power between said first driving wheel (605) and said second driving wheel (606);
a first shaft (604) driven by the second driving wheel (606);
a third driving wheel (603) engaged with and driven by the first shaft (604); and
a fourth driving wheel (602) engaged with and driven by the third driving wheel (603), wherein said second gear train comprises said first one-way transmission (301) installed between the input shaft (2000) and the output shaft (3000) to drive said output shaft (3000) in said output direction when said input shaft (2000) is rotated in said first input direction, wherein said at least one second one-way transmission (305) is installed between the input shaft (2000) and the torque-limiting transmission (800) to transmit power between the input shaft (2000) and the torque-limiting transmission (800) to drive said first driving wheel (605) when the input shaft (2000) is rotated in said second input direction, and wherein said torque-limiting transmission (800) is installed between said second one-way transmission (305) and said first driving wheel (605) to permit relative rotation between said second one-way transmission (305) and said first driving wheel (605) when said predetermined torque limit is exceeded or when a torque is applied to the output shaft (3000) in a direction opposite said one-way output direction.

4. A retrograde torque-limiting gear train apparatus installed between a bidirectional input and a one-way output as claimed in claim 1, wherein the input shaft (2000) and the output shaft (3000) are coaxial, wherein the first gear train comprises:
a first driving wheel (602);
a second driving wheel (603) engaged with and driven by said first driving wheel (602);
a first shaft (604) driven by the second driving wheel (603);
a third driving wheel (616) engaged with and driven by the first shaft (604);
a fourth driving wheel (615); and
a fifth driving wheel (617) mounted on a rotating shaft (618) integrated with a shell (500) of the retrograde torque-limiting gear train apparatus, said fifth driving wheel engaged with said third driving wheel (616) and said fourth driving wheel (615) for transmitting power between said third driving wheel (616) and said fourth driving wheel (615); and wherein said second gear train comprises said first one-way transmission (301) installed between the input shaft (2000) and the output shaft (3000) to drive said output shaft (3000) in said output direction when said input shaft (2000) is rotated in said first input direction, wherein said at least one second one-way transmission (305) is installed between the input shaft (2000) and the torque-limiting transmission (800) to transmit power between the input shaft (2000) and the torque-limiting transmission (800) to drive said first driving wheel (602) when the input shaft (2000) is rotated in said second input direction, and wherein said torque-limiting transmission (800) is installed between said second one-way transmission (305) and said first driving wheel (602) to permit relative rotation between said second one-way transmission (305) and said first driving wheel (602) when said predetermined torque limit is exceeded or when a torque is applied to the output shaft (3000) in a direction opposite said one-way output direction.

5. A retrograde torque-limiting gear train apparatus installed between a bidirectional input and a one-way output as claimed in claim 1,
wherein the input shaft (2000) and the output shaft (3000) are coaxial,
wherein the first gear train comprises:
a first driving wheel (615);
a second driving wheel (616)
a first shaft (604) driven by the second driving wheel (616);
a third driving wheel (603) engaged with and driven by the first shaft (604);
a fourth driving wheel (602) engaged with and driven by the third driving wheel (603); and
a fifth driving wheel (617) mounted on a rotating shaft (618) integrated with a shell (500) of the retrograde torque-limiting gear train apparatus, said fifth driving wheel engaged with said first driving wheel (615) and said second driving wheel (616) for transmitting power between said first driving wheel (615) and said second driving wheel (616),
wherein said second gear train comprises said first one-way transmission (301) installed between the input shaft (2000) and the output shaft (3000) to drive said output shaft (3000) in said output direction when said input shaft (2000) is rotated in said first input direction,
wherein said at least one second one-way transmission (305) is installed between the input shaft (2000) and the torque-limiting transmission (800) to transmit power in one direction between the input shaft (2000) and the torque-limiting transmission (800) to drive said first driving wheel (615) when the input shaft (2000) is rotated in said second input direction, and
wherein said torque-limiting transmission (800) is installed between said second one-way transmission (305) and said first driving wheel (615) to permit relative rotation between said second one-way transmission (305) and said first driving wheel (615) when said predetermined torque limit is exceeded or when a torque is applied to the output shaft (3000) in a direction opposite said one-way output direction.

6. A retrograde torque-limiting gear train apparatus installed between a bidirectional input and a one-way output as claimed in claim 1,
wherein the input shaft (2000) and the output shaft (3000) are coaxial,
wherein the first gear train comprises:
a first driving wheel (602);
a second driving wheel (603) engaged with and driven by said first driving wheel (602);
a first shaft (604) driven by the second driving wheel (603);
a third driving wheel (606) engaged with and driven by the first shaft (604);
a fourth driving wheel (605); and
a transmission device (607) connected between said third driving wheel (606) and said fourth driving wheel (605) for transmitting power between said third driving wheel (606) and said fourth driving wheel (605); and
wherein said second gear train comprises said first one-way transmission (301) installed between the input shaft (2000) and the output shaft (3000) to drive said output shaft (3000) in said output direction when said input shaft (2000) is rotated in said first input direction,
wherein said at least one second one-way transmission (305) is installed between the input shaft (2000) and the first driving wheel (602) to transmit power in one direction between the input shaft (2000) and the first driving wheel (602) when the input shaft (2000) is rotated in said second input direction, and
wherein said torque-limiting transmission (800) is installed in series with said input shaft (2000) to permit relative rotation between said input shaft (2000) and said output shaft (3000) when said predetermined torque limit is exceeded or when a torque is applied to the output shaft (3000) in a direction opposite said one-way output direction.

7. A retrograde torque-limiting gear train apparatus installed between a bidirectional input and a one-way output as claimed in claim 1,
wherein the input shaft (2000) and the output shaft (3000) are coaxial,
wherein the first gear train comprises:
a first driving wheel (605);
a second driving wheel (606)
a transmission device (607) connected between said first driving wheel (605) and said second driving wheel (606) for transmitting power between said first driving wheel (605) and said second driving wheel (606);
a first shaft (604) driven by the second driving wheel (606);
a third driving wheel (603) engaged with and driven by the first shaft (604); and
a fourth driving wheel (602) engaged with and driven by the third driving wheel (603),
wherein said second gear train comprises said first one-way transmission (301) installed between the input shaft (2000) and the output shaft (3000) to drive said output shaft (3000) in said output direction when said input shaft (2000) is rotated in said first input direction,
wherein said at least one second one-way transmission (305) is installed between the input shaft (2000) and the first driving wheel (605) to transmit power in one-direction between the input shaft (2000) and the first driving wheel (605) when the input shaft (2000) is rotated in said second input direction, and
wherein said torque-limiting transmission (800) is installed in series with said input shaft (2000) to permit relative rotation between said input shaft (2000) and said output shaft (3000) when said predetermined torque limit is exceeded or when a torque is applied to the output shaft (3000) in a direction opposite said one-way output direction.

8. A retrograde torque-limiting gear train apparatus installed between a bidirectional input and a one-way output as claimed in claim 1,
wherein the input shaft (2000) and the output shaft (3000) are coaxial,
wherein the first gear train comprises:
a first driving wheel (602);
a second driving wheel (603) engaged with and driven by said first driving wheel (602);
a first shaft (604) driven by the second driving wheel (603);
a third driving wheel (616) engaged with and driven by the first shaft (604);
a fourth driving wheel (615); and
a fifth driving wheel (617) mounted on a rotating shaft (618) integrated with a shell (500) of the retrograde torque-limiting gear train apparatus, said fifth driving wheel engaged with said third driving wheel (616)

and said fourth driving wheel (615) for transmitting power between said third driving wheel (616) and said fourth driving wheel (615); and wherein said second gear train comprises said first one-way transmission (301) installed between the input shaft (2000) and the output shaft (3000) to drive said output shaft (3000) in said output direction when said input shaft (2000) is rotated in said first input direction, wherein said at least one second one-way transmission (305) is installed between the input shaft (2000) and the first driving wheel (602) to transmit power in one-direction between the input shaft (2000) and the first driving wheel (602) when the input shaft (2000) is rotated in said second input direction, and wherein said torque-limiting transmission (800) is installed in series with said input shaft (2000) to permit relative rotation between said input shaft (2000) and said output shaft (3000) when said predetermined torque limit is exceeded or when a torque is applied to the output shaft (3000) in a direction opposite said one-way output direction.

9. A retrograde torque-limiting gear train apparatus installed between a bidirectional input and a one-way output as claimed in claim 1,
  wherein the input shaft (2000) and the output shaft (3000) are coaxial,
  wherein the first gear train comprises:
    a first driving wheel (615);
    a second driving wheel (616)
    a first shaft (604) driven by the second driving wheel (616);
    a third driving wheel (603) engaged with and driven by the first shaft (604);
    a fourth driving wheel (602) engaged with and driven by the third driving wheel (603); and
    a fifth driving wheel (617) mounted on a rotating shaft (618) integrated with a shell (500) of the retrograde torque-limiting gear train apparatus, said fifth driving wheel engaged with said first driving wheel (615) and said second driving wheel (616) for transmitting power between said first driving wheel (615) and said second driving wheel (616),
  wherein said second gear train comprises said first one-way transmission (301) installed between the input shaft (2000) and the output shaft (3000) to drive said output shaft (3000) in said output direction when said input shaft (2000) is rotated in said first input direction,
  wherein said at least one second one-way transmission (305) is installed between the input shaft (2000) and the first driving wheel (615) to transmit power in one-direction between the input shaft (2000) and the first driving wheel (615) when the input shaft (2000) is rotated in said second input direction, and
  wherein said torque-limiting transmission (800) is installed in series with said input shaft (2000) to permit relative rotation between said input shaft (2000) and said output shaft (3000) when said predetermined torque limit is exceeded or when a torque is applied to the output shaft (3000) in a direction opposite said one-way output direction.

10. A retrograde torque-limiting gear train apparatus installed between a bidirectional input and a one-way output as claimed in claim 1,
  wherein the first gear train comprises:
    a first driving wheel (602); and
    a second driving wheel (603) engaged with and driven by said first driving wheel (602), said second driving wheel (603) being mounted on said output shaft (3000),
  wherein said second gear train comprises:
    a third driving wheel (606) mounted on said output shaft (3000);
    a fourth driving wheel (605); and
    a transmission device (607) connected between said third driving wheel (606) and said fourth driving wheel (605) for transmitting power between said third driving wheel (606) and said fourth driving wheel (605); and
  wherein said first one-way transmission (301) is installed between the input shaft (2000) and the fourth driving wheel (605) to drive said fourth driving wheel (605) when the input shaft (2000) is driven in said first input direction,
  wherein said at least one second one-way transmission (305) is installed between the input shaft (2000) and the torque-limiting transmission (800) to transmit power between the input shaft (2000) and the torque-limiting transmission (800) to drive said first driving wheel (602) when the input shaft (2000) is rotated in said second input direction, and
  wherein said torque-limiting transmission (800) is installed between said second one-way transmission (305) and said first driving wheel (602) to permit relative rotation between said second one-way transmission (305) and said first driving wheel (602) when said predetermined torque limit is exceeded or when a torque is applied to the output shaft (3000) in a direction opposite said one-way output direction.

11. A retrograde torque-limiting gear train apparatus installed between a bidirectional input and a one-way output as claimed in claim 1,
  wherein the first gear train comprises:
    a first driving wheel (605);
    a second driving wheel (606); and
    a transmission device (607) connected between said first driving wheel (605) and said second driving wheel (606) for transmitting power between said first driving wheel (605) and said second driving wheel (606), wherein said second driving wheel is mounted on said output shaft (3000),
  wherein the second gear train comprises:
    a third driving wheel (603) mounted on said output shaft (3000); and
    a fourth driving wheel (602) engaged with and driven by the third driving wheel (603),
  wherein said first one-way transmission (301) is installed between the input shaft (2000) and the fourth driving wheel (602) to drive said fourth driving wheel (602) when said input shaft (2000) is driven in said first input direction,
  wherein said at least one second one-way transmission (305) is installed between the input shaft (2000) and the torque-limiting transmission (800) to transmit power between the input shaft (2000) and the torque-limiting transmission (800) to drive said first driving wheel (605) when the input shaft (2000) is rotated in said second input direction, and
  wherein said torque-limiting transmission (800) is installed between said second one-way transmission (305) and said first driving wheel (605) to permit relative rotation between said second one-way transmission (305) and said first driving wheel (605) when said predetermined torque limit is exceeded or when a torque is applied to the output shaft (3000) in a direction opposite said one-way output direction.

12. A retrograde torque-limiting gear train apparatus installed between a bidirectional input and a one-way output as claimed in claim 1,
wherein the first gear train comprises:
a first driving wheel (602); and
a second driving wheel (603) engaged with and driven by said first driving wheel (602) and mounted on said output shaft (3000),
wherein said second gear train comprises:
a third driving wheel (616) engaged with and driven by the first shaft (604);
a fourth driving wheel (615); and
a fifth driving wheel (617) mounted on a rotating shaft (618) integrated with a shell (500) of the retrograde torque-limiting gear train apparatus, said fifth driving wheel engaged with said third driving wheel (616) and said fourth driving wheel (615) for transmitting power between said third driving wheel (616) and said fourth driving wheel (615); and
wherein said first one-way transmission (301) is installed between the input shaft (2000) and the fourth driving wheel (615) to drive said fourth driving wheel (615) when said input shaft (2000) is rotated in said first input direction,
wherein said at least one second one-way transmission (305) is installed between the input shaft (2000) and the torque-limiting transmission (800) to transmit power between the input shaft (2000) and the torque-limiting transmission (800) to drive said first driving wheel (602) when the input shaft (2000) is rotated in said second input direction, and
wherein said torque-limiting transmission (800) is installed between said second one-way transmission (305) and said first driving wheel (602) to permit relative rotation between said second one-way transmission (305) and said first driving wheel (602) when said predetermined torque limit is exceeded or when a torque is applied to the output shaft (3000) in a direction opposite said one-way output direction.

13. A retrograde torque-limiting gear train apparatus installed between a bidirectional input and a one-way output as claimed in claim 1, wherein the input shaft (2000) and the output shaft (3000) are coaxial,
wherein the first gear train comprises:
a first driving wheel (615); and
a second driving wheel (616) engaged with and driven by the first driving wheel (615) and mounted on said output shaft (3000),
wherein the second gear train comprises:
a third driving wheel (603) mounted on the output shaft (3000);
a fourth driving wheel (602) engaged with and driven by the third driving wheel (603); and
a fifth driving wheel (617) mounted on a rotating shaft (618) integrated with a shell (500) of the retrograde torque-limiting gear train apparatus, said fifth driving wheel engaged with said first driving wheel (615) and said second driving wheel (616) for transmitting power between said first driving wheel (615) and said second driving wheel (616)
wherein said first one-way transmission (301) is installed between the input shaft (2000) and the fourth driving wheel (602) to drive said fourth driving wheel (602) when said input shaft (2000) is rotated in said first input direction, wherein said at least one second one-way transmission (305) is installed between the input shaft (2000) and the torque-limiting transmission (800) to transmit power in one direction between the input shaft (2000) and the torque-limiting transmission (800) to drive said first driving wheel (615) when the input shaft (2000) is rotated in said second input direction, and
wherein said torque-limiting transmission (800) is installed between said second one-way transmission (305) and said first driving wheel (615) to permit relative rotation between said second one-way transmission (305) and said first driving wheel (615) when said predetermined torque limit is exceeded or when a torque is applied to the output shaft (3000) in a direction opposite said one-way output direction.

14. A retrograde torque-limiting gear train apparatus installed between a bidirectional input and a one-way output as claimed in claim 1, wherein said output shaft (3000) is coaxial with the input shaft (2000) and said first gear train includes a planetary gear train.

15. A retrograde torque-limiting gear train apparatus installed between a bidirectional input and a one-way output as claimed in claim 14, wherein:
the planetary gear train includes:
a sun wheel (202) connected to the input shaft (2000) via the torque-limiting transmission (800);
a ring gear (204) connected to the output shaft (3000) via said first one-way transmission (301); and
at least one planetary wheel (203) having a shaft fixed to a shell (500) of the planetary gear train,
the torque-limiting transmission (800) is installed between the input shaft (2000) and the sun wheel (202), and
the second one-way transmission (302) is connected between the input shaft and the output shaft.

16. A retrograde torque-limiting gear train apparatus installed between a bidirectional input and a one-way output as claimed in claim 14, wherein:
the planetary gear train includes:
a sun wheel (202);
a ring gear (204); and
at least one planetary wheel (203) installed on a planetary wheel support arm annular shelf (200), said shelf (200) including an extension rotatably coupled between the first one-way transmission (301) and a third one-way transmission (303),
said second one-way transmission (305) is installed between the input shaft (2000) and the torque-limiting transmission (800),
said torque limiting transmission (800) is installed between the second one-way transmission (305) and the sun wheel (202), and
said third one-way transmission (303) is installed between the annular shelf (200) and the input shaft (2000).

17. A retrograde torque-limiting gear train apparatus installed between a bidirectional input and a one-way output as claimed in claim 14, wherein:
the planetary gear train includes:
a sun wheel (202);
a ring gear (204); and
at least one planetary wheel (203) installed on a planetary wheel support arm annular shelf (200), said shelf (200) includes an extension rotatably coupled between the input shaft (2000) and a third one-way transmission (303) fixed to a shell (500) of the planetary gear train,
said first one-way transmission is installed between said ring gear (204) and the output shaft (3000), said second one-way transmission (302) is installed between the input shaft (2000) and the output shaft (3000), and said torque limiting transmission (800) is installed between the input shaft (2000) and the sun wheel (202).

18. A retrograde torque-limiting gear train apparatus installed between a bidirectional input and a one-way output as claimed in claim 14, wherein:

the planetary gear train includes:
a sun wheel (202);
a ring gear (204); and
at least one planetary wheel (203) installed on a planetary wheel support arm annular shelf (200), said shelf (200) rotatably coupled to the input shaft (2000) via a third one-way transmission (303), said first one-way transmission is installed between said ring gear (204) and the output shaft (3000), said second one-way transmission (302) is installed between the input shaft (2000) and the output shaft (3000), and said torque limiting transmission (800) is installed between the input shaft (2000) and the sun wheel (202).

19. A retrograde torque-limiting gear train apparatus installed between a bidirectional input and a one-way output as claimed in claim 14, wherein:

the planetary gear train includes:
a sun wheel (202);
a ring gear (204); and
at least one planetary wheel (203) installed on a planetary wheel support arm annular shelf (200), said shelf (200) rotatably coupled to the output shaft (3000) via a third one-way transmission (303), said first one-way transmission (301) is installed between said ring gear (204) and the output shaft (3000), said second one-way transmission (302) is installed between the input shaft (2000) and the output shaft (3000), and said torque limiting transmission (800) is installed between the input shaft (2000) and the sun wheel (202).

20. A retrograde torque-limiting gear train apparatus installed between a bidirectional input and a one-way output as claimed in claim 14, wherein:

the planetary gear train includes:
a sun wheel (202) connected to the input shaft (2000) via the torque-limiting transmission (800);
a ring gear (204) connected to the output shaft (3000) via said first one-way transmission (301); and
at least one planetary wheel (203) having a shaft fixed to a shell (500) of the planetary gear train, the torque-limiting transmission (800) is installed between the input shaft (2000) and the sun wheel (202), and the second one-way transmission (302) is connected between the input shaft and the output shaft (3000).

21. A retrograde torque-limiting gear train apparatus installed between a bidirectional input and a one-way output as claimed in claim 14, wherein:

the planetary gear train includes:
a sun wheel (202) connected to the input shaft (2000) via the torque-limiting transmission (800);
a ring gear (204) connected to the output shaft (3000) via said first one-way transmission (301); and
at least one planetary wheel (203) having a shaft fixed to a shell (500) of the planetary gear train, the torque-limiting transmission (800) is installed between the input shaft (2000) and the sun wheel (202), and the second one-way transmission (302) is connected in series between the input shaft and the output shaft.

22. A retrograde torque-limiting gear train apparatus installed between a bidirectional input and a one-way output as claimed in claim 14, wherein:

the planetary gear train includes:
a sun wheel (202);
a ring gear (204); and
at least one planetary wheel (203) coupled between the sun wheel (202) and ring gear (204) and having a shaft fixed to a shell (500) of the planetary gear train, a third one-way transmission (305) is installed between the input shaft (2000) and the torque-limiting transmission (800), said torque limiting transmission (800) is installed between the third one-way transmission (305) and the sun wheel (202), and said second one-way transmission (302) is installed in series between the input shaft (2000) and the output shaft (3000).

23. A retrograde torque-limiting gear train apparatus installed between a bidirectional input and a one-way output as claimed in claim 14, wherein:

the planetary gear train includes:
a sun wheel (202);
a ring gear (204); and
at least one planetary wheel (203) installed on a planetary wheel support arm annular shelf (200), said shelf (200) includes an extension rotatably coupled between the input shaft (2000) and a third one-way transmission (303) fixed to a shell (500) of the planetary gear train, said first one-way transmission is installed between said ring gear (204) and the output shaft (3000), said torque limiting transmission (800) is installed between the input shaft (2000) and the sun wheel (202), and said second one-way transmission (302) is installed in series between the input shaft (2000) and the output shaft (3000).

24. A retrograde torque-limiting gear train apparatus installed between a bidirectional input and a one-way output as claimed in claim 14, wherein:

the planetary gear train includes:
a sun wheel (202);
a ring gear (204); and
at least one planetary wheel (203) installed on a planetary wheel support arm annular shelf (200), said shelf (200) rotatably coupled to the input shaft (2000) via a third one-way transmission (303), said first one-way transmission is installed between said ring gear (204) and the output shaft (3000), said torque limiting transmission (800) is installed between the input shaft (2000) and the sun wheel (202), and said second one-way transmission (302) is installed in series between the input shaft (2000) and the output shaft (3000).

25. A retrograde torque-limiting gear train apparatus installed between a bidirectional input and a one-way output as claimed in claim 14, wherein:

the planetary gear train includes:
a sun wheel (202);
a ring gear (204); and
at least one planetary wheel (203) installed on a planetary wheel support arm annular shelf (200), said shelf (200) rotatably coupled to the output shaft (3000) via a third one-way transmission (303), said first one-way transmission is installed between said ring gear (204) and the output shaft (3000), said torque limiting transmission (800) is installed between the input shaft (2000) and the sun wheel (202), and said second one-way transmission (302) is installed in series between the input shaft (2000) and the output shaft (3000).

26. A retrograde torque-limiting gear train apparatus installed between a bidirectional input and a one-way output as claimed in claim 14, wherein:

the planetary gear train includes:
- a sun wheel (202);
- a ring gear (204); and
- at least one planetary wheel (203) installed on a planetary wheel support arm annular shelf (200), said shelf (200) rotatably coupled to the ring gear (204) via a third one-way transmission (303), said first one-way transmission (301) is installed between said ring gear (204) and the output shaft (3000), said torque limiting transmission (800) is installed between the input shaft (2000) and the sun wheel (202), and said second one-way transmission (302) is installed in series between the input shaft (2000) and the output shaft (3000).

27. A retrograde torque-limiting gear train apparatus installed between a bidirectional input and a one-way output as claimed in claim 2, wherein said bi-directional input is an input shaft (2000) and said one-way output is an output shaft (3000) that is coaxial with the input shaft (2000), and said first transmission gear train is an epicyclic gear train that includes a first bevel gear (402), a second bevel gear (404) and an epicyclic gear (403) mounted on an epicyclic gear shaft (401).

28. A retrograde torque-limiting gear train apparatus installed between a bidirectional input and a one-way output as claimed in claim 27, wherein:

said epicyclic gear shaft (401) is fixed to a shell of the transmission gear train, said first one-way transmission is coupled between said second bevel gear (404) and said output shaft (3000), said second one-way transmission (302) is coupled between said input shaft (2000) and said output shaft (3000), and said torque-limiting transmission (800) is installed between the input shaft (2000) and the first bevel gear (402).

29. A pedal driven vehicle as claimed in claim 27, wherein:

said epicyclic gear shaft (401) extends from a support arm (400) having an extending section that extends between the input shaft (2000) and the output shaft (3000), the first one-way transmission (301) is coupled between the output shaft (3000) and the extending section of the annular shelf (400), the second one-way transmission (302) is coupled between the extending section of the support arm (400) and the input shaft (2000), and said first bevel gear (402) is coupled to the input shaft (2000) by a third one-way transmission (305) and by said torque-limiting transmission (800) installed between the first bevel gear (402) and the third one-way transmission (305).

30. A retrograde torque-limiting gear train apparatus installed between a bidirectional input and a one-way output as claimed in claim 27, wherein:

said epicyclic gear shaft (401) extends from a support arm (400) having an extending section that extends between the input shaft (2000) and a shell (500) of the epicyclic gear train and the input shaft (2000) via a third one-way transmission (303), said first one-way transmission (301) is coupled between said second bevel gear (404) and said output shaft (3000), said second one-way transmission (302) is coupled between said input shaft (2000) and said output shaft (3000), and said torque-limiting transmission (800) is installed between the input shaft (2000) and the first bevel gear (402).

31. A retrograde torque-limiting gear train apparatus installed between a bidirectional input and a one-way output as claimed in claim 27, wherein:

said epicyclic gear shaft (401) is extends from a support arm (400), said support arm (400) being rotatably coupled to the input shaft (2000) by a third one-way transmission (303), said first one-way transmission (301) is coupled between said second bevel gear (404) and said output shaft (3000), said second one-way transmission (302) is coupled between said input shaft (2000) and said output shaft (3000), and said torque-limiting transmission (800) is installed between the input shaft (2000) and the first bevel gear (402).

32. A retrograde torque-limiting gear train apparatus installed between a bidirectional input and a one-way output as claimed in claim 27, wherein:

said epicyclic gear shaft (401) is rotatably coupled to the output shaft (3000) by a third one-way transmission (303), said first one-way transmission (301) is coupled between said second bevel gear (404) and said output shaft (3000), said second one-way transmission (302) is coupled between said input shaft (2000) and said output shaft (3000), and said torque-limiting transmission (800) is installed between the input shaft (2000) and the first bevel gear (402).

33. A pedal driven vehicle as claimed in claim 27, wherein:

said epicyclic gear shaft (401) is rotatably coupled to the second bevel gear (404) by a third one-way transmission (303), said first one-way transmission (301) is coupled between said second bevel gear (404) and said output shaft (3000), said second one-way transmission (302) is coupled between said input shaft (2000) and said output shaft (3000), and said torque-limiting transmission (800) is installed between the input shaft (2000) and the first bevel gear (402).

34. A retrograde torque-limiting gear train apparatus installed between a bidirectional input and a one-way output as claimed in claim 27, wherein:

said epicyclic gear shaft (401) is fixed to a shell (500) of the transmission gear train, said first one-way transmission (301) is coupled between said second bevel gear (404) and said output shaft (3000), said second one-way transmission (302) is coupled in series between said input shaft (2000) and said output shaft (3000), and said torque-limiting transmission (800) is installed between the input shaft (2000) and the first bevel gear (402).

35. A retrograde torque-limiting gear train apparatus installed between a bidirectional input and a one-way output as claimed in claim 27, wherein:
- said epicyclic gear shaft (401) is fixed to a shell (500) of the transmission gear train,
- the first one-way transmission (301) is coupled between the output shaft (3000) and the second bevel gear (404),
- the second one-way transmission (302) is coupled in series between the input shaft (2000) and the output shaft (3000), and
- said first bevel gear (402) is coupled to the input shaft (2000) by a third one-way transmission (305) and by said torque-limiting transmission (800) installed between the first bevel gear (402) and the third one-way transmission (305).

36. A retrograde torque-limiting gear train apparatus installed between a bidirectional input and a one-way output as claimed in claim 27, wherein:
- said epicyclic gear shaft (401) extends from a support arm (400) having an extending section that extends between the input shaft (2000) and a shell (500) of the epicyclic gear train and the input shaft (2000) via a third one-way transmission (303),
- said first one-way transmission is coupled between said second bevel gear (404) and said output shaft (3000),
- said second one-way transmission (302) is coupled in series between said input shaft (2000) and said output shaft (3000), and
- said torque-limiting transmission (800) is installed between the input shaft (2000) and the first bevel gear (402).

37. A retrograde torque-limiting gear train apparatus installed between a bidirectional input and a one-way output as claimed in claim 27, wherein:
- said epicyclic gear shaft (401) is extends from a support arm (400), said support arm (400) being rotatably coupled to the input shaft (2000) by a third one-way transmission (303),
- said first one-way transmission is coupled between said second bevel gear (404) and said output shaft (3000),
- said second one-way transmission (302) is coupled in series between said input shaft (2000) and said output shaft (3000), and
- said torque-limiting transmission (800) is installed between the input shaft (2000) and the first bevel gear (402).

38. A retrograde torque-limiting gear train apparatus installed between a bidirectional input and a one-way output as claimed in claim 27, wherein:
- said epicyclic gear shaft (401) is rotatably coupled to the output shaft (3000) by a third one-way transmission (303),
- said first one-way transmission is coupled between said second bevel gear (404) and said output shaft (3000),
- said second one-way transmission (302) is coupled in series between said input shaft (2000) and said output shaft (3000), and
- said torque-limiting transmission (800) is installed between the input shaft (2000) and the first bevel gear (402).

39. A retrograde torque-limiting gear train apparatus installed between a bidirectional input and a one-way output as claimed in claim 27, wherein:
- said epicyclic gear shaft (401) is rotatably coupled to the second bevel gear (404) by a third one-way transmission (303),
- said first one-way transmission is coupled in series between said second bevel gear (404) and said output shaft (3000),
- said second one-way transmission (302) is coupled between said input shaft (2000) and said output shaft (3000), and
- said torque-limiting transmission (800) is installed between the input shaft (2000) and the first bevel gear (402).

40. A retrograde torque-limiting gear train apparatus installed between a bidirectional input and a one-way output as claimed in claim 1, wherein at least one of the first and second gear trains is constituted by gears, friction wheels, pulleys, or sprockets.

41. A retrograde torque-limiting gear train apparatus installed between a bidirectional input and a one-way output as claimed in claim 1, wherein said retrograde torque-limiting gear train apparatus has a fixed or variable transmission ratio to provide at least one of an acceleration, a deceleration, or constant velocity.

\* \* \* \* \*